United States Patent [19]
Abraham et al.

[11] Patent Number: 5,530,842
[45] Date of Patent: *Jun. 25, 1996

[54] GENERIC BACKPLANE SYSTEM WHICH IS CONFIGURABLE TO SERVE DIFFERENT NETWORK ACCESS METHODS SIMULTANEOUSLY

[75] Inventors: Menachem Abraham, Lexington; David Bartolini, Dudley; Samuel Ben-Meir, Sharon; Ilan Carmi, Framingham; John L. Cook, III, Southborough; Ira Hart, Cambridge; Alex Herman, Sharon; Steven E. Horowitz, Holliston; Yongbum Kim, Brookline; Yoseph Linde, Needham; Brian Ramelson, Brighton; Richard Rehberg, Northboro; Gordon Saussy, Brighton; Yuval Shohet, Acton; Igor Zhovnirovski, Lexington, all of Mass.

[73] Assignee: 3COM Corporation, Santa Clara, Calif.

[ * ] Notice: The term of this patent shall not extend beyond the expiration date of Pat. No. 5,301,303.

[21] Appl. No.: 221,383

[22] Filed: Mar. 31, 1994

Related U.S. Application Data

[63] Continuation of Ser. No. 687,590, Apr. 16, 1991, Pat. No. 5,301,303, which is a continuation-in-part of Ser. No. 512,849, Apr. 23, 1990, abandoned.

[51] Int. Cl.⁶ .............................. G06F 9/00; G06F 15/00
[52] U.S. Cl. .................. 395/500; 395/800; 395/200.10; 395/200.15; 395/200.21; 364/229.4; 364/240.1; 364/242.94; 364/242.95; 364/242.96; 364/DIG. 1
[58] Field of Search ..................... 395/800, 200, 395/500, 325, 275, 725, 775, 200.01, 200.10, 200.15, 200.21; 364/DIG. 1, DIG. 2; 370/58.1

[56] References Cited

U.S. PATENT DOCUMENTS

| | | | |
|---|---|---|---|
| 4,418,382 | 11/1983 | Larson et al. | 395/200 |
| 4,660,141 | 4/1987 | Ceccon et al. | 395/275 |
| 4,760,553 | 7/1988 | Buckley et al. | 395/575 |
| 4,763,249 | 8/1988 | Bomba et al. | 395/325 |
| 4,835,674 | 5/1989 | Collins et al. | 395/275 |
| 4,845,609 | 7/1989 | Lighthart et al. | 395/275 |
| 4,872,158 | 10/1989 | Richards | 370/58.1 |
| 5,016,162 | 5/1991 | Eipstein et al. | 395/775 |
| 5,115,235 | 5/1992 | Oliver . | |
| 5,265,239 | 11/1993 | Adolino | 395/500 |
| 5,283,869 | 2/1994 | Adams et al. | 395/200 |
| 5,307,463 | 4/1994 | Hyatt et al. | 395/275 |
| 5,349,343 | 9/1994 | Oliver . | |

OTHER PUBLICATIONS

Arnold R. G. et al; "A Hierarchical restructurable multi-microprocessor architecture" IEEE 3rd Annual Symposium on Computer Architecture pp. 40–45. 19–21 Jan. 1976.

*Primary Examiner*—Meng-Al An
*Attorney, Agent, or Firm*—McGlew and Tuttle

[57] ABSTRACT

A local net area network, or LAN, configuration is provided with a multiple generic LAN channel architecture which can be logically and dynamically changed. The configuration control can be applied to each module of the network and to each port of a module of a LAN hub. The architecture provides multiple LAN protocols to be used simultaneously, as needed, through protocol specific functions. Industry standard protocol such as: token bus, token ring, and fiber distributed data interface (FDDI), can be implemented using the generic channel architecture and its characteristics providing respective network functions. The architecture also provides a digital collision detection method and provides information necessary for precise network statistics monitoring. The token passing ring architecture provides a logical ring formation within the generic channel. A token passing bus architecture uses modified Ethernet™ architecture, and a hub management provides control for the generic multi-channel and the LAN management provides protocol dependent network management. The architecture provided allows multiple hub management entities via hub mastership arbitration to provide a unique master for the hub management function.

18 Claims, 41 Drawing Sheets

COL 1 STATE MACHINE

Col 2 State Machine

GENERIC BACKPLANE SYSTEM WHICH IS CONFIGURABLE TO SERVE DIFFERENT NETWORK ACCESS METHODS SIMULTANEOUSLY

This is a continuation of application Ser. No. 07/687,590 filed Apr. 16, 1991 which is a continuation in part of application Ser. No. 07/512,849 filed on Apr. 23, 1990 now abandoned.

FIELD OF THE INVENTION

The invention relates generally to a generic multichannel backplane bus architecture and its application thereof and more specifically to a Local Area Network (LAN) system architecture, and is also directly applicable to implementations of Wide Area Network (WAN) systems, and more particularly to a system for providing multiple LAN protocols, simultaneous multiple protocol-independent generic channels of communication on a backplane, as well as a unique means of LAN media connections to the backplane, and unique and useful systems of monitoring and controlling a LAN environment.

BACKGROUND OF THE INVENTION

Various systems for Local Area Networks are known from the prior art. However, these systems are all based on a particular medium and other particular standards which pose significant problems in the field.

The LAN standards in existence that pertains to this disclosure are listed below.

Digital Equipment Corporation/Intel/Xerox Ethernet™ Version 2.0

ISO/ANSI/IEEE 802.3 CSMA/CD,

ISO/ANSI/IEEE 802.4 Token Bus

ISO/ANSI/IEEE 802.5 Token Ring

ISO/ANSI X3T9.5 FDDI (Fiber optic Distributed Data Interface), a Token Passing Ring.

All of the above are networking protocols, and each standard specifies the Media Access methods (MAC), and Logical communication Link Control methods (LLC).

The concept of the "backplane bus" is well established in the computer and communications field; examples of standardized and proprietary backplane buses abound. In the most general terms, a backplane bus is a wiring center common to a single platform and shared by a number of users (generally implemented as printed circuit boards plugged into the bus via a single connector).

The backplane bus is generally used for communications between the users according to some common protocol. Prior art arrangements in this field require that the bus be dedicated to a single bus access protocol, and that all users of the bus communicate across the bus using only this protocol.

The protocol consists of an access method, data format and data rate, all of which must be common to all users of the bus. In general, only one user of the bus may generate data "packets" onto the bus at any instant; access to the bus is governed by a distributed mechanism common to all users of the bus, termed the access method.

Specifically in LAN applications of backplane buses, there are two well established access methods: Carrier Sense, Multiple Access with Collision Detection (CSMA/CD) and Token Passing. Token passing further distinguishes to a physical ring and physical bus manifestation. All of these access methods are used with multiple data rates and data formats, generating numerous protocols; in addition, there are other protocols which combine elements of both CSMA/CD and Token Passing, as well as protocols which use only some elements of the access methods (e.g. Carrier Sense, Multiple Access without Collision Detection).

Prior art in this field provides a single, unique backplane bus designed specifically for a single protocol. An example of an implementation of a single protocol backplane bus is found in the Multiconnect™ Repeater from 3Com Corporation. This product offers a backplane bus dedicated to the IEEE 802.3 10 MegaBit/Second CSMA/CD protocol (commonly known as Ethernet™).

Additional prior art in this field provides multiple unique, separate backplane buses, each of which is specifically designed to support a single protocol. An example of this implementation is found in the System 3000™ Wiring Concentrator from Synoptics Corporation. This product offers four independent backplane bus protocols, each dedicated uniquely to one of the following protocols:

1. IEEE 802.3 10 Megabit/Second CSMA/CD (Ethernet™)
2. IEEE 802.5 4 Megabit/Second Token Passing Ring
3. IEEE 802.5 16 Megabit/Second Token Passing Ring
4. ANSI X3T9.5 100 Megabit/Second Token Passing Ring (FDDI)

Additional prior art arrangements in this field provide a single backplane bus implementing a single protocol, and require the users of the bus to support protocol conversion between external multiple protocol interfaces and the internal protocol. All of these prior art arrangements suffer from the following limitations:

1. The backplane bus is dedicated to a single protocol, allowing no flexibility for growth or change.

2. The backplane bus supports only a single data path, allowing only one data packet to be generated onto the bus at any time.

3. Attempts to address these limitations in the prior art lead to higher costs: additional backplane buses or complex protocol converters (e.g. network bridges).

4. Each module within a system cannot be operating independently from the backplane network.

The concept of the logical network and the physical network configuration has been only attainable through a physical embodiment of physical network connections. All of the LAN/WAN (Local Area Network/ Wide Area Network) networking hub implementations are dedicated to, a single protocol, or to dedicated protocol channels to interconnect network users. By this pre-determined use of backplanes and their functional and physical definitions, the concept of module switching among generic channels was not possible.

Arrangements providing similar functions are known. The Access One™ from Ungermann-Bass, System 3000™ from Synoptics, MMNC™ from Cabletron, Multiconnect™ from 3Com corporations are examples of prior art arrangements.

Access One™ from Ungermann-Bass, System 3000™ from Synoptics, MMAC™ from Cabletron, Multiconnect™ from 3Com all employ dedicated protocol channels, and most offer one protocol and one channel only.

SUMMARY AND OBJECTS OF THE INVENTION

It is an object of the invention to provide a system and an arrangement for networks of all media types, including twisted pair, fiber optic, thin and thick coaxial cable and others by employing a concentrator which is modular and which provides a fault tolerant platform for one or more networks.

It is a further object of the invention to provide a system with communication channels which can be reconfigure at any time to a new protocol and support communication using the new protocol without providing a new management means.

According to the invention, a plurality of identical communication channels are provided in the form of a multiple channel concentrator with a plurality of slots. Each slot connects to the generic channels such that modules connected into the slot connect with the channels. Media channels and management channels are connected to the concentrator and provide the ability to operate several networks using different protocols concurrently with a single system concentrator.

According to the invention a unique means of connecting media to the backplane is provided by module switching to any channel. This uses the concept of a generic channel architecture. This module switching section provides means for switching each module, of any protocol or any media interface type, to any available channel thereby assigning the channel to a specific protocol dynamically. This invention is further improved by each port associated with a particular module switching to any channel. This allows building of logical network configuration with a physical network connections.

Several different types of modules exist in a LAN system hub according to the invention. The following describes and defines each type.

Control Module: A central module that performs functions uniquely related to a hub. Example of these type of cards are the repeater module in the Multiconnect™, and Re-timing module in the System 3000™. The functions associated with this module is often integrated with other type of modules to lower the cost of a system.

Media Module: A module that interfaces to a LAN media specified in any of the aforementioned Standards. Each standard defines electrical, mechanical, functional, and optical, if applicable, interfaces for a particular media. A media module often has multiple ports.

Network Management Module: A module that interfaces the backplane that monitors LAN system status, controls system and module parameters, configures system and module parameters, and reports a LAN system status and network statistics.

Bridge Module: A module that implements any type of store-and-forward-function for any purpose. It either converts one protocol to another, or filters (receive all transmissions from one port, and selectively transmits to another port, or both).

According to the invention the connection of a given medium to the backplane is provided by a module switching element which has the ability to physically switch each module to any channel. This module switching provides modules, of any type listed above, with the capability to establish a LAN connection to the backplane, and to be connected or to any channel or to be isolated from the backplane allowing each module to continue to operate without any LAN connection to other modules.

This module switching element again uses the concept of the generic channel architecture. This allows for the switching of each port of a module of any protocol or any media interface card to any channel and allowing for the building of a logical network configuration with physical network connections.

The concept of logical network and the physical network configuration has been only attainable through a physical embodiment of physical network connections. Thus this invention provides dynamic control over physical network connections.

The module switching to any channel, allows a logical network by allowing any module to switch from one channel to another. This switching is restricted in that the switched module, switches all the parts connected to that module to another channel. This restriction forces users to pre-sort connections. Physical port switching does not have this restriction. Thus, module switching is further improved by allowing each port of a module to switch to any channel. For the purpose of economics, both module and port switching inventions are deemed uniquely and proportionally useful in applications needing network topological flexibility.

According to a further aspect of the invention, in order to organize the LAN/WAN, a management channel is provided. This management channel may be used for multi-management module arbitration with allowance to multiple agents.

Remote management of a LAN system is a well known function that most LAN system vendors offer. The intelligent entity within a LAN system that communicates to a host is called a Network Management Agent (NMA). All known implementations of the NMA integrate LAN management as well as vendor-specific hub system management.

System 3000™ from Synoptics, and MMAC™ from Cabletron, employ a dedicated management master for the purpose of network management functions in a Hub. All of the known multiplicity of management functions in these systems are, at most, provided for redundancy to the primary function.

This invention conceptually separates hub management functions from the network management functions. The architecture that separates the two functions which traditionally have been implemented as an integrated set of functions, provides the following useful features:

1. It allows multiple LAN Management Modules in one hub. This also allows redundant Management Modules.

2. It allows two multiple Network Management Agents pertaining to the operation with the Hub Management functions and its election.

This architecture of the present invention allows new and useful features to be incorporated in existing LAN/WAN protocols. These features are included in the protocols used according to the present invention.

According to the invention the Ethernet™ system has been improved. The invention provides a deterministic and precise method for collision detection on the backplane using slot-ID. Further precise collision counting is provided per-port. Still further, the invention allows a synchronous Ethernet™ channel, and half the repeater implementations of Ethernet™ modules.

According to the invention, collision-detection on the backplane using slot-IDs is provided allowing purely digital (binary) electronic circuits to detect contention of two or more simultaneous Ethernet™ transmissions on a backplane. The occurrence of this contention is called Collision.

Ethernet™ is also called CSMA/CD, Carrier-Sense, Multiple Access/Collision Detection. The prior art is the Ethernet™ implementations by many companies such as Xerox, Digital Equipment Corporation, Intel and the ISO/ANSI/ IEEE 802.3 standards implemented by numerous companies. The Ethernet™ and 802.3 standards each specify analog collision detection in coaxial media (10Base5 and 10Base2), serial bit-compare with analog collision detection in broadband coaxial media (10Broad36), and logical collision detection in the twisted pair and fiber point-to-point media (10BaseT, 10BaseF-Draft, respectively).

Most of the Ethernet™ HUB vendors employ analog collision detection on their backplane, in a similar way to that of 10Base5 or 10Base2, where either current or voltage is summed to represent the number of simultaneous transmissions. A voltage or current level that represents two or more simultaneous transmissions is deemed a collision.

The precision collision counting per-port allows accurate counting of collision statistics in an Ethernet™ network. In addition, this invention allows association of each collision to the port of its origination by the use of the port-ID.

This function is deemed useful for network statistics for management purposes, and this specific function is well known in the LAN industry. Many Ethernet™ implementations from numerous companies purport to provide this function.

Older implementations have used the collision condition sometimes detected when the monitoring LAN controller was not an active participant in the collision. This has been proven to be inaccurate and unreliable, because Ethernet™ LAN does not pass this information from one LAN segment to another, when separated by a repeater(s). Additionally, all known modern implementations use Ethernet™ controller ICs that can receive Ethernet™ transmissions promiscuously and receive transmissions less in length than a minimum sized packet.

The limitations with the above approach is that some collisions consist of all preamble patterns (repeating 1010 . . . 10 pattern) which is ignored and not reported by all known Ethernet™ controller ICs. In addition, some collisions consist of a preamble phase violation such as 1010 . . . 100. When a double zero is detected before a double one (last two bits of the Start Frame Delimiter, SFD), 10 . . . 1011, all known Ethernet™ controller ignore the subsequent reception, thereby ignoring the collision. Both of these cases are common in Ethernet™ based networks. This invention does not have the aforementioned limitations.

An additional limitation with the above approach resides in not distinguishing a locally occurring collision, i.e. among ports in a local hub, from a collision resulting elsewhere. Such collision statistics are less useful when these conditions are not distinguished. A locally occurring collision denotes congestion at the hub where the measurement is being made, whereas a remotely occurring collision denotes congestion at the hub other than where the measurement is being made. This distinction allows network users to optimize an Ethernet™ network with a use of Bridges or Routers. This invention distinguishes between local and remote collisions.

The Ethernet™ Statistics Counting per-Port supplements a Ethernet™ controller to extend its promiscuously received Ethernet™ packet statistics to associate with a particular port of a particular module.

This function is deemed useful for network statistics for network management purposes, such as fault isolation, traffic monitoring, etc., and implementations similar to this are known in the LAN industry. These implementations use a set of registers that parallel the Ethernet™ controller IC's. Each network transmission records the slot-ID in the register. A local intelligence, usually through a micro-processor, associates the contents of Slot-ID register to the received packet. When there is no discrepancy between the number of IDs in the Slot-ID register and the number of received Ethernet™ packets, this scheme functions properly.

The limitations with the above approach is that some Ethernet™ transmissions result in un-receivable packets in some network collision scenarios due to the inter-packet shrinkage, a well-known problem among knowledgeable users of the IEEE 802.3 standard. A collision free transmission preceded by a multiple station collision may observe an inter-packet gap of a few bit times (a bit time is defined as 100 nano-seconds). When this type of network scenario occurs, the Ethernet™ controller IC may not receive the subsequent packet following the gap and ignore its activity. An additional limitation with the above approach is that an Ethernet™ controller IC does not have packet buffers to store incoming packets. All known Ethernet™ type controller IC's ignore the activities and do not receive incoming packets. In both of these cases, Slot-ID register is not guaranteed to be consistent with the received packet, and the resulting received packet statistics can be grossly incorrect. This invention closely monitors the Ethernet™ controller IC and its operation to associate the slot and port IDs to the received packet such that the device according to the invention is free of the aforementioned limitations.

The half-repeater implementations of Ethernet™ modules describes ISO/ANSI/IEEE 802.3 repeater implementations on the Ethernet™ channel. This invention causes approximately half the repeater limitations resulting from delay variability, thereby allowing a greater number of repeater functions to be present in hubs cascaded in series without violating the limit pertaining to the number of repeated sets by the 802.3 standard.

The repeater specified in 802.3 is limited to up to four in cascade. This limitation comes from preamble losses and its regeneration, and Ethernet™ device delay variations contributing to a dynamic packet gap (gap between two packets) space. The limitation comes from the shrinkages of the gap. This well-known limitation restricts Ethernet™ network topology, when interconnected via repeaters.

The restriction of four repeaters comes from the accumulated shrinkage of this gap through four repeaters and other media access devices. This phenomena and its restriction of Ethernet™ network topology to up to four repeaters in cascade, is well-known in the Ethernet™ LAN industry.

Another scheme known in the industry is to reduce the other device delay variations that contributes to the dynamic packet gap spaces thereby reducing the amount of gap shrinkage. This is called Inter-Packet Gap Shrinkage, IPGS. By reducing the shrinkage enough, more repeaters in cascade may be allowed.

This invention describes a novel and unique way to allow more hubs with IEEE 802.3 repeater functions in a direct cascade without exceeding the limits used to set the number of repeater allowances of four in direct cascade.

In the Token Ring and FDDI protocols, improvements have been made in establishing the Token rings.

A token ring comprises dedicated point-to-point links connecting one station to the next, until a physical ring is formed. Many products that emulate such physical connections are available. It is well known in the industry to provide a physical, electro-mechanical, bypass switches for establishing a ring.

Also, it is possible to establish multiple logical rings of compatible speeds of 4 MegaBPS and 16 MegaBPS through the configuration management and the data rate detection.

The improvements to the Token Ring protocol involve establishing the rings by means of slot-ID, and by slot-ID and speed detection. The improvements to the FDDI ring protocol involve establishing the rings of parallel data paths by means of slot-ID.

According to the invention token bus improvements are provided which allow the ISO/ANSI/IEEE 802.4 Token Bus protocol on the backplane.

The ISO/ANSI/IEEE 802.4 Token Bus standard is well understood and used in Manufacturing Automation Protocol. This is a Token Passing protocol in a physical bus and a logical ring topology. Most of the products implementing the Token Bus protocol uses bus topology. The bus topology's limitation is its difficulty to maintain, control, and configured the network, compared to the structured wiring made possible by this invention.

To implement Token Bus protocol, a Token Bus channel must provide a means of detecting data corruption and means of broadcasting data transmissions to all the other end-nodes. Both of these are common with the Ethernet™ network protocol. A bigger FIFO is provided to service increased packet size of 32 Kilo-bytes of Token Bus, compared to the 1.5 Kilobytes of Ethernet™, and an additional data line is provided to carry non-data symbols. Ethernet™ modules with these modifications carry packets with Token Bus Protocol.

The collision or in this case, data corruption detected is implemented by the detecting two or more simultaneous transmissions. Collision is detected in the same way as described in Ethernet™, as disclosed above. In addition, all data transmission from any port are broadcasted to all other ports, except during a collision. During a collision, all data transmissions from any port are broadcasted to all the ports.

According to the invention a Multiple Generic Channel, Multiple Protocol, Backplane Bus Architecture is provided which defines the Network Bus Architecture. This Multi-channel Backplane Bus provides the following:

1. A single physical backplane bus which is logically partitioned into a number of generic data channels. Each of these channels consist of a number of wires not dedicated to any particular function.

2. Each of the channels is identical and not dedicated to any protocol. Each of the channels is made available to all users of the bus.

3. Users of the bus may select which of the channels they will communicate on. There is no proscription on users communicating on multiple channels simultaneously.

4. Users of each module may select not to communicate on any channel. This feature allows each module to be isolated from the backplane networks and thereby allows independent networks only limited by the number of modules with a restriction that no isolated modules are connected together on the back-plane.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4B is a continuation of the bottom of FIG. 4A, FIG. 4C is a continuation of the right side of FIG. 4A, FIG. 4D is a continuation of the right side of FIG. 4B and the bottom of FIG. 4C, FIG. 4E is a continuation of the right side of FIG. 4C and FIG. 4F is a continuation of the right side of FIG. 4D and the bottom of FIG. 4E;

FIG. 5B is a continuation of the bottom of FIG. 5A;

FIG. 6B is a continuation of the bottom of FIG. 6A;

FIG. 7B is a continuation of the bottom of FIG. 7A, FIG. 7C is a continuation of the right side of FIG. 7A, FIG. 7D is a continuation of the right side of FIG. 7B and the bottom of FIG. 7C, FIG. 7E is a continuation of the right side of FIG. 7C, and FIG. 7F is a continuation of the right side of FIG. 7D and a continuation of the bottom side of FIG. 7E;

FIG. 10B is a continuation of the right side of FIG. 10A, FIG. 10C is a continuation of the bottom side of FIG. 10B;

FIG. 15B is a continuation of the bottom of FIG. 15A;

FIG. 16B is a continuation of the right side of FIG. 16A and FIG. 16C is a continuation of the right side of FIG. 16B;

FIG. 18B is a continuation of the right side of FIG. 18A;

FIG. 19B is a continuation of the right side of FIG. 19A, and FIG. 19C is a continuation of the bottom side of FIG. 19A.

DETAILED DESCRIPTION OF THE PREFERRED EMBODIMENTS

Figure 1:
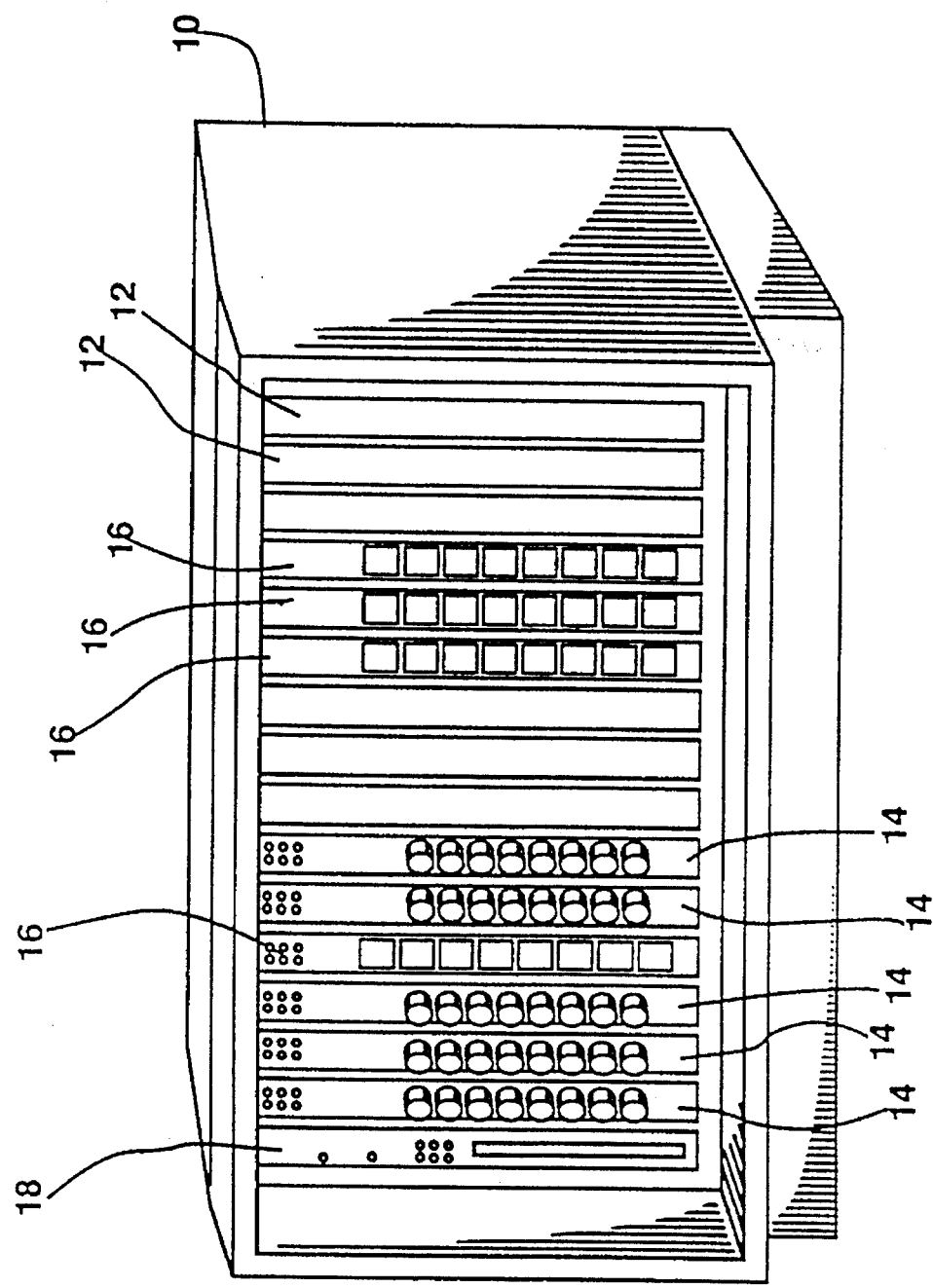
FIG. 1 is a perspective view of a multiple generic channel concentrator according to the invention.

Referring to the drawings and in particular to FIG. 1, the invention provides a system which employs a unique concentrator generally designated "10". The concentrator includes plural slots 12 which receive various modules or cards for connecting the modules to the back-plane bus arrangement. The backplane bus includes plural generic channels. The modules may include for example fiber modules 14 and twisted pair modules 16. Other modules such as a controller module 18 and modules such as power supply modules, LAN management modules, bridge support modules and the like may also be provided. Modules or cards which provide a connection between a specific type of medium and the concentrator are referred to as media distribution modules below and these may include modules using various known media such as unshielded twisted pair, fiber optic cable and coaxial cable, for example.

Figure 2:
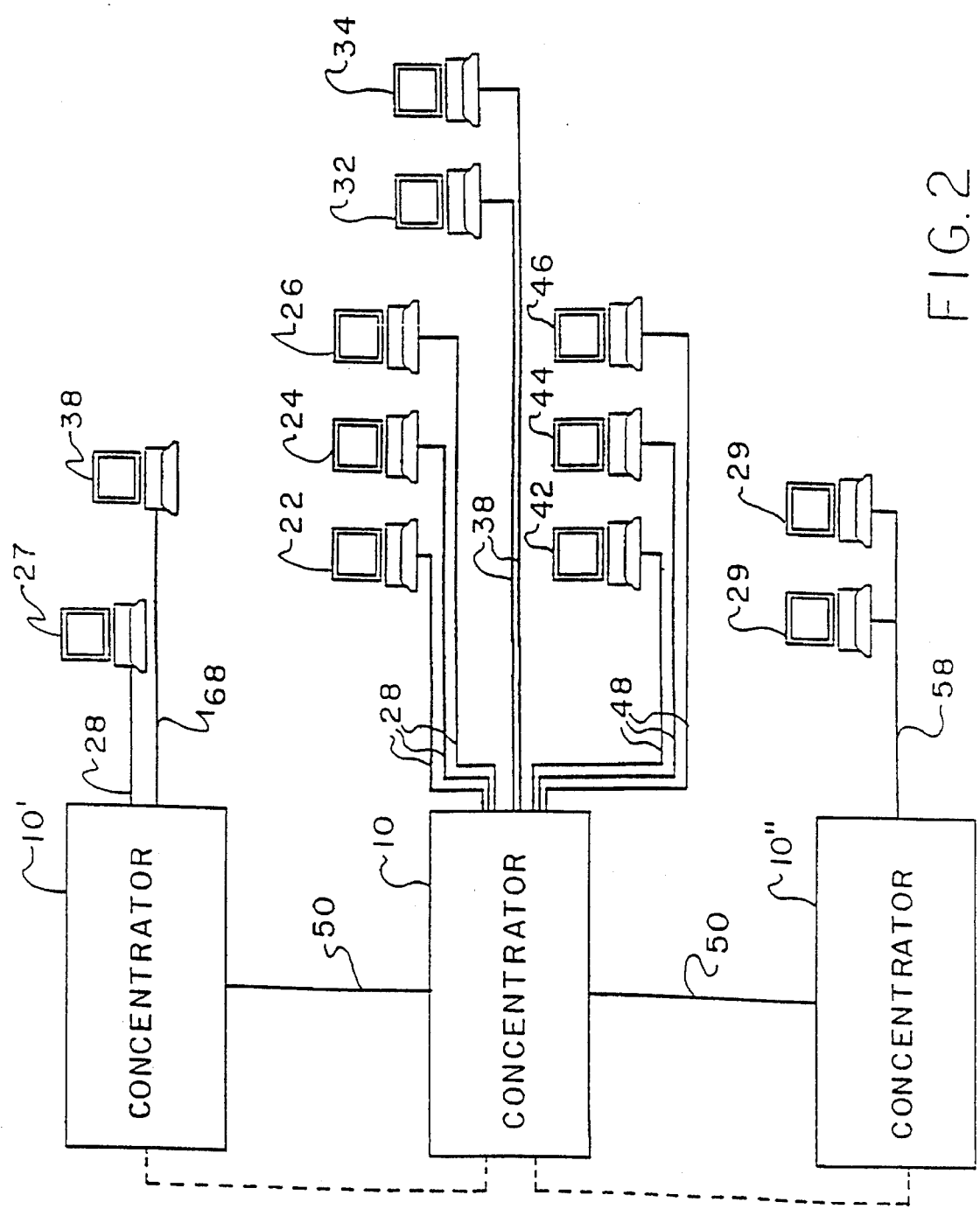
FIG. 2 is a schematic representation of a communication system according to the invention.

FIG. 2 depicts a network arrangement employing the concentrator according to the system of the invention. In the example shown in FIG. 2, a concentrator 10 is employed providing three different networks, each network operating using a different protocol such as Ethernet TM, Token Ring, FDDI. In the example shown, the channel A of concentrator 10 operates using twisted pair as the medium using the Ethernet protocol. Accordingly, this generic channel A supports the stations 22, 24 and 26 running Ethernet TM for communication on the network (the first network). The stations 22, 24 and 26 are each connected to the concentrator 10 over twisted pair media 28. Likewise a different network is operating (the second network) using channel B of the concentrator 10. In this case the channel B of concentrator 10 supports the network including stations 32 and 34 which are connected to the concentrator over workstation connections 38 using the 100 Mbps FDDI protocol. A third network is also provided wherein channel C of the concentrator 10 serves stations 42, 44, 46 which are connected to the concentrator over fiber optic media 48 running the fiber optic Ethernet™ protocol. Each of the link connections 28, 38 and 48 are connected to the concentrator by a media distribution module which is described below.

According to the invention, the concentrator 10 may be connected to a backbone 50 and through backbone 50 the concentrator 10 is connected to other concentrators at other locations. According to the example of FIG. 2, a fiber optic Ethernet™ fault tolerant backbone 50 is provided connecting the concentrator 10 to similar concentrators 10' and 10".

The concentrator 10' is connected to a station 27 which is connected to a channel of concentrator 10' making it a part of the network of stations 22, 24 and 26 operating under the Ethernet™ protocol. Similarly, stations 29 may be connected to a channel of concentrator 10" (such as channel A) dedicated to the Ethernet™ protocol and providing access to a network of stations 22, 24 and 26. The stations 29 are shown connected to the concentrator 10" over coaxial cable 58 for operating using the Ethernet™ protocol. The station 38 is also shown connected to concentrator 10' for connection to the network of stations 32 and 34. Station 38 is connected over link 68 which is provided as a shielded twisted pair link. In this way the network connected to channel B operates using the Token Ring protocol, the network operating under channel C uses the fiberoptic Ethernet™ protocol whereas the network operating under channel A uses the Ethernet™ protocol. This provides three networks functioning concurrently using the same concentrator. In the concentrator 10 the channel A is devoted to Ethernet™, channel B is devoted to Token Ring and channel C is devoted to fiberoptic Ethernet.

Figure 3:
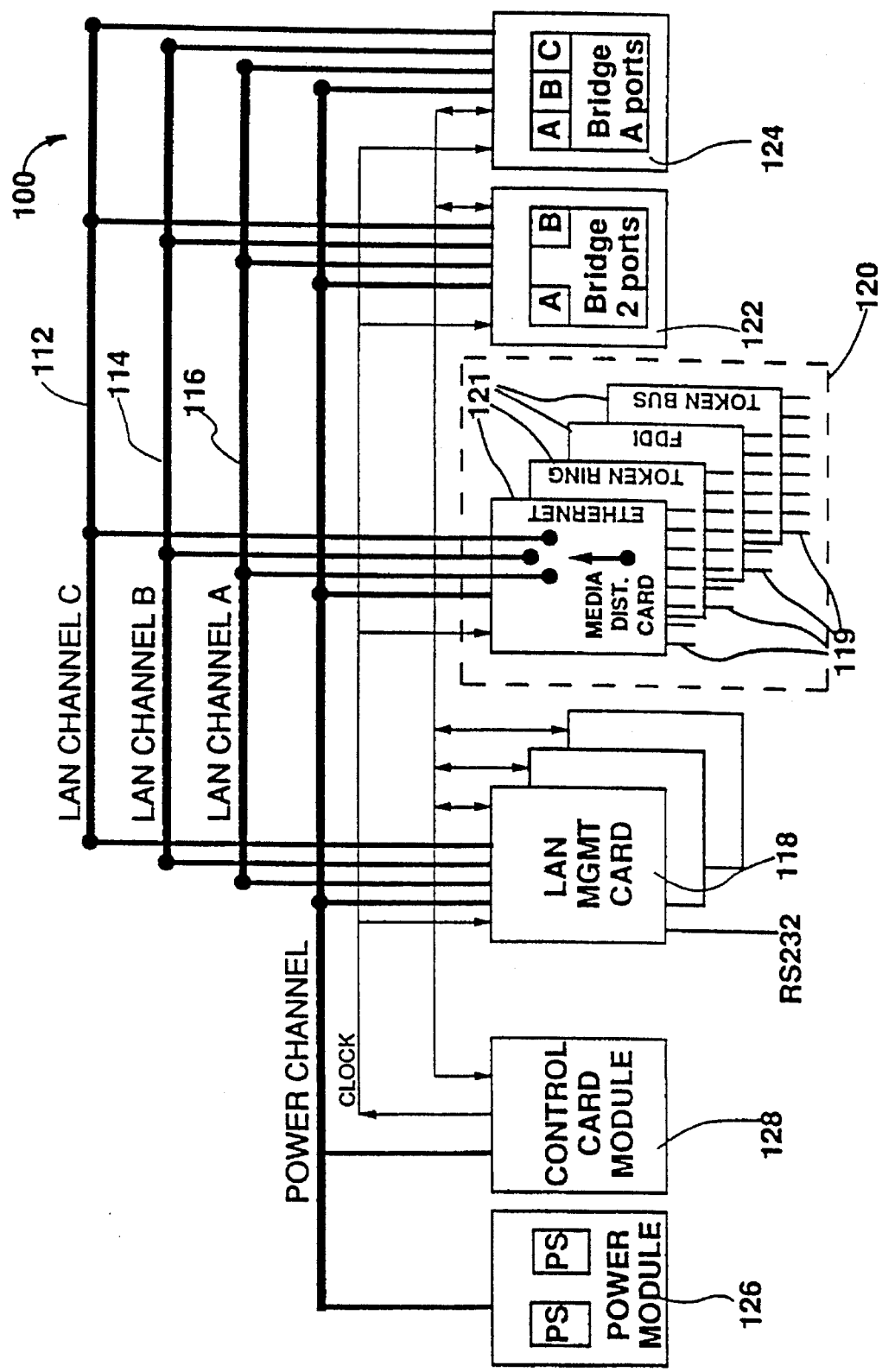
FIG. 3 is a schematic representation of the multiple generic channel architecture according to the invention.
Figure 4A:
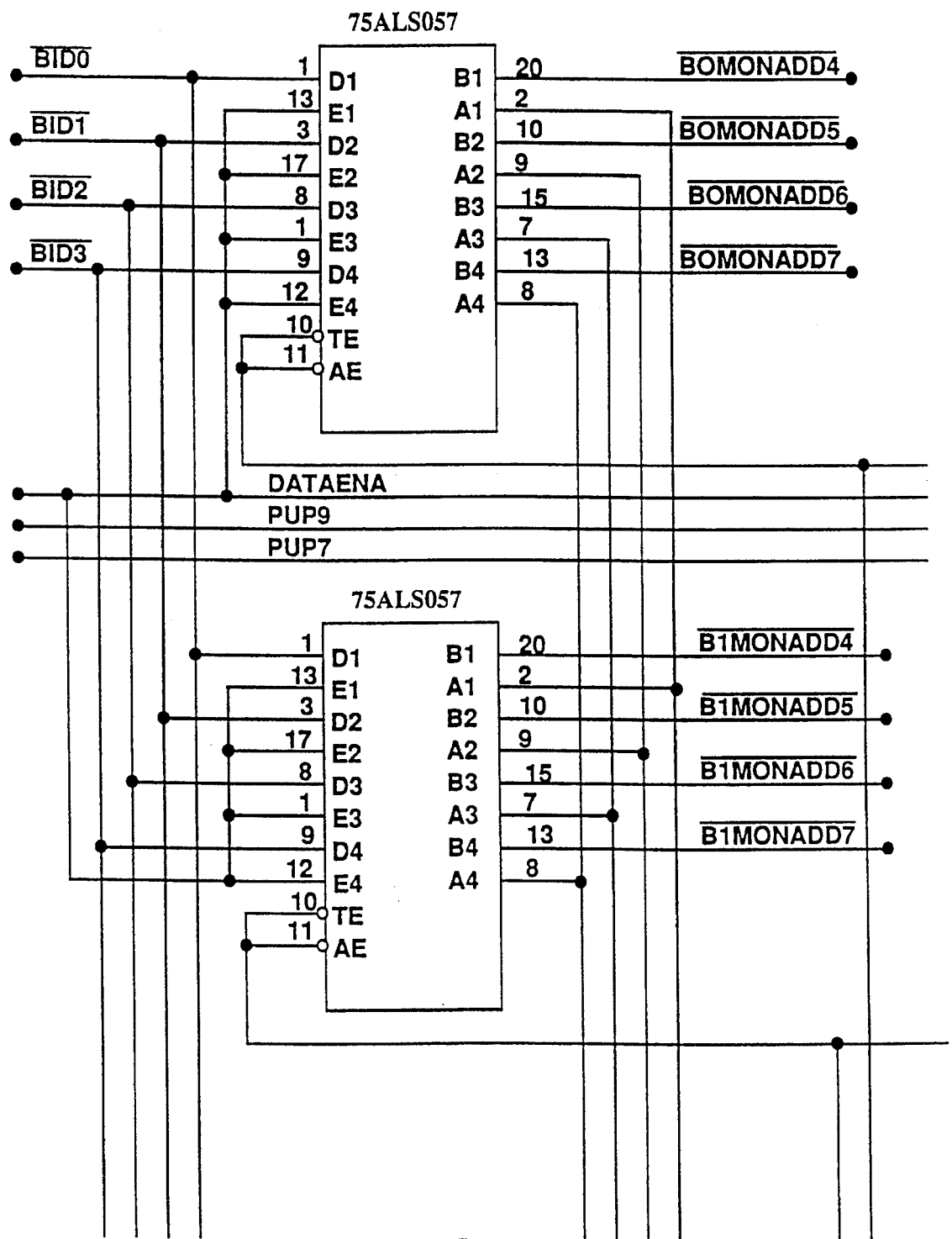
FIGS. 4A, 4B, 4C, 4D, 4E and 4F are a schematic representation of the module switching for three switching channels.
Figure 4B:
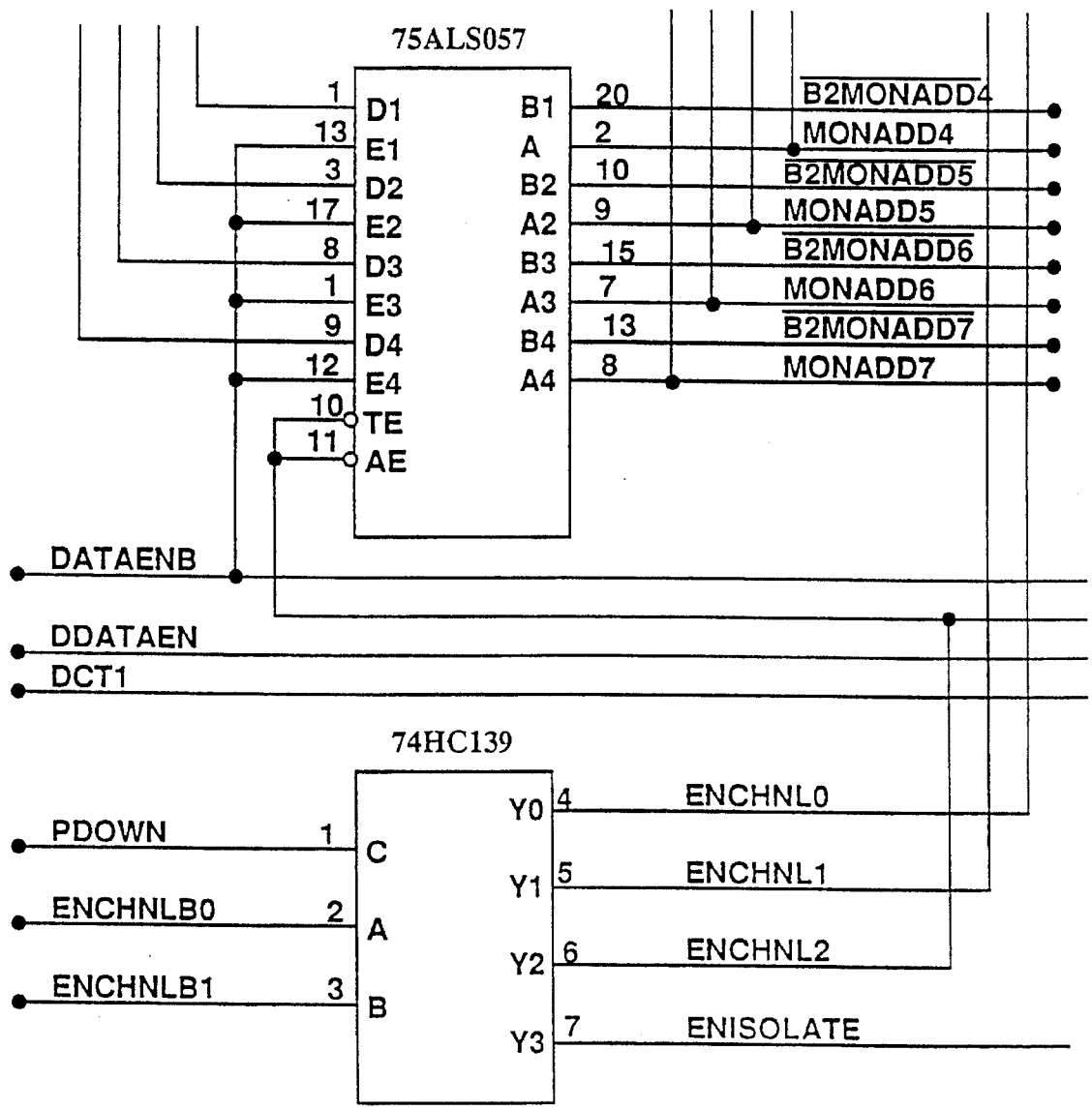
Figure 4C:
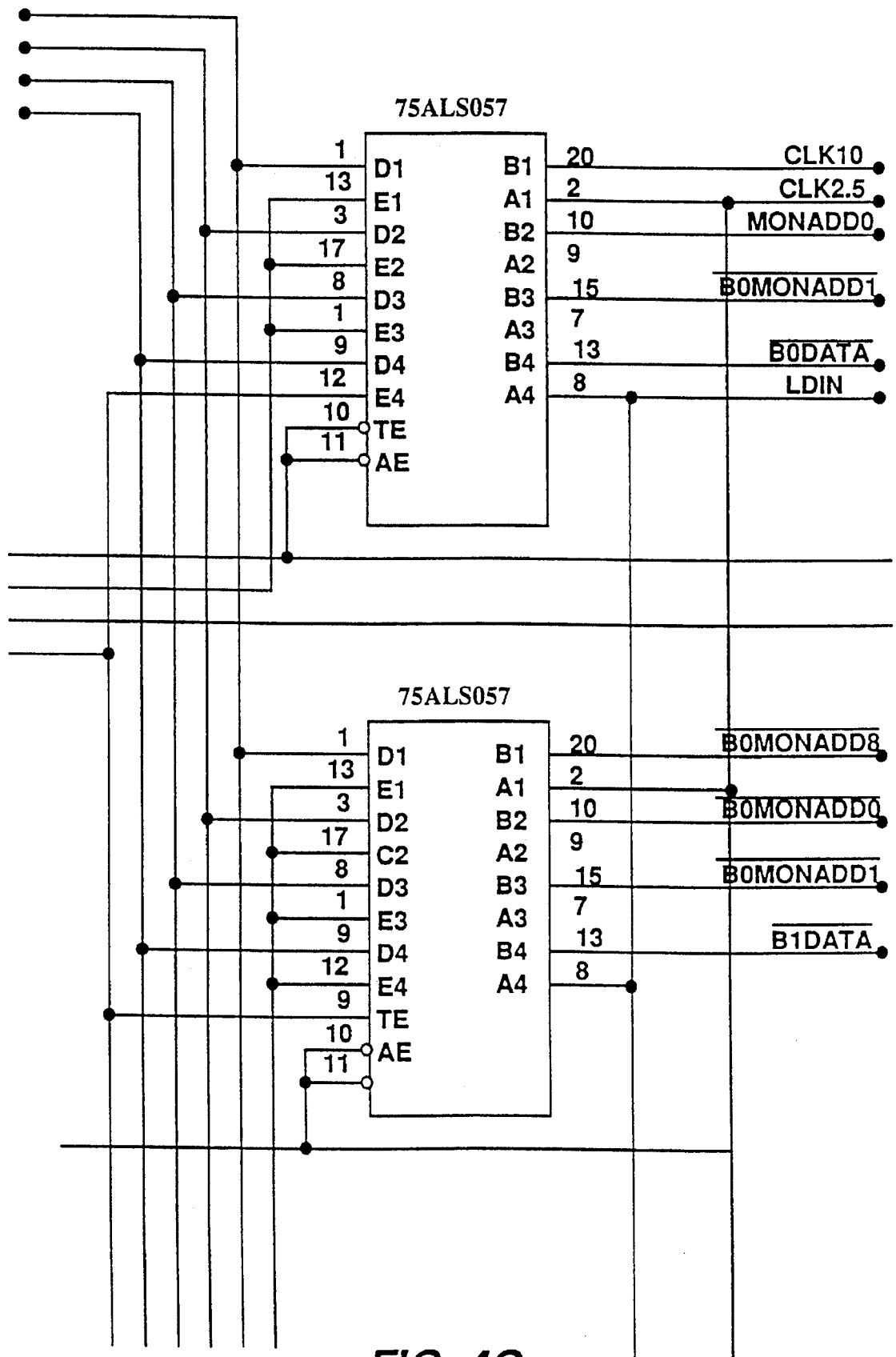
Figure 4D:
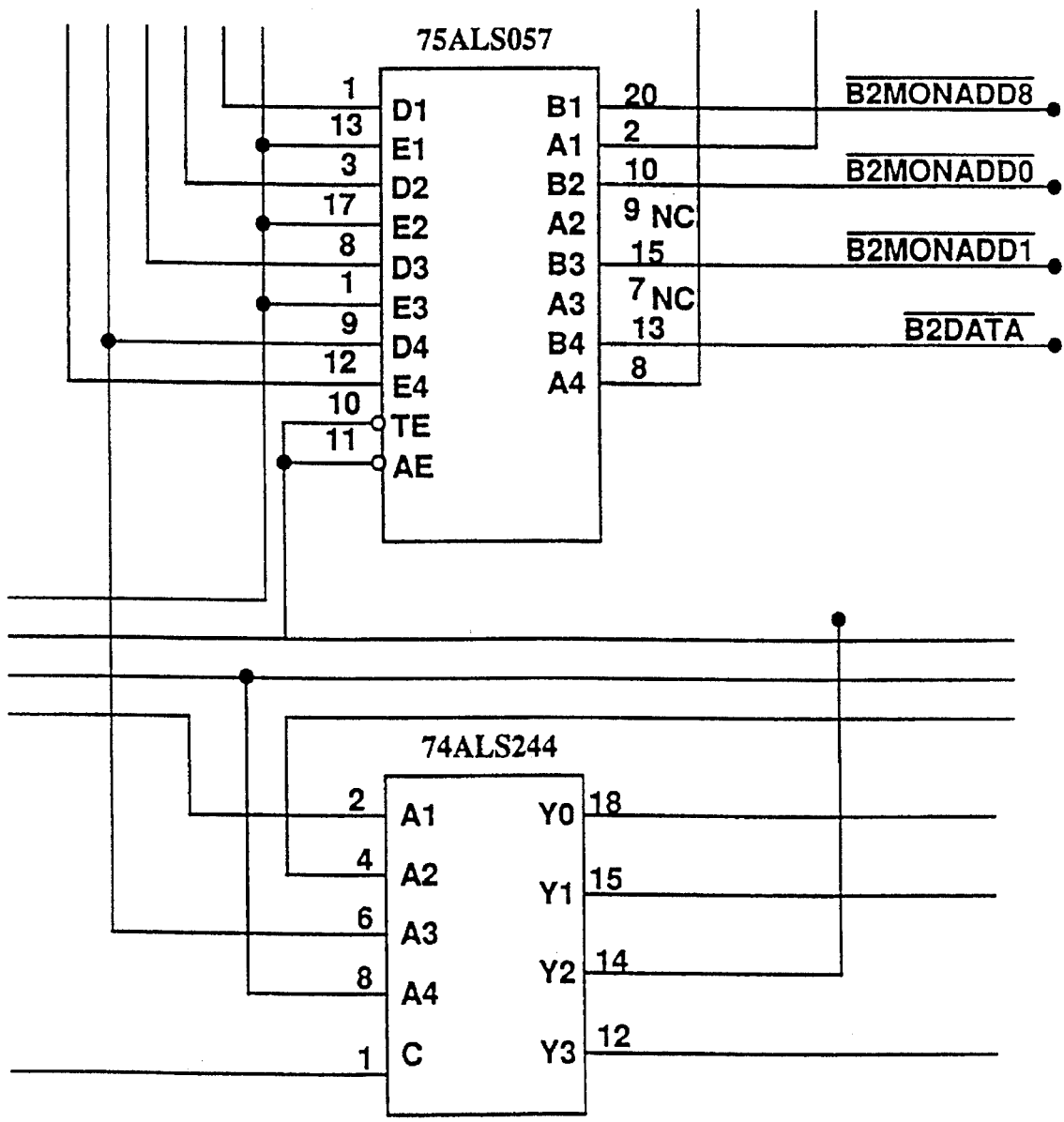
Figure 4E:
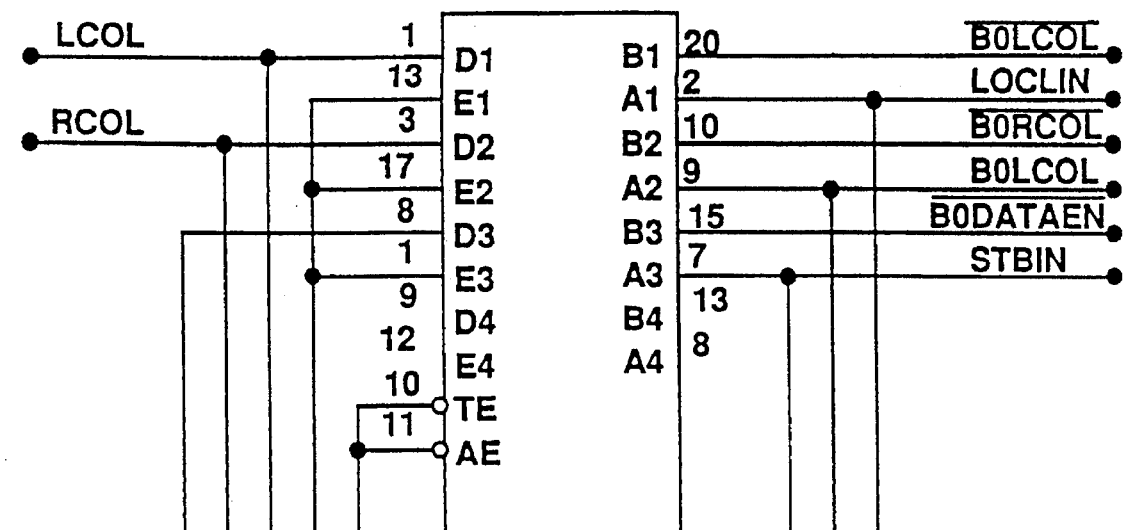
Figure 4E:
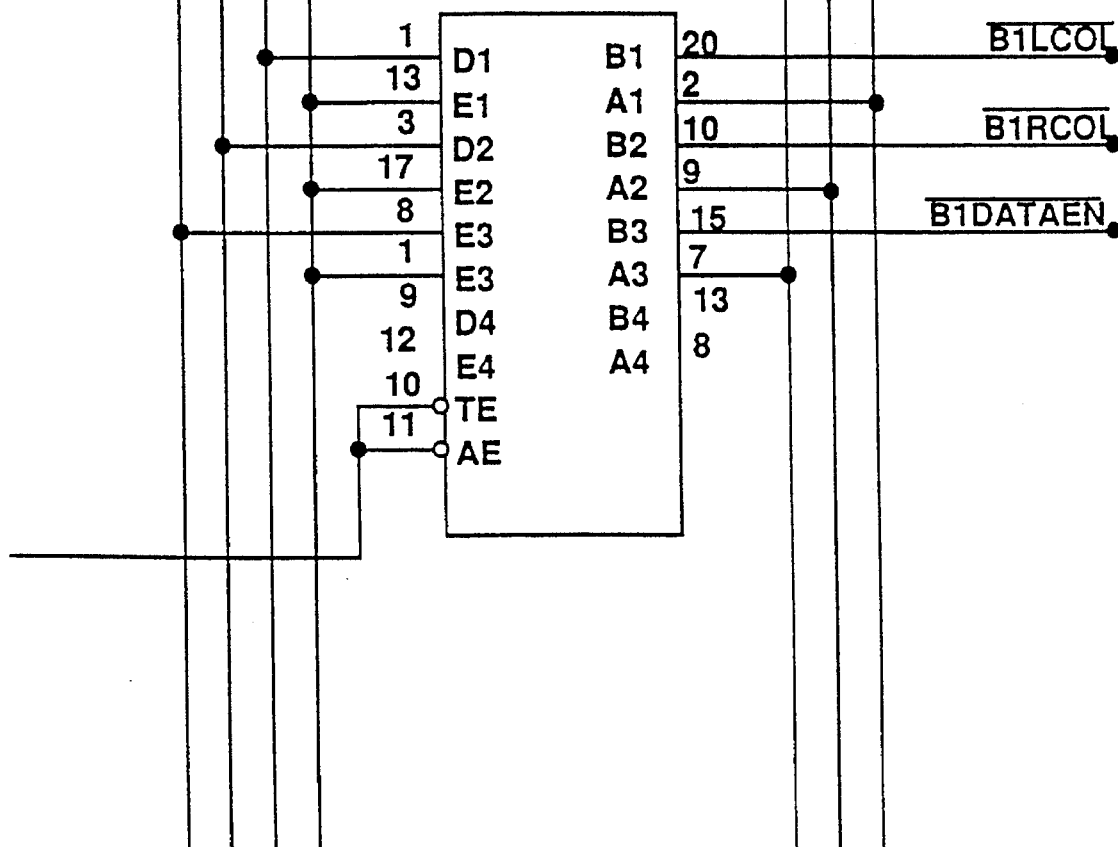
Figure 4F:
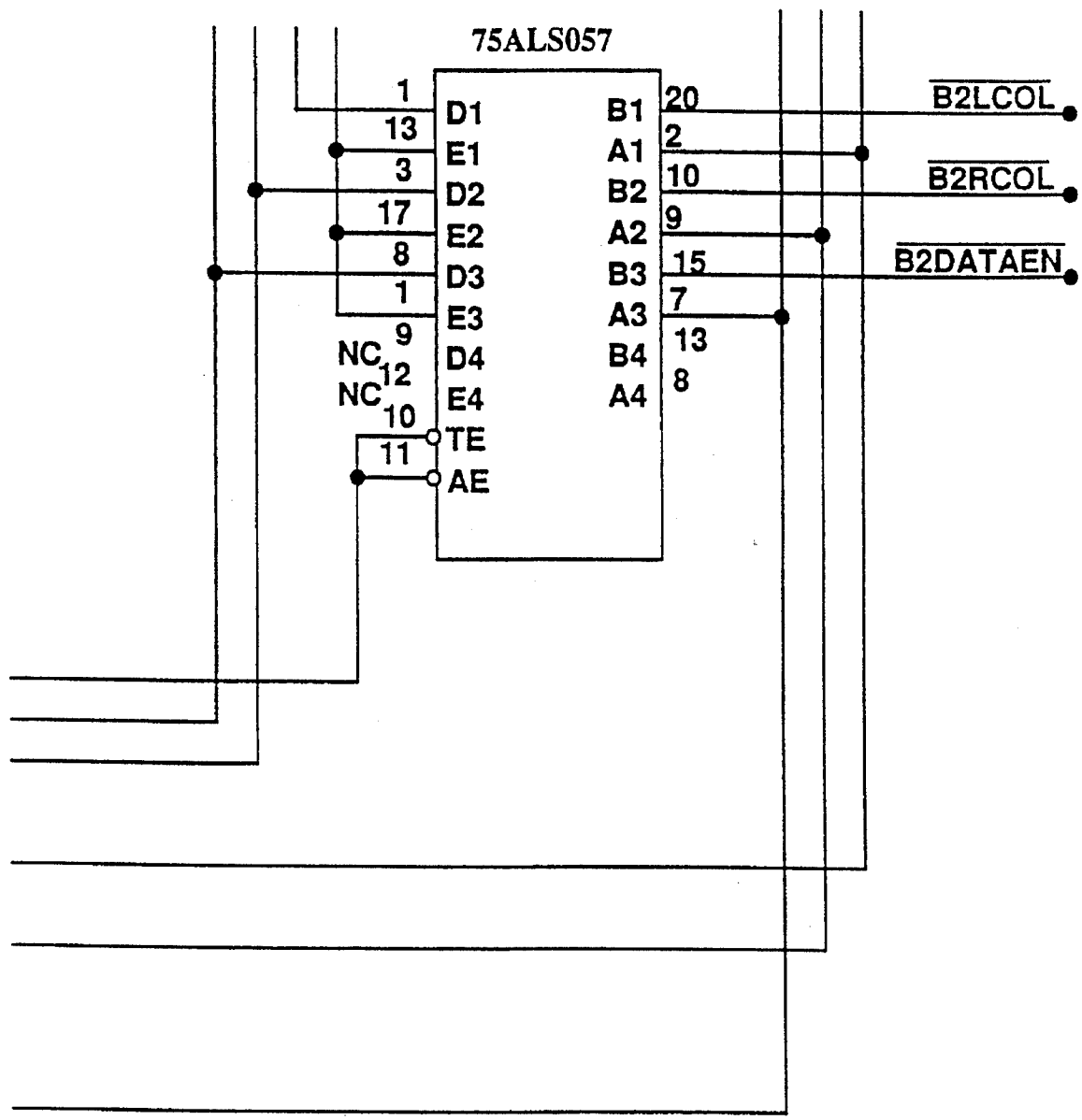

FIG. 3 shows a schematic representation of the backplane bus of the concentrator 10.

Three generic channels are provided designated 112, 114, and 116. Each of the generic channels 112, 114, and 116 are connected to a plurality of IAN management cards or management modules 118, media distribution cards or modules 120, and bridging and routing modules 122 and 124 for communication between channels (and between networks of different protocols). Also configured in the network architecture are plural power supply power modules 126 and a control module 128.

Generic channels 112, 114 and 116 or LAN Channel A,B,C provide a generic multichannel backplane.

The media distribution modules 120 are LAN media connection cards that implement a particular protocol. The modules 120 include ports 119 for connection to a specific medium 121.

The bridging and routing modules 122, 124 are store-and-forward devices that either convert one protocol to another, filter (receives all transmissions from one port, and selectively transmits to another port), or both.

The control card 128 implements a central system function of the LAN system according to the invention.

The LAN management cards 118 are Network Management cards that integrate the function of prior art hub management cards and LAN-specific management cards.

According to the invention, the backplane bus generally designated 100 consists of 96 lines (common wires). Of these 96 lines, 42 of them are allocated to a common channel used for global maintenance functions and power distribution. The remaining 54 lines are logically divided into three generic channels of 18 lines each. Each of these channels provides all the functionality of a single backplane bus as implemented in the prior art.

The limits of the specific implementation (three Generic Data Channels of 18 lines each) are somewhat arbitrary. In principle, according to the invention, channels of any number could be supported on a single backplane bus.

The channels 112, 114 and 116 are not dedicated to a particular access method, packet format or data rate; rather, they are provided to the users as generic data channels. Each channel 112, 114 and 116 may be used to provide a single protocol; the assignment of the protocol to one of the channels 112, 114 and 116 may be changed arbitrarily at any time (presuming agreement among all users of the channel).

Table 1 shows a table of pin assignments of a specific implementation of the generic multichannel architecture on the concentrator backplane according to the invention. The slots of the concentrator 10 (for example 17 slots receiving 17 different modules) are provided such that each slot connects a module to the entire backplane bus or in the preferred embodiment to each of the 96 lines (common wires). Table 1 shows the definition of each of the 96 lines. As can be seen from Table 1, lines 13 through 29 provide channel #1 or channel A. Lines 54 through 61 and 86 thorough 93 provide what is listed as channel #2 or channel B whereas line 67 through 84 provide channel 0 or channel C.

TABLE 1

Signal Name or Definition for Each Line

| Row 1 | Row 2 | Row 3 |
|---|---|---|
| SIGNAL DEFINITION: | | |
| 001 +12 v(EXTENDED) | 0033 +12v (EXTENDED) | 0065 −5v(extended) |
| 002 −12V (extended) | 0034 GND (extended) | 0066 GND (extended) |
| 003 ^BCLK10*(in) | 0035 BUP+5V | 0067 ^Ch#0−S0 |
| 004 BID0 (local) | 0036 BUP−5V | 0068 ^ Ch#0−S13 |
| 005 ^BCLK10(in) | 0037 ^Ch#L−S17 | 0069 ^Ch#0−S1 |
| 006 BID1 (local) | 0038 BUP−L2V | 0070 ^Ch#90−S14 |
| 007 ^BCLK20 (in) | 0039 ^Sys−U0 (unassigned) | 0071 ^ Ch#0−S2 |
| 008 BID2 (local) | 0040 ^Sys−U1(unassigned) | 0072 ^Ch#0−S15 |
| 009 ^BCLK8*(in) | 0041 BBUSO | 0073 ^Ch#0−S3 |
| 0010 BID3 (local) | 0042 BPWRFAIL | 0074 ^Ch#0−S16 |
| 0011 ^BCLK4*(In) | 0043 BPWRO | 0075 ^Ch#0−S4 |
| 0012 BID4(local) | 0044 BPWRL | 0076 ^Ch#−S017 |
| 0013 ^Ch#1−S0 | 0045 ^Ch#2−S17 | 0077 ^Ch#0−S5 |
| 0014 ^CH#1−S1 | 0046 +BCLK16Hz(in) | 0078 ^Ch#0−S6 |
| 0015 ^Ch#1−S2 | 0047 +BNMMACT* | 0079 ^CH#0−S7 |
| 0016 ^ Ch#1−S3 | 0048 +BTESTLED* | 0080 −Ch#0−S8 |
| 0017 ^Ch#1−S4 | 0049 +BNMMSI*(in) | 0081 ^Ch#0−S9 |
| 0018 ^CH#1−S5 | 0050 +BNMMSO*(out) | 0082 ^Ch#0−S10 |
| 0010 ^ Ch#1−S6 | 0051 +BRESET | 0083 ^Ch#0−S11 |
| 0020 ^Ch#1−S7 | 0052 +Sys−U2 (unassigned) | 0084 ^Ch#0−S12 |
| 0021 ^Ch#1−S8 | 0053 BPWRGDO | 0085 ^Ch#2−S0 |
| 0022 ^Ch#1−S9 | 0054 ^Ch#2−S9 | 0086 ^Ch#2−S1 |
| 0023 ^Ch#1−S10 | 0055 ^Ch#2−S10 | 0087 ^Ch#2−S2 |
| 0024 ^Ch#1−S11 | 0056 ^Ch#2−S11 | 0088 ^Ch#2−S3 |
| 0025 ^Ch#1−S12 | 0057 ^Ch#2−S12 | 0089 ^Ch#2−S4 |
| 0026 ^Ch#1−S13 | 0058 ^Ch#2−S13 | 0090 ^Ch#2−S5 |
| 0027 ^ Ch#1−S14 | 0059 ^Ch#2−S14 | 0091 ^Ch#2−S6 |
| 0028 ^Ch#1−S15 | 0060 ^Ch#2−S15 | 0092 ^Ch#2−S7 |
| 0029 ^Ch#1−S16 | 0061 ^Ch#2−S16 | 0093 ^Ch#2−S8 |
| 0030 12VFAILSAFE | 0062 BUP+12V(Sense only) | 0094 12VFAILSAFE |
| 0031 GND (extended) | 0063 GND(extended) | 0095 GND (extended) |
| 0032 +5V (extended) | 0064 +5V(extended) | 0096 +5V (extended) |

Hub backplane terminations for BTL (Row #1, #2, #3)

The remaining lines are used to provide common service to all modules. These are power and grounds, central management channel, unique slot identifications (Slot-ID), and various system clocks. Some are high speed signals implemented in Bus Transceiver Logic, (BTL), technology logic levels and some are DC or slow speed signals implemented in CMOS compatible logic levels. These signals do not provide any specific function of a LAN implementation but provide services for the concentrator and its management.

Lines with the "^" symbol are terminated for "BTL". The "+" symbol designates CMOS (complimentary metal oxide semiconductor, see number 5) compatible logic levels, and all backplane signals have "B" as a prefix. Signals which are indicated with the designation * are "active low" lines.

| | |
|---|---|
| BNMMACT* = | Managment module present signal |
| BID0−4 = | Slot ID (5 bits; binary: "0"=gnd, "1"= 5V) |
| BMONADD* = | port address (5 MSB's− slot address, 4 LSB's −port #, all open collector) |
| BNSMI* = | serial transmit line (open collector on ALL modules except NMM |
| BNMMSO* = | serial transmit line (open collector on NMM) |
| BCLK20 = | 20 MHz clock from ControlCard |
| BCLK8 = | 8MHz clock from ControlCard |
| BCLK10 = | 10 MHz clock from ControlCard |
| BCLK10* = | 10 MHz clock (inverted) from ControlCard |
| BRESET = | High True (When High, reset is asserted). High only when controlled isNOT present (or when INVOKED by ControlCard) |
| Local = | slot specific (i.e. coded on backplane) |
| Out/In = | (Output/Input) relative to modules (excluding NMM) |
| Extended = | Module edge connector pin that is an MFBL type pin (Make Rist, Break Last) |

Each of the users of the backplane bus may elect to transfer data on one or more of the channels 112, 114 and 116 simultaneously. Users offering multiple external interfaces (each providing a particular corresponding protocol) may logically assign these interfaces to any channel, without restrictions on combinations.

MODULE SWITCHING TO ANY CHANNEL

With the use of Module Channel Switching, users can create a logical network configuration independent of physical network placements.

Module switching is made possible by the generic multichannel architecture. Module switching is accomplished by controlling connections from circuits that control a particular protocol to a particular channel. For example, an Ethernet™ type module is connected to a particular backplane channel by its local collision detection and data handing circuits. Although only one path to a channel is active, paths to all the channels to be used need to be present to accomplish the module switching.

FIG. 4 is a module switching schematic which shows an encoded signal representing the selected active channel. Four possible combinations of the signal can be selected for the generic channels A, B, C, or for the isolated mode. All the other signals represent specific implementation of Ethernet™ protocol on a generic channel.

Input signals BID<4:0> represent the Slot-ID read by the module. Input signals ADD<1:0> represent the Port-ID generated by the module denoting the active port ID.

Input signals DDATA and DDATAEN represent the actual data and the data enable, respectively, delayed by one clock cycle. The input signal DATAEN represents non-delayed. DDATAEN signal.

The input signal DGT1 represents the condition when more than one port is active. This denotes the sole collision condition when a module is in isolated mode and acts as an independent and isolated LAN.

The input signals LCOL and RCOL represent local collision and remote collision conditions, respectively.

The output signals BxMONADD<8:0>, BxDATA, BxDATAEN, BxLCOL, and BxRCOL, where 'x' represents the number of channels, are signals driven onto the backplane with BTL logic levels. The source for these outputs are common to all. By the means provided by the following signals ENCHNLB0-1, only the selected channel is activated.

The input signals ENCHNLB<1:0> represent the selected channel (one of Channel 0, 1,2 or Isolated) in binary encoded form. The decoder U66 translates these encoded signals to generate ENCHNLO3 and ENISOLATE output signals. These output signals enable respective channels for LAN communications. The modules switch channels by controlling the connections to each channel through these signals.

Output signals to the backplane are routed by the way of enabling the drivers. All respective inputs from the backplane are connected together through tri-state outputs, effectively multiplexing inputs from the active channel only.

Figure 5A:
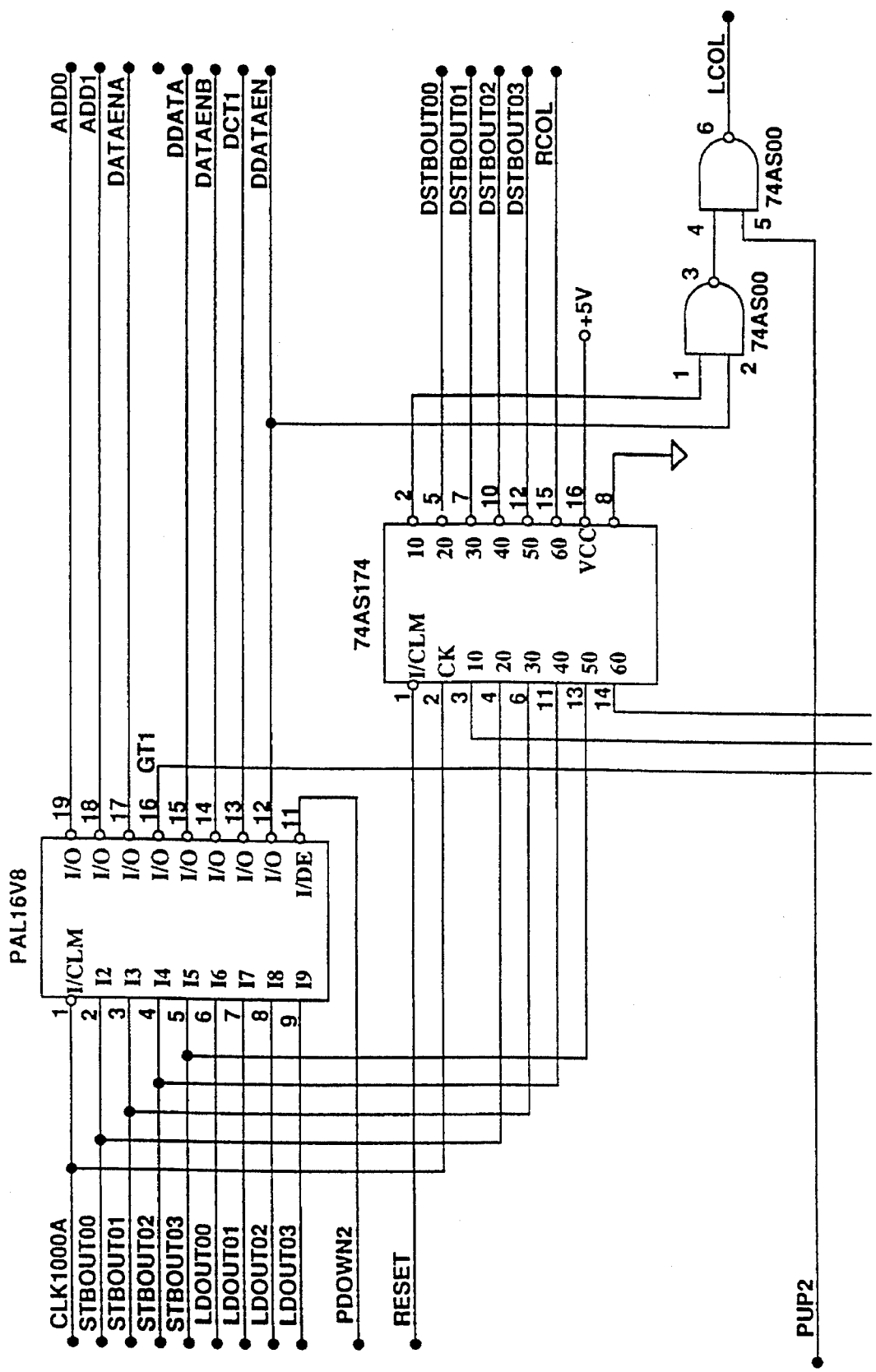
FIG. 5A and FIG. 5B are a schematic representation of the module switching for the Ethernet™ channel.
Figure 5B:
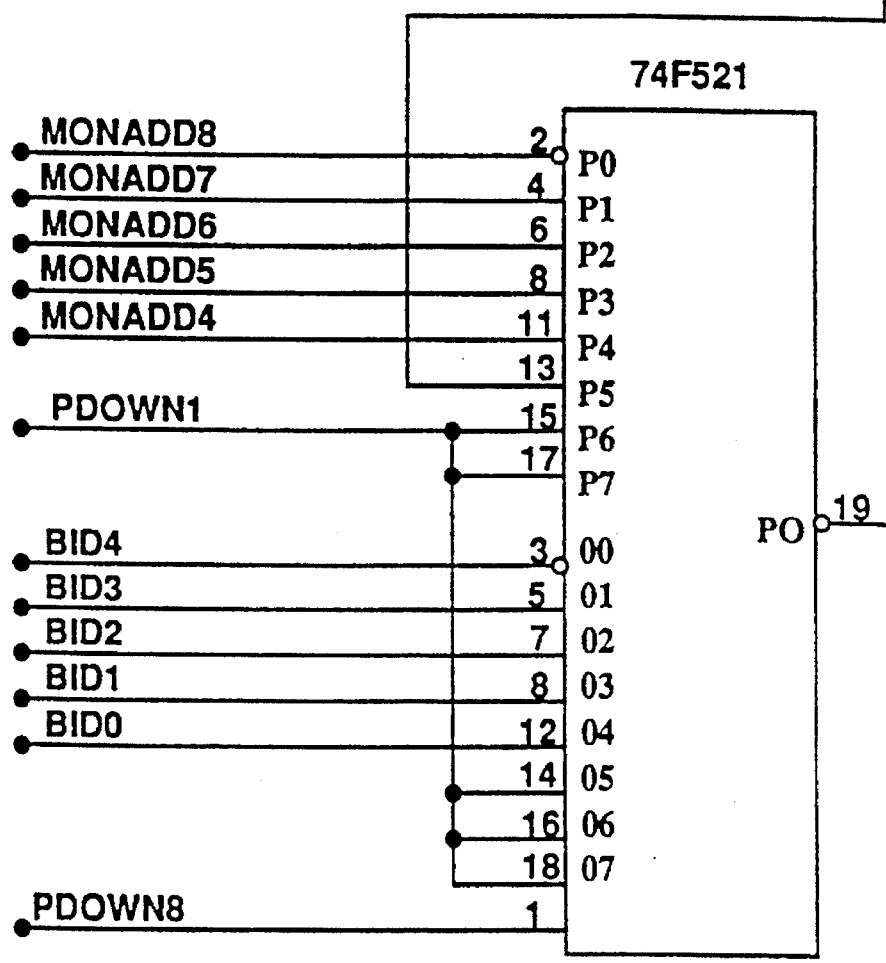
Figure 5B:
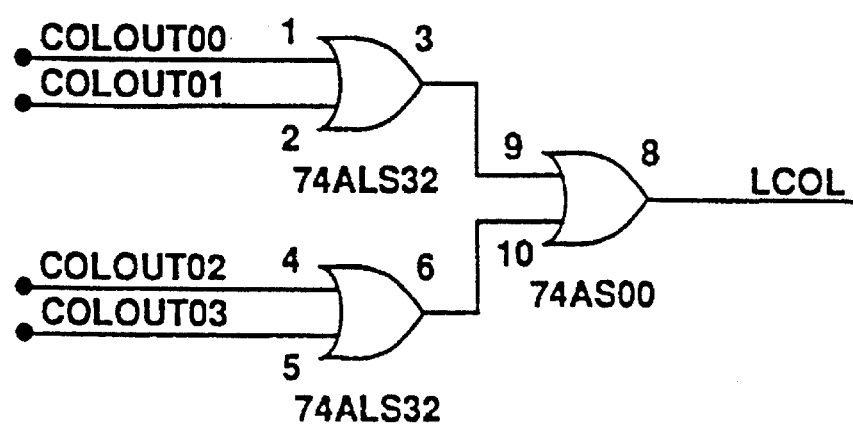

FIG. 5 shows a programmable logic device U47 and a logic circuit for a particular protocol, Ethernet™, that switches modules to any channels.

The input signals STBOUT <03:00> and LDOUT<03:00>, are data enable signals and data output signals, respectively, and represent LAN data from ports. In this case, there are four sets of signals for a four port implementation. The input signals MONADD<8:4> represent the active module Slot-ID and the input signals BID<4:0> represent the module Slot-ID. They are compared by U11 which produces an output (pin 19) that is active when they differ. This is the means for detecting collision using Slot-ID. When more than one port is active at the same time, U47 generates the output signal GT1 which forces the output of the U11 to become active. When the output of the U11 becomes active, a collision is detected. The output LCOL is generated from U69 which is delayed by one clock cycle. The signals COLOUT<03:00> are all logically ORed together to produce RCOL, which is delayed through U69. The RCOL signal, when it is asserted, represents a remote collision that occurred elsewhere and is received by a single port. The outputs ADD<1:0> are generated by U47 which denote the active Port-ID. The outputs DSTBOUT<03:00> are generated from U69 which delays the inputs STBOUT<03-00>. For the programmable logic device U47 a DATAEN signal is generated when any of the STBOUTs is active. This logic device U47 also "OR's", together the LDOUTs to generate the DATA signal going to the backplane. In addition, this logic device generates that the signal port 1 is invalid. Table 2 below shows the module switching for the Programmable array logic implementation of the Ethernet™ portion of the system.

TABLE 2

```
047 DEVICE 'p16VER
     CLK =        .C.;
     z =          .Z.;
     x =          .X.;
" Inputs
     stbout0      pin 2;
     stbout1      pin 3;
     stbout2      pin 4
     stbout3      pin 5
     stbout0      pin 6;
     stbout1      pin 7;
     stbout2      pin 8;
     stbout3      pin 9;
     clk10        pin 1;
" Outputs
     dataena      pin 17;
     dataenb      pin 14;
     monadd0      pin 19;
     monadd1      pin 18;
     gt1          pin 16;
     dgt1         pin 13;
     ddout        pin 15;
     ddataen      pin 12;
equations
     ddataen :=   stbout0 # stbout1 # stbout2 # stbout3;
     dataena =    stbout0 # stbout1 # stbout2 # stbout3);
     dataenb =    (stbout0 # stbout1 # stbout2 # stbout3);
     monadd1 =    stbout2 # stbout3;
     monadd0 =    stbout1 # stbout 3;
     gt1 =        (stbout0 & stbout1) # (stbout0 & stbout2) #
                  (stbout0 & stbout3) # (stbout1 & stbout2) #
                  (stbout1 & stbout3 # (stbout2 & stbout3);
     dgt1 :=      (stbout0 & stbout1) # (stbout0 & stbout2) #
                  (stbout0 & stbout3) # (stbout1 & stbout2) #
                  (stbout1 & stbout3) # (stbout2 & stbout3);
     ddout :=     (!!dout0 & stbout0) # (!!dout1 & stbout1)#
                  (!!dout 2 & stbout2) # (!!dout3 & stbout3);
```

Table 3 below lists the test vectors for the programmable array discussed with reference to Table 2 and FIG. 5.

TABLE 3

```
Test Vectors
     ([clk10, stbout0,stbout1,stbout2,stbout3]→[ddataen,dgt1])
     [ CLK,0,0,0,0]  → [0, 0];
     [ CLK,0,0,0,1]  → [1, 0];
     [ CLK,0,0,1,0]  → [1, 0];
     [ CLK,0,0,1,1]  → [1, 1];
     [ CLK,0,1,0,0]  → [1, 0];
     [ CLK,0,1,0,1]  → [1, 1];
     [ CLK,0,0,1,0]  → [1, 1];
     [ CLK,0,1,1,1]  → [1, 1];
     [ CLK,1,0,0,0]  → [1, 0];
     [ CLK,1,0,0,1]  → [1, 1];
     [ CLK,1,0,1,0]  → [1, 1];
     [ CLK,1,0,1,1]  → [1, 1];
     [ CLK,1,1,0,0]  → [1, 1];
     [ CLK,1,1,0,1]  → [1, 1];
     [ CLK,1,1,1,0]  → [1, 1];
     [ CLK,1,1,1,1]  → [1, 1];
test vectors
     ([stboputD, stbout1, stbout2, stbout3]→
     [dataena, dataenb,gt1,monadd1,monadd0]
     [0,0,0,0]  → [0,0,0,0,0];
     [0,0,0,1]  → [1,1,0,1,1];
     [0,0,1,0]  → [1,1,0,1,1];
     [0,0,1,1,  → [1,1,1,1,1];
     [0,1,0,0]  → [1,1,0,0,1];
     [0,1,0,1]  → [1,1,1,1,1];
     [0,1,1,0]  → [1,1,1,1,1];
     [0,1,1,1,  → [1,1,1,1,1];
     [0,0,0,0]  → [0,0,0,0,0];
     [1,0,0,1]  → [1,1,0,0,0];
     [1,0,0,1]  → [1,1,1,1,1];
     [1,0,1,0,  → [1,1,1,1,0];
     [1,0,1,1]  → [1,1,1,1,1];
     [1,1,0,0]  → [1,1,1,0,1];
```

TABLE 3-continued

```
   [1,1,0,1] → [1,1,1,1,1];
   [1,1,1,1, → [1,1,1,1,1];
test vectors
   ([clk10,1dout0,1dout1,dout2,dout3,
       stbout0, stbout1, stbout2, stbout3] → [d!dout])
   [CLK 1,1,1,1,1,1,1,1] → [0];
   [CLK 0,1,1,1,1,0,0,0] → [1];
   [CLK 0,1,1,0,0,0,0,0] → [0];
   [CLK 1,0,1,1,0,1,0,0] → [1];
   [CLK 1,0,1,1,0,0,0,0] → [0];
   [CLK 1,1,0,1,0,0,1,0] → [1];
   [CLK 1,1,0,1,0,0,0,0] → [0];
   [CLK 1,1,1,1,0,0,0,1] → [1];
   [CLK 1,1,1,0,0,0,0,0] → [0];
   [CLK 0,0,0,0,0,0,0,0] → [0];
```

This inventive arrangement including module switching provides the following improvements over the prior art:

1. A multichannel backplane bus allows multiple protocols to share a common backplane bus, and allows multiple data packets to share the bus at any given time.

2. A generic data channel allows complete flexibility for growth and change. At any time the protocol for a channel may be redefined. As new protocols are developed, a method of supporting the new protocols on the generic data channel can be designed and included. Costly protocol converters are not required.

3. An isolated data channel allows complete independence for isolating any of the modules from the backplane and to continue to operate, simultaneously with the backplane operation.

PORT SWITCHING

Figure 6A:
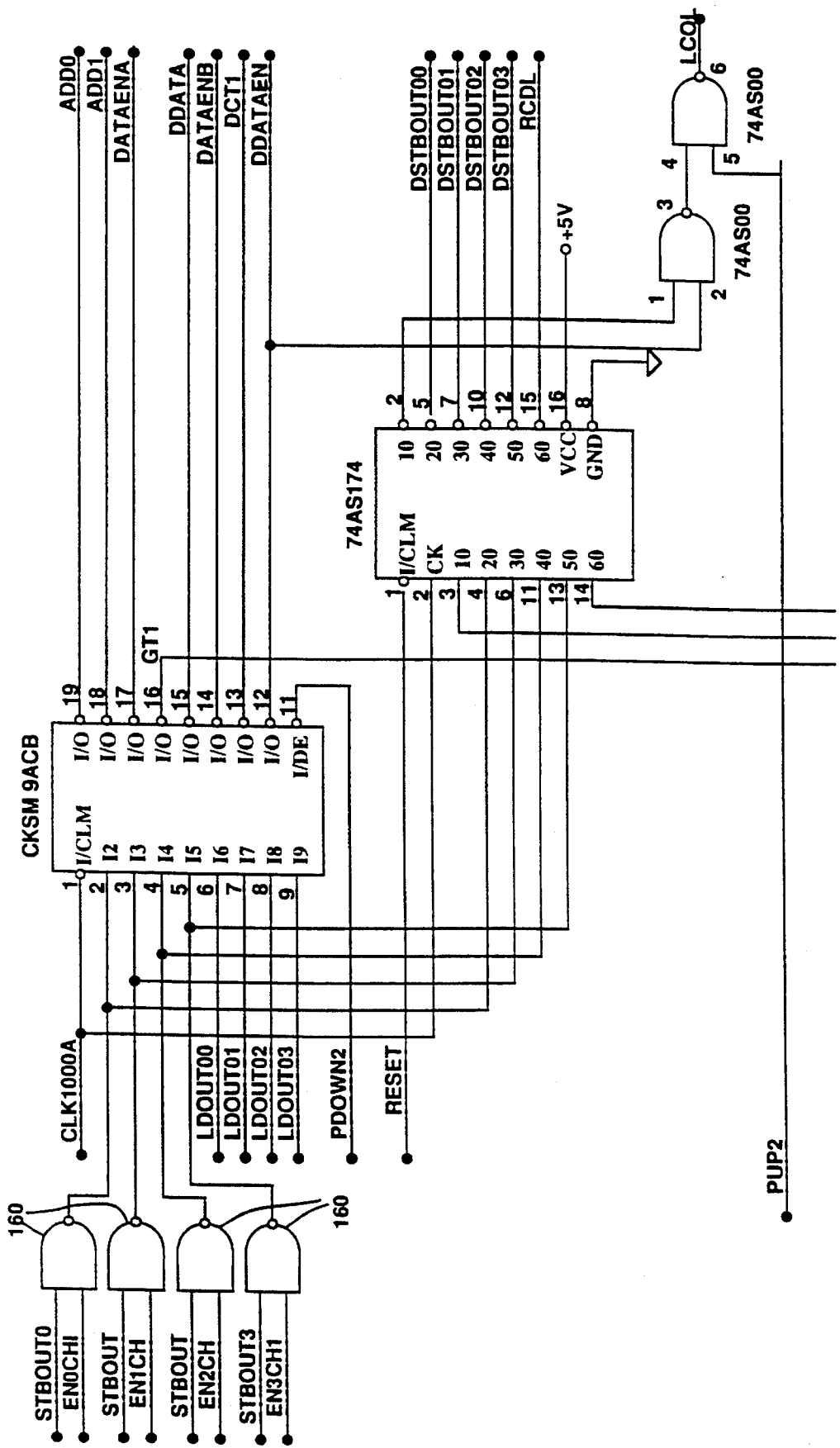
FIGS. 6A and FIG. 6B are a schematic representation of a channel logic for Ethernet™ portswitching.
Figure 6B:
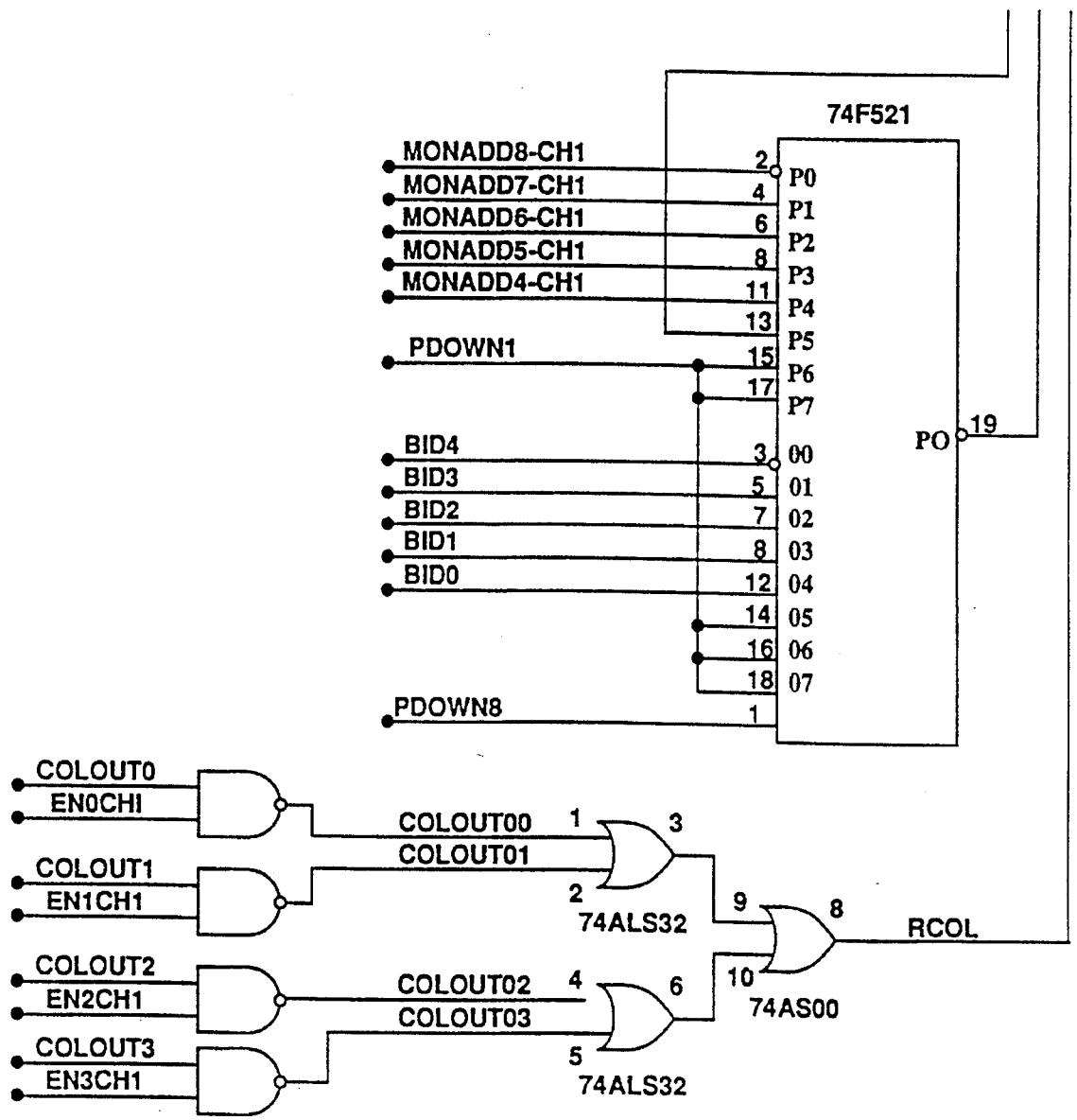
Figure 7A:
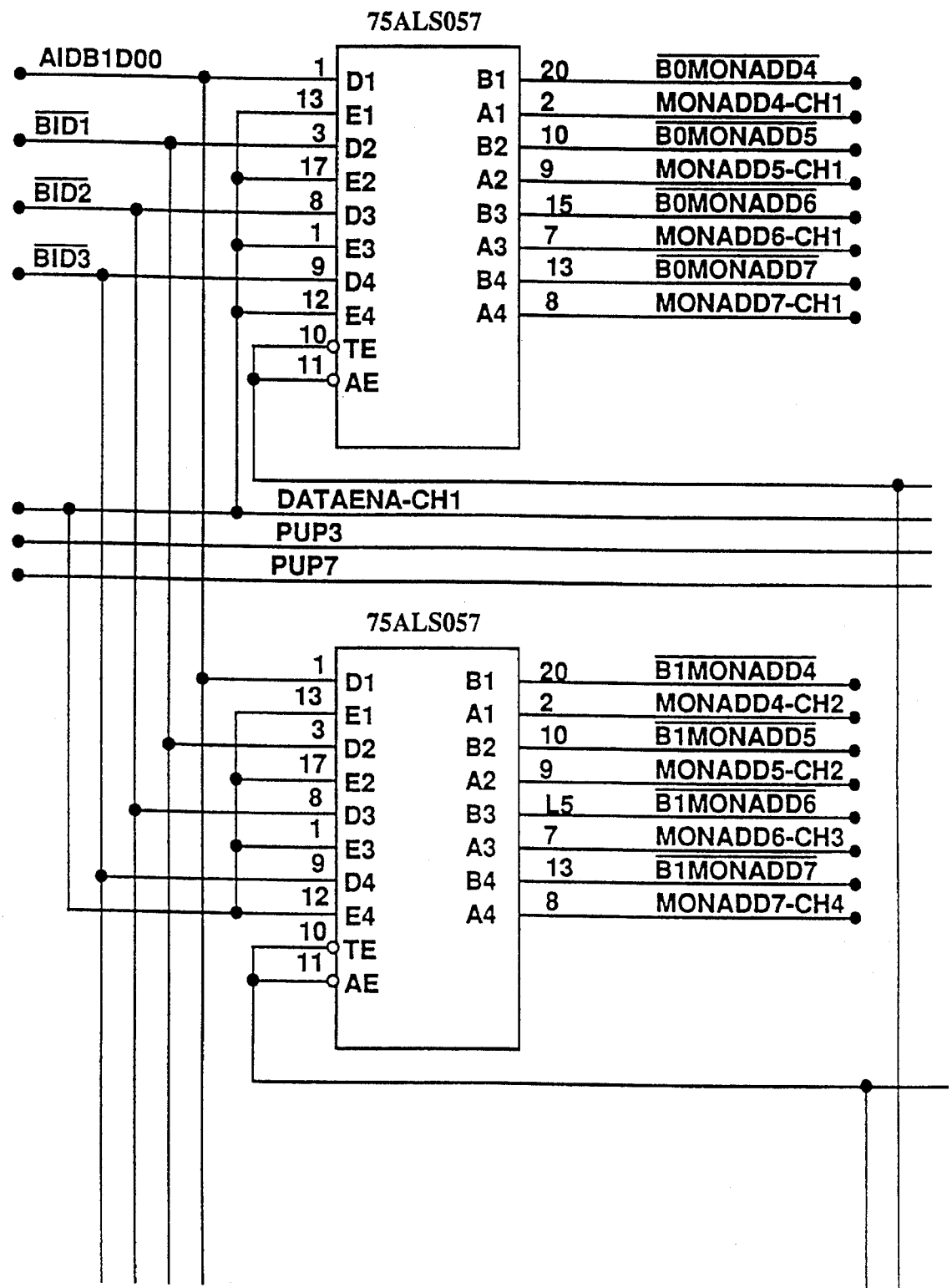
FIGS. 7A, 7B, 7C, 7D, 7E and 7F are a schematic representation of portswitching for a plurality of channels.
Figure 7B:
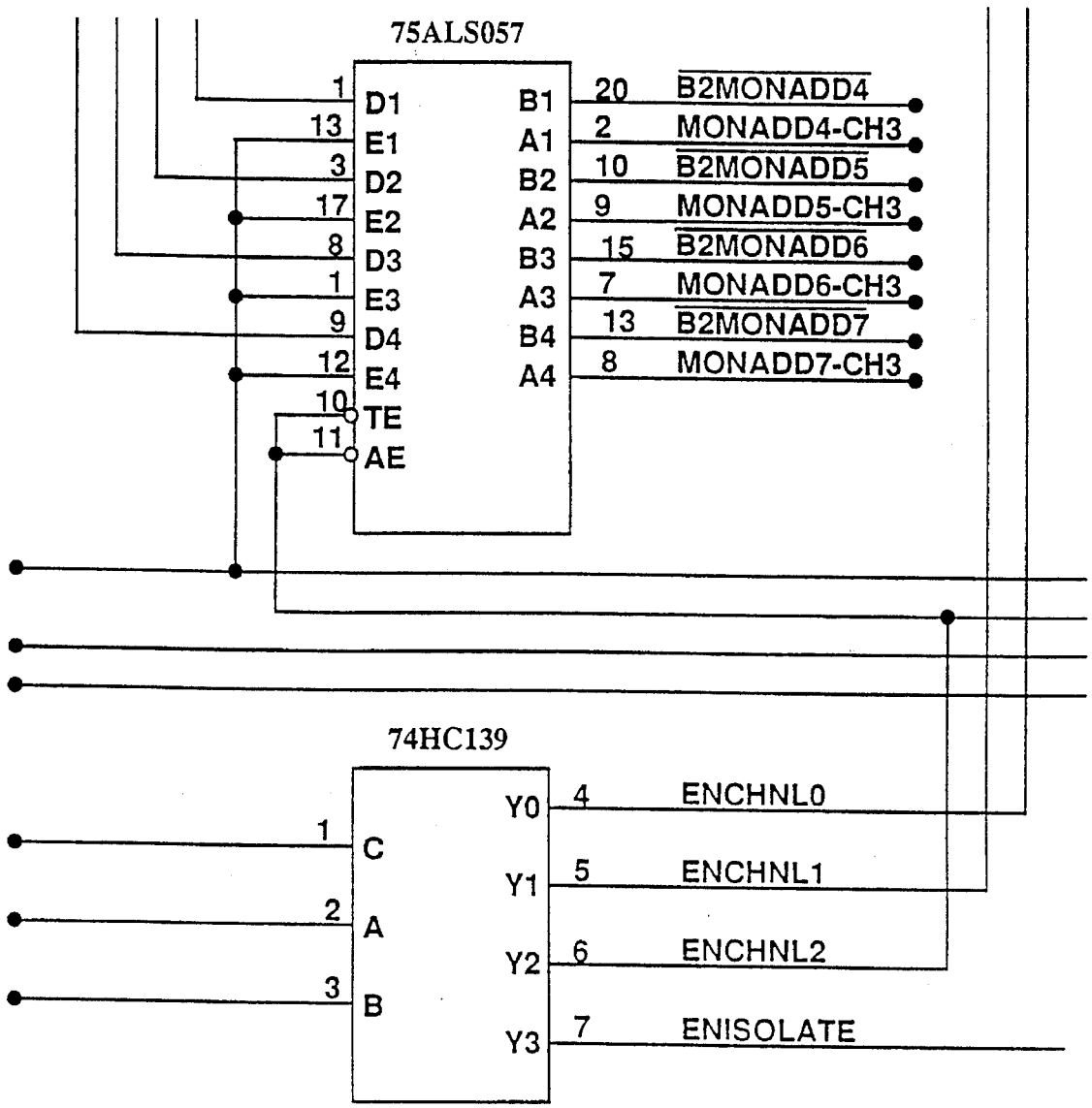
Figure 7C:
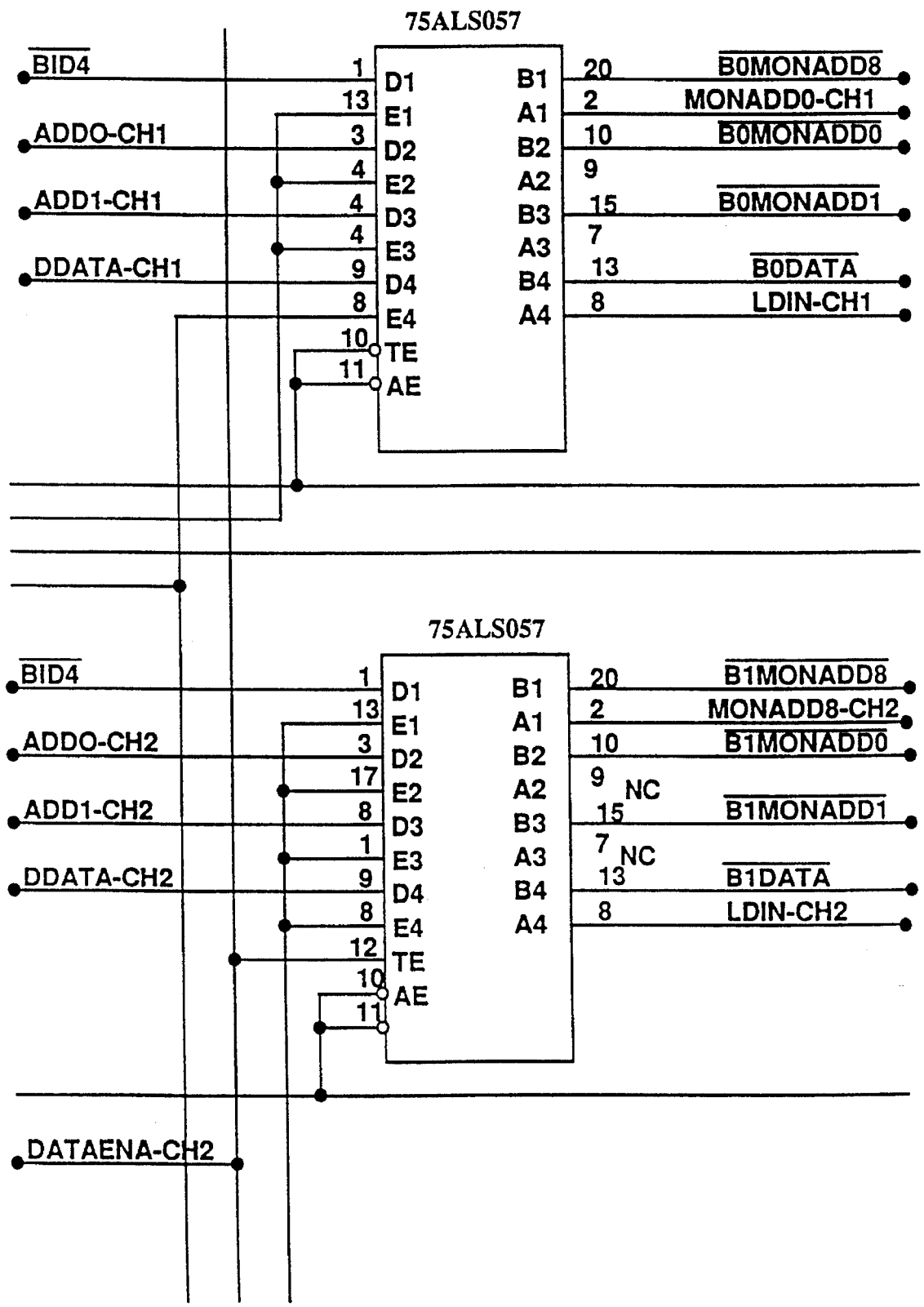
Figure 7D:
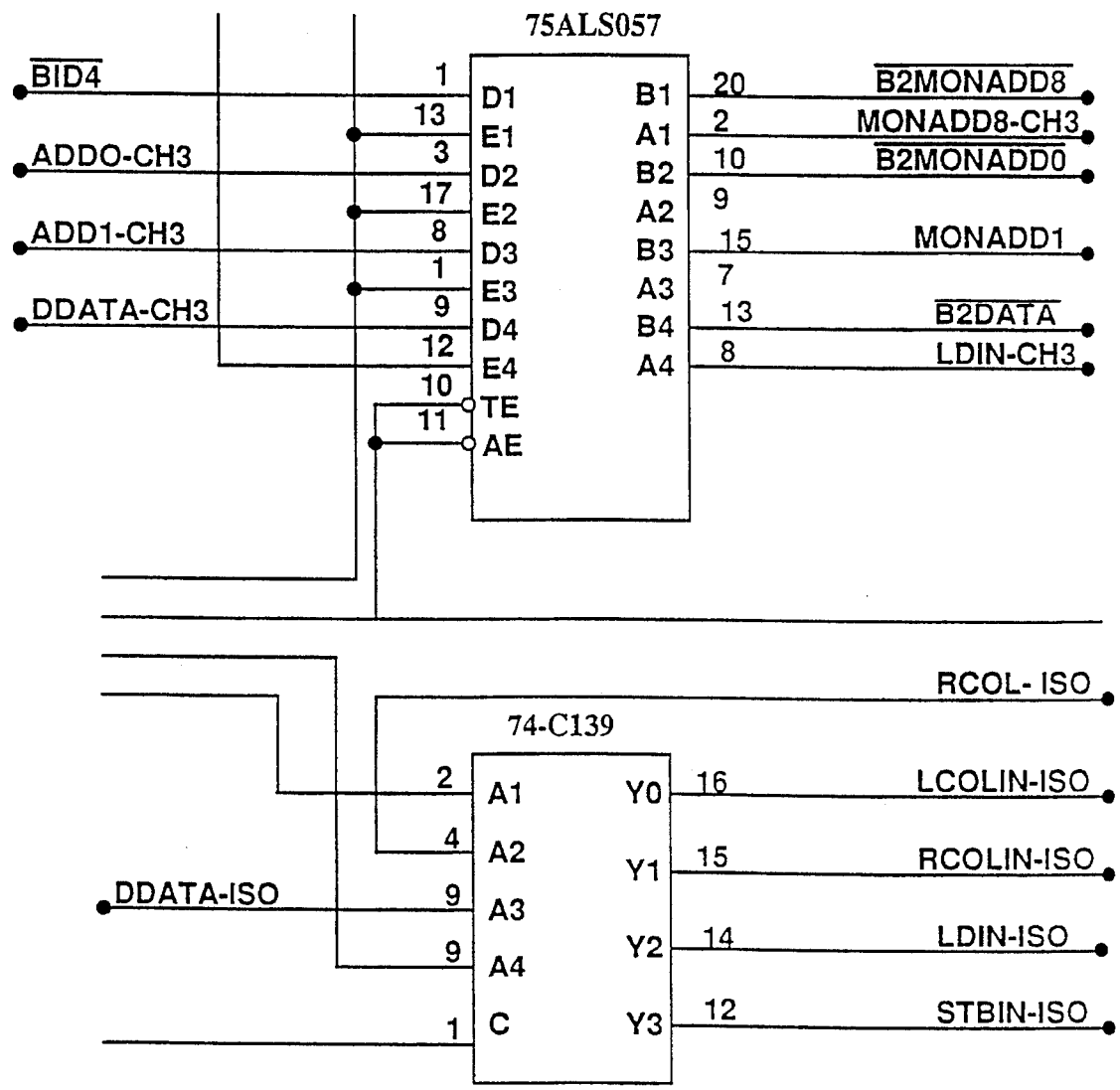
Figure 7E:
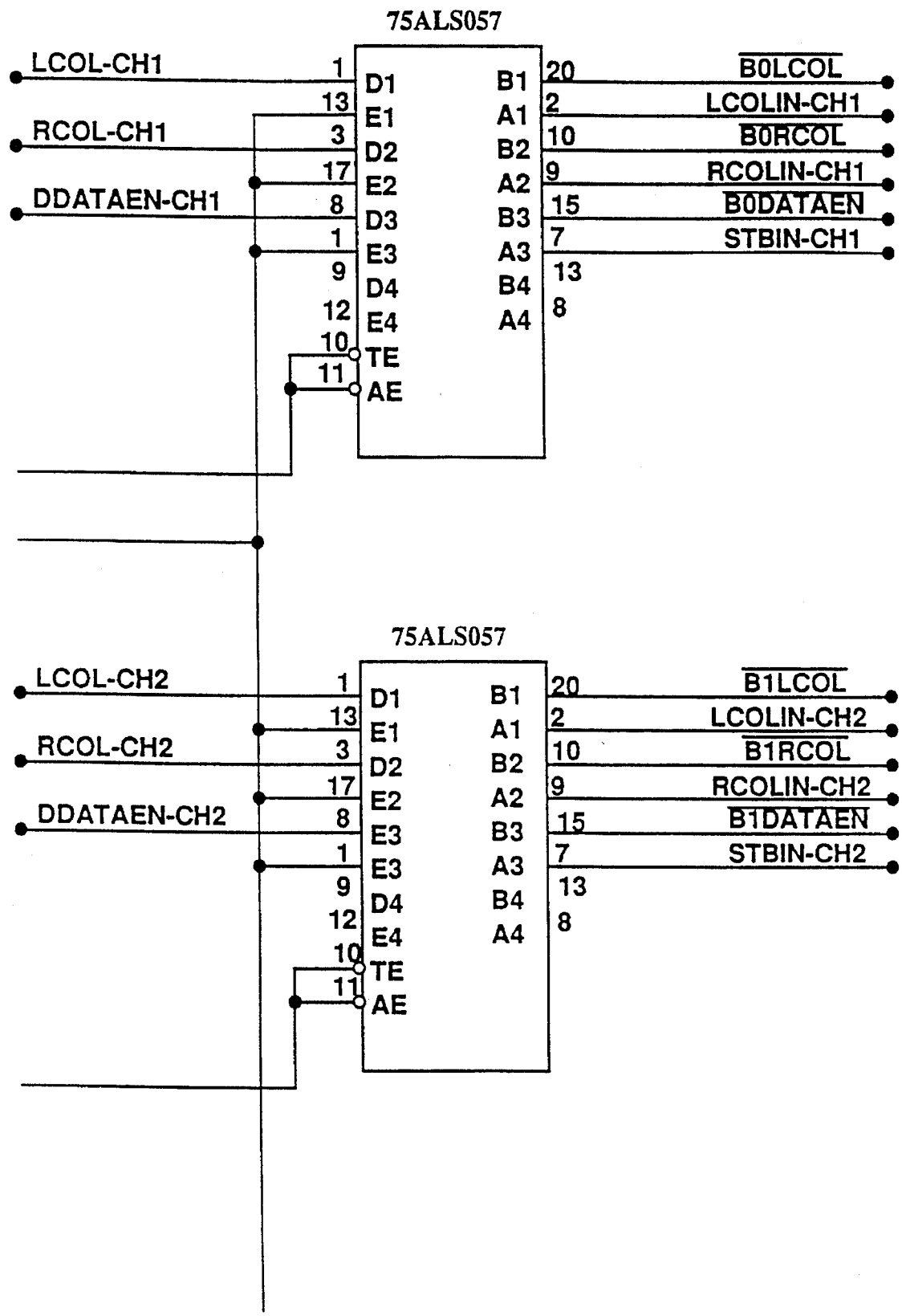
Figure 7F:
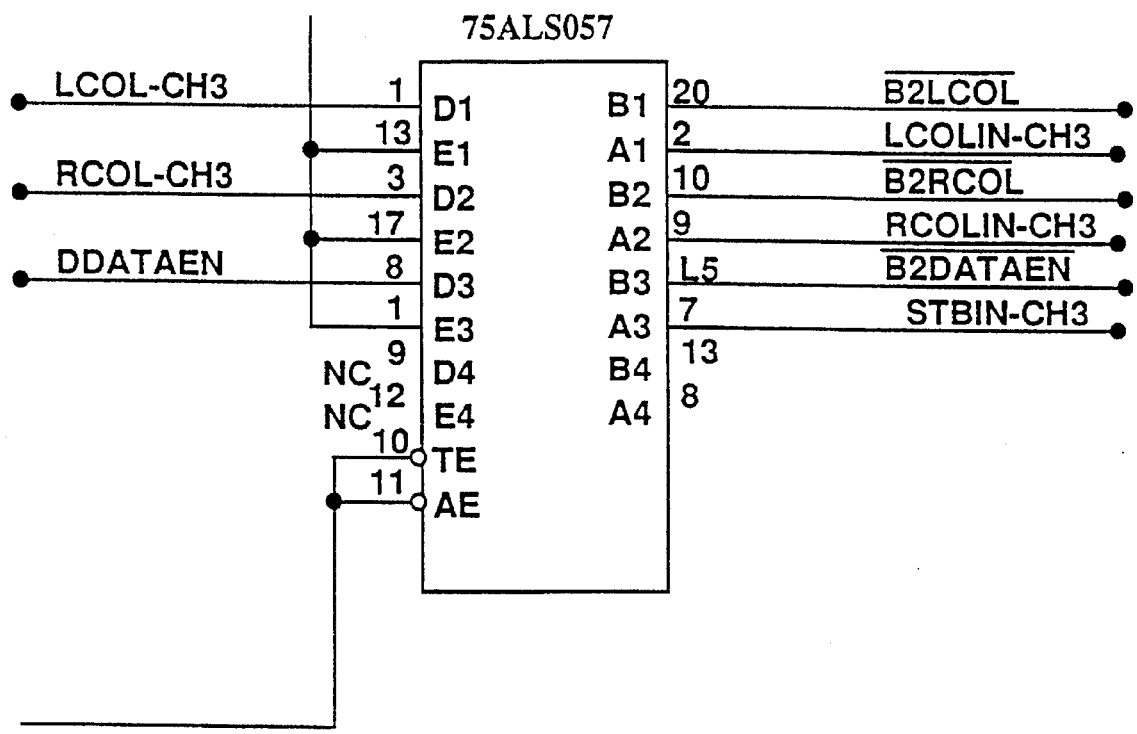

FIG. 6 represents the per-channel logic of channel 1 to explain the per-port switching functions. The per-channel logic for Channels 0, 2 and Isolated can be constructed by replacing CH1 with CH0, CH2, or CHISO. Each input STBOUTxx is qualified by the channel selection signal ENxx CHyy port. Using Channel 1 for example, the signal STBOUT0 qualified by the signal EN0 CH1 signifies that if the port 0 is configured for the channel 1, the output of the logical AND function through 74AS08 will be active. Similarly, COLOUT<03-00> are modified from FIG. 5 to qualify each input for Channel 1 applicability. Except for the notation change, the signals provide the same functions as description of FIG. 5.

FIG. 6 describes per channel logic of a particular protocol, Ethernet™, switching ports from one channel to another. EN0_CH1 EN1_CH1, . . . ENxx_CHyy represent control signals that enable a particular port, xx, for each channel logic yy. The use of the AND gates 160, 74AS08, for multiplexing of the signals from a particular port to a particular channel logic, thereby enables an active data path for the port.

Each module employs a set of bus drivers/receivers per channel, or one set of drivers and electric and/or mechanical switches to all channels. By enabling one of the sets of drivers, or enabling a set of switches to a channel, a module is connected and functional on that particular channel.

The module switching to any channel can be controlled by hardware switches, or software control, or both.

In this particular implementation, three sets of bus drivers/receivers are used. Under software or hardware control, each module is configured to operate on that particular channel.

Each module has hardware switches that initialize the channel selection. The software system can confirm or override that selection.

The modular switching arrangement according to the invention allows:

1. The switching from one generic channel to another and the assigning of a particular LAN or WAN protocol by doing so.

2. The switching from any active channel to isolated mode, and the ability to continue operating independently from any backplane activity.

3. The building of a logical network topology with the use of a generic channel as described above.

4. Using hardware switches and software system control to utilize the logical network.

Each Physical Port Switching to any Channel allows users to connect to a LAN system without any restrictions. Each port is allowed to be configured to any logical channel present in the LAN system. By this invention, the traditional use of "patch-panels", a collection of connectors and cables to manually control physical connections, is obsolete.

Port switching to any channel is accomplished by duplicating the circuits, which control a particular protocol, the same number of times as there are channels (See FIG. 7).

FIG. 7 describes the backplane interface for per-port switching function. Unlike FIG. 4 where all the inputs are common to output signals BxMONADD<8:0>, BxDATA, BxDATAEN, BxLCOL, and BxRCOL, where small 'x' represents the number of channels, each channel has an independent set of input signals produced by respective per-channel logic described in FIG. 6. The suffix 'CH1', 'CH2' etc. are used to distinguish one set of input signals from the others (compared to FIG. 4). The means of enabling and disabling each channel is provided by the signals ENCHNL<2:0> and ENISOLATE to save power from inactive connections. Each protocol circuit owns a path to its own channel. An additional switching function must be performed from a media port to the protocol circuits.

By providing these additional switching circuits from media ports to the protocol circuits, and duplicating protocol circuits, each media port can be configured to switch from one channel to another. A forth protocol circuit is provided to connect ports that are isolated from the backplane. In principal, the number of protocol circuits for isolated ports is not limited.

According to the preferred implementation, four sets of protocol circuits and three sets of bus drivers/receivers are used. Under software or hardware control, each port can be configured to operate on a particular channel, or to be isolated.

FIG. 7 shows a port switching circuit schematic where each channel dependent logic has a suffix of _CHnn, and where nn represents the channel identification.

The physical port channel switching feature of the invention allows:

1. The switching of any port from one generic channel to another, and assigning a particular LAN or WAN protocol by doing so.

2. Controlling physical connections between active elements thus replacing "patch-panels".

3. The switching of any port from any active channel to isolated mode with other isolated ports on a same module, with the ability to continue operating independently from any backplane activity.

4. The building of a logical network topology with the use of generic channels as described above.

5. The implementation of using hardware switches and software system controls to utilize the logical network.

HUB MANAGEMENT

Figure 8:
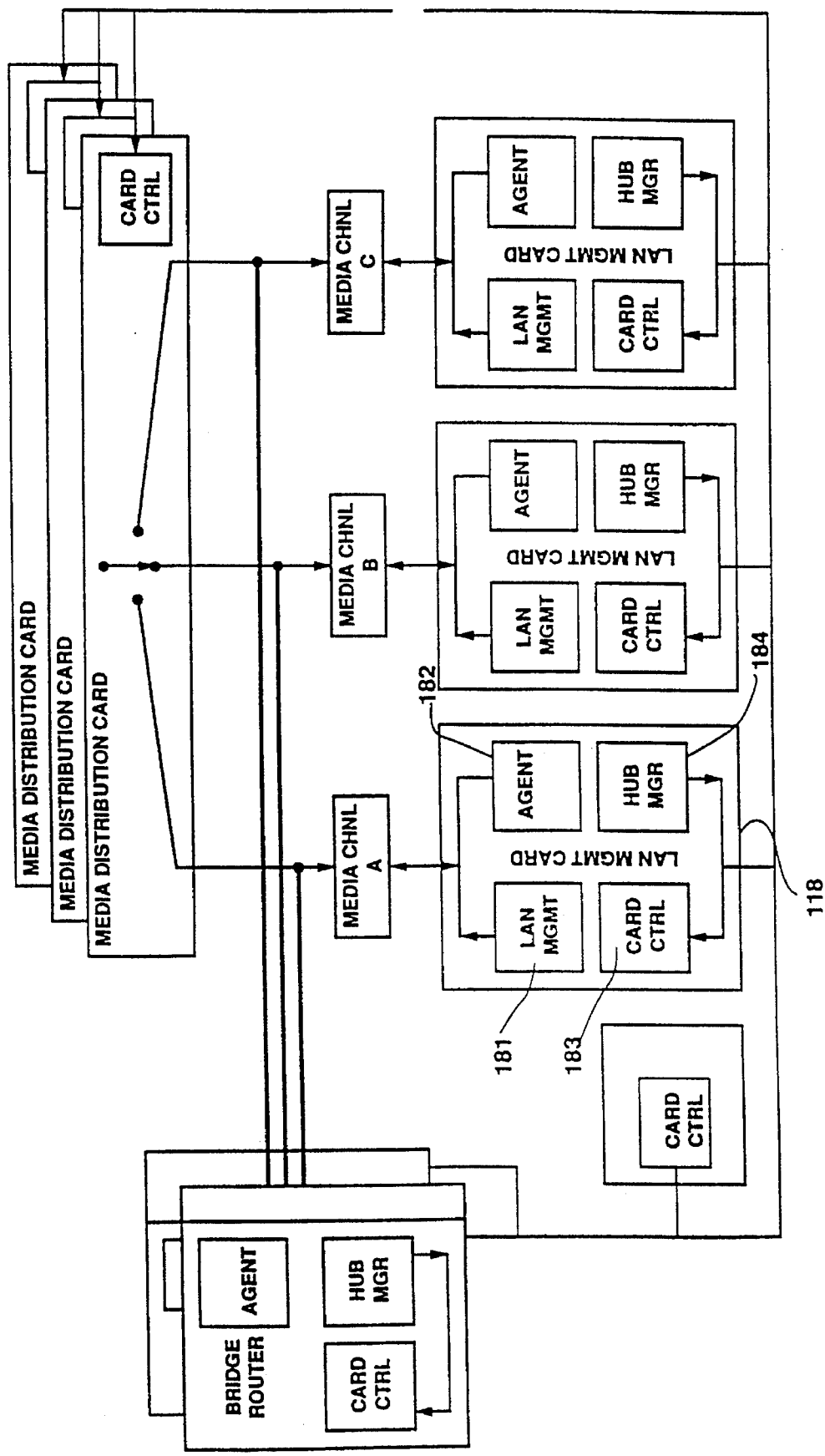
FIG. 8 is a schematic representation of the management entities according to the invention.

FIG. 8 shows the hub management architecture according to the invention, and the management entities present in the system according to the invention.

LAN MGMT 181 is the protocol dependent aspect of the network management associated with the LAN management module 118.

Agent 182, is the network management entity that controls and reports management status too other agents.

CARD CTRL (module control) 183, are module dependent functions and their services.

HUB MGR designated 184, is the protocol independent LAN system management.

According to the preferred implementation of the invention, the only modules capable of managing the hub (hub master) are Network Management Modules (NMMs)118, although in principle any module can be made to have the hub master capability. According to the invention, there can be up to three NMMs in a hub. One will be elected hub master and will manage elements in the hub. The others will manage individual channels. The election algorithm is not limited by the current configuration, i.e. there is no limit to the number or type of potential candidates.

The following explains the determination of the hub master:

Definitions

SCI—serial communications interface.

SCI Master—a module which has its Tx line tied to pin 50 of the Hub backplane (BNMMSO-) and its Rx line tied to pin 49 of the Hub backplane (BNMMSI-). An SCI master is not necessarily the Hub Master.

SCI Slave—a module which has its Tx line tied to pin 49 of the Hub backplane (BNMMSI-) and its Rx line tied to pin 50 of the Hub backplane (BNMMSO-).

Hub Master—a module that is an SCI Master and that initiates SCI communications.

SCI Packet—a packet of information sent across the serial communication line.

ACK—the acknowledgment of an SCI packet. This is an exact copy of the SCI packet which was received by the destination module on its Rx line (it is sent back on its Tx line).

Address Character—the first byte of an SCI packet. The minimum length of an SCI packet is one byte, which is simply an address character.

Sleeping Pill—an SCI packet sent by the hub master. If there is no management activity on the SCI bus within a specified time (see below) then the Hub Master sends an address character to all slots in the Hub. This tells the control card and other potential hub masters that the current hub master is still present. If the hub master stops sending packets, a new election will occur.

A module must meet the following hardware requirements for it to be configured as a Hub Master.

It must be able to toggle its Tx and Rx lines so that it can be either an SCI master or an SCI slave, and it must be an SCI master after power-up.

It must assert the BNMMACT signal on the Hub backplane (pin 47).

If a NMM does not want to be hub master, then it must NOT assert the BNMMACT signal on the Hub backplane, and ONE of the following requirements must be met:

A) It must always be an SCI slave (this is recommended, and it is how the control card and current media cards are preferably implemented);

B) It must not ACK an SCI, a packet that it receives while it is configured as an SCI master (i.e. it doesn't answer an election—see below).

Modules that can be hub masters have three basic SCI states that they can be in (and a fourth undefined state). These SCI states are listed in Table 4 below.

TABLE 4

| Hub_master | SCI_master | description |
|---|---|---|
| 0 | 0 | slave state |
| 0 | 1 | election in progress |
| 1 | 0 | undefined |
| 1 | 1 | hub master state |

The time-out values for the slave state and the election state are specified below. A summary of the actions taken in different states is listed in table 5.

TABLE 5

| STATE | BREAK received | FF received |
|---|---|---|
| Hub Master | echo BREAK character; resign Hub Mastership; go to Election state | do nothing |
| Election | do nothing | if ACKed poll, become Hub Master else go to Slave state |
| Slave | goto Election state | do nothing |

On power-up, the NMMs dafault to SCI master mode and the control card is in SCI slave mode (the control card is always an SCI slave). There is a variable on the control card called HubMasterID, which comes up as −1 indicating that there is currently no Hub master. If the BNMMACT signal is not asserted, the control card assumes that there is no module that wants to be Hub Master, and no election takes place.

If or when the BNMMACT signal is asserted, the control card begins the election by issuing a BREAK on its Tx line (BNMMSI-). The interpretation of the BREAK character is explained later. It then goes through every slot, except its own slot, issuing a one byte SCI packet (the slot address). If it does not receive an ACK, it tries the next slot. If it receives an ACK, it sets the slot number in the HubMasterID variable, it sends a one byte SCI packet (address FF[hex]) which tells all other candidates to immediately toggle to SCI slave mode, and it stops initiating any SCI communications. It then answers any inquiries from the hub master and monitors the SCI for activity. If no sleeping pills are received by the control card for a given time (specified below), the control card assumes that the hub master has failed, and initiates another election. The control card does NOT verify that any SCI communications were initiated by or from the hub master's slot. The hub master can maintain activity on the SCI by periodically issuing sleeping pills as described above.

If a module wishes to be the hub master but another module was elected, it can force the current hub master to resign by sending a BREAK character while it is in SCI slave mode. When a module acting as the hub master (not just an SCI master) receives a BREAK, it immediately stops acting as the hub master (i.e. stops initiating SCI communications) and it issues a BREAK character. This will cause all other potential hub masters to toggle to SCI master mode. The lack of SCI activity will cause the control card to time-out and start another election. When other NMMs see a BREAK character while they are configured as SCI slaves, they must toggle to SCI masters and go through a re-election. A BREAK sent by the Hub Master indicates that it is resigning.

There is a priority variable on the NMMs which can be set to a value between 0 and 255. This number is defined as the number of election polls to ignore before answering an election poll. The number is decremented after each polluntil the value reaches zero or until the election ends. The exception to this is the value 255, which is used to indicate that the module should never answer an election. If this value is the priority, then it is never decremented.

According to the preferred implementation, the default value for priority after power-up reset is 255, so the management agent must change this value in order for a hub master to be elected. The priority can be used to ensure, for example, that a desired module is always elected after a power failure.

List of the current time-out values:
Sleeping pill period—1 second
This is the minimum frequency that the hub master issues sleeping pills.
NMM time-out waiting for sleeping pill—4 seconds
Once it reaches this threshold, it toggles to SCI master mode and waits for an election.
NMM election time-out—8 seconds
If it doesn't receive an election poll within this period, it assumes that another module won the election and it toggles to SCI slave mode.
Control Card sleeping pill time-out—6 seconds
Once it reaches this threshold, it sends a BREAK character and starts an election.
Control Card election time-out—infinite
If BNMMACT- is asserted, the control card will send SCI packets until one is ACKed.

The management method according to the invention allows:

1. The unique election of one Management Module to serve as the hub master.
2. Multiple Management Modules in one hub. This also allows redundant Management Modules providing fault tolerant functioning.
3. The provision of multiple Network Management Agents pertaining to the operation with the Hub Management functions and its election.

COLLISION DETECTION

Most of the Ethernet™ HUB vendors employ analog collision detection on their backplane, similar to that of 10Base5 or 10Base2, where either current or voltage is summed to represent number of simultaneous transmissions. A voltage or current level that represents two or more simultaneous transmissions is deemed to be a collision.

For a 17 slot HUB implementation in accordance with the preferred form of the invention, the number of bits for the slot-ID is set to 5. The Bus Transceiver Logic, BTL, technology chosen for the generic multichannel architecture system according to the invention meets the hardware requirement. Each slot of a backplane has hardwired a unique binary-coded slot-ID numbered from 0 to 16. The collision enforcement signal is assigned a common backplane pin per channel, and is known as a Local Collision.

A backplane collision detection method using slot-ID allows parallel bit-comparison with collision enforcement signalling to ensure collision detection on a backplane. In this scheme N represents the number of slots on a backplane, and M represents the number of uniquely assigned bits of slot-ID which are needed to perform this collision detection, M is defined as the smallest integer that satisfies $N \leq 2^M$. Whenever a transmission occurs from a module onto a backplane channel, a unique slot-ID is enabled onto the backplane. one bit time (100 nanoSec.) before the data and data enable is asserted onto the backplane, allowing for a comparison of Slot-ID (Slot-ID compare) to occur. One bit delay of data is needed to meet the bus timing requirements of the current implementation. At the same time, this unique slot-ID is read by each active module and compared to its own. Backplane circuits for the slot-ID allow multiple bus drivers on a single line. If multiple slot-IDs are driven onto the backplane, a slot-ID on the backplane will not match at least one of the active module's slot-ID. If the read slot-ID is the same as its own, the module does nothing more. If the read slot-ID is different than its own, then the module asserts a collision-enforcement signal. The collision enforcement signal is held active as long as the slot-ID read does not compare with its own slot-ID. All modules monitor this collision enforcement line to detect collisions.

FIG. 5 also shows the collision detection logic system according to the invention.

The signals BID<4:0> are a uniquely encoded Slot-ID signal per module such that the slot 0 of the concentrator has the binary encoding of 00000 and the slot 15 of the concentrator has the encoding of 01111. The signals MONADD<8:4> represent the portion of the active module address that corresponds to the Slot-ID. When a module is active, the Slot-ID is enabled onto the backplane via BxMONADD<8:4> signals, where x represents the channel number. The signals MONADD<8:4> represent the BxMONADD<8:4> read by the BTL receiver. The signals MONADD<8:4> are compared to BID <4:0> if and only if the module is active in sending data onto the backplane. If these signals differ, a collision is detected. If these signals do not differ, no collision is present. In addition, if a difference is detected, the signal LCOL, local collision detection, is asserted by IC U47 as long as the difference is detected. (Note: Collision detection entails that more than one device is transmitting at the same time.) The reason for such enforcement is that binary coding of Slot-ID and the Wired-OR function provided by the BTL technology guarantees that at least one device is detecting the difference, but this does not guarantee all devices detect the difference. E.g.—a Slot-ID of 00000 colliding with a Slot-ID of 01111 guarantees that the module with Slot-ID of 01111 detects a difference, because the Wired-NOR function would return 00000. The module with Slot-ID of 00000 would not detect any difference between its own Slot-ID and the ID read from the backplane.

The hardware requirement for the embodiment of this invention is that the logic family used for asserting the slot-ID, Data, Data Enable, and other support signals be capable of supporting simultaneous assertion of these signals by multiple drivers.

The collision detection scheme of the invention allows:

1. Purely digital (binary) functions which offer noise immunity from interfering signals. This offers the most reliable collision detection.

2. Deterministic collision detection, 100% guaranteed.

3. The relay of the precise duration of collision to the rest of the network.

Figure 9:
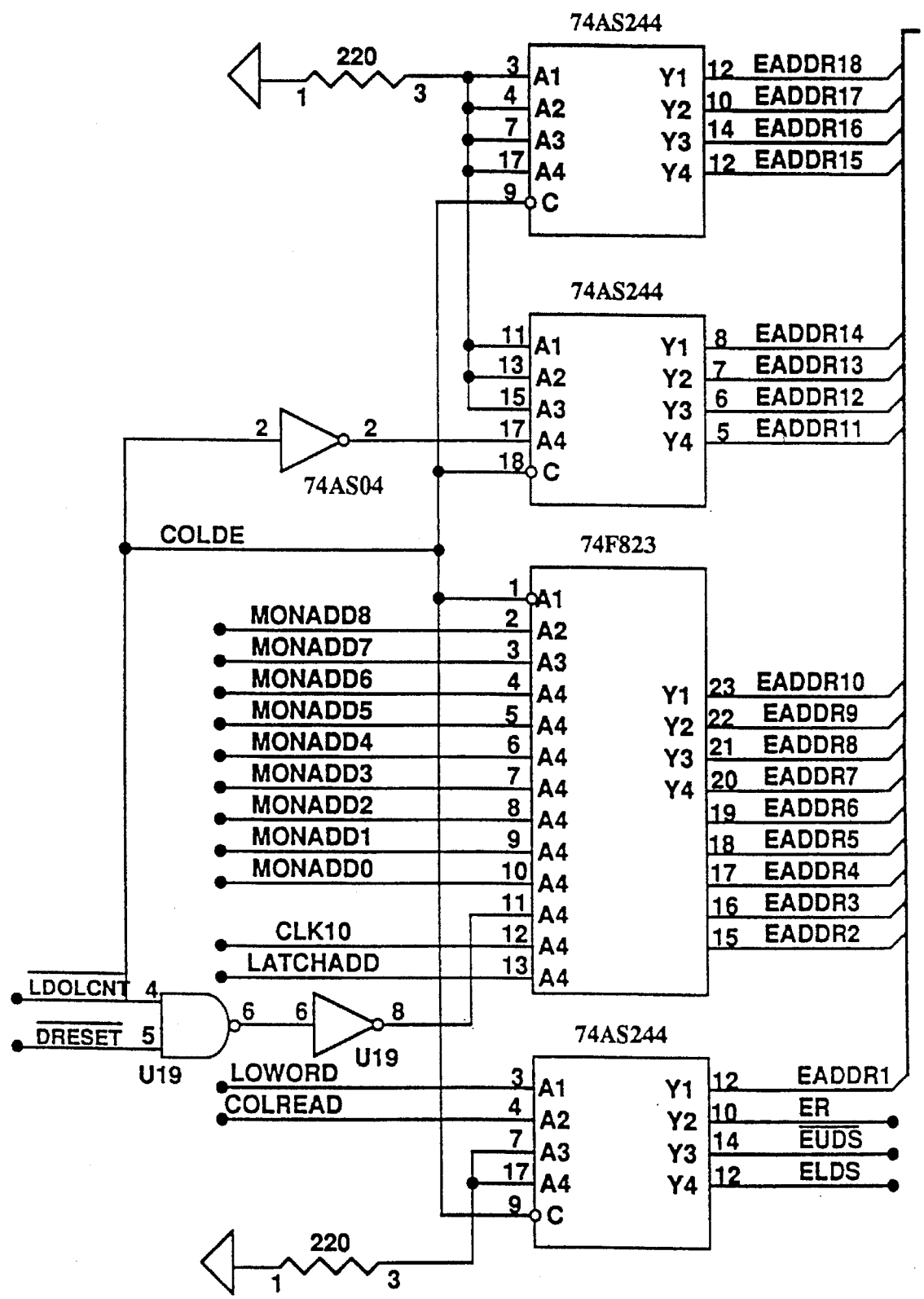
FIG. 9 is a schematic representation of the collision counting logic showing how MONADD <8:0> is latched as a vector.

FIG. 9 shows another collision counting logic schematic which describes how MONADD <8:0> is latched to be used as a vector into a memory address base for collision.

Figure 10A:
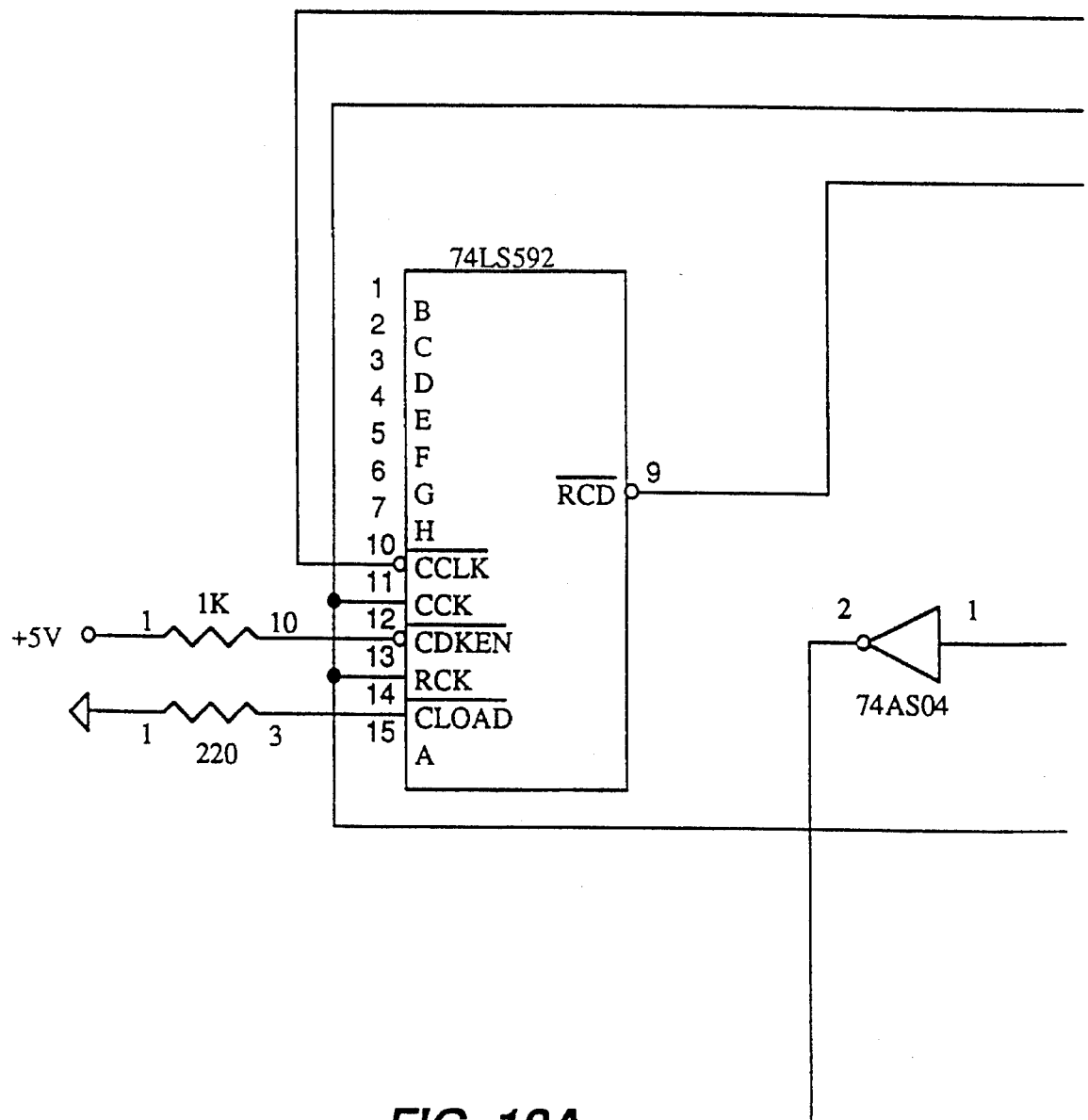
FIGS. 10A, 10B and 10C are a schematic representation of the collision counting logic showing how serial bit streams of Ethernet™ are counted.
Figure 10B:
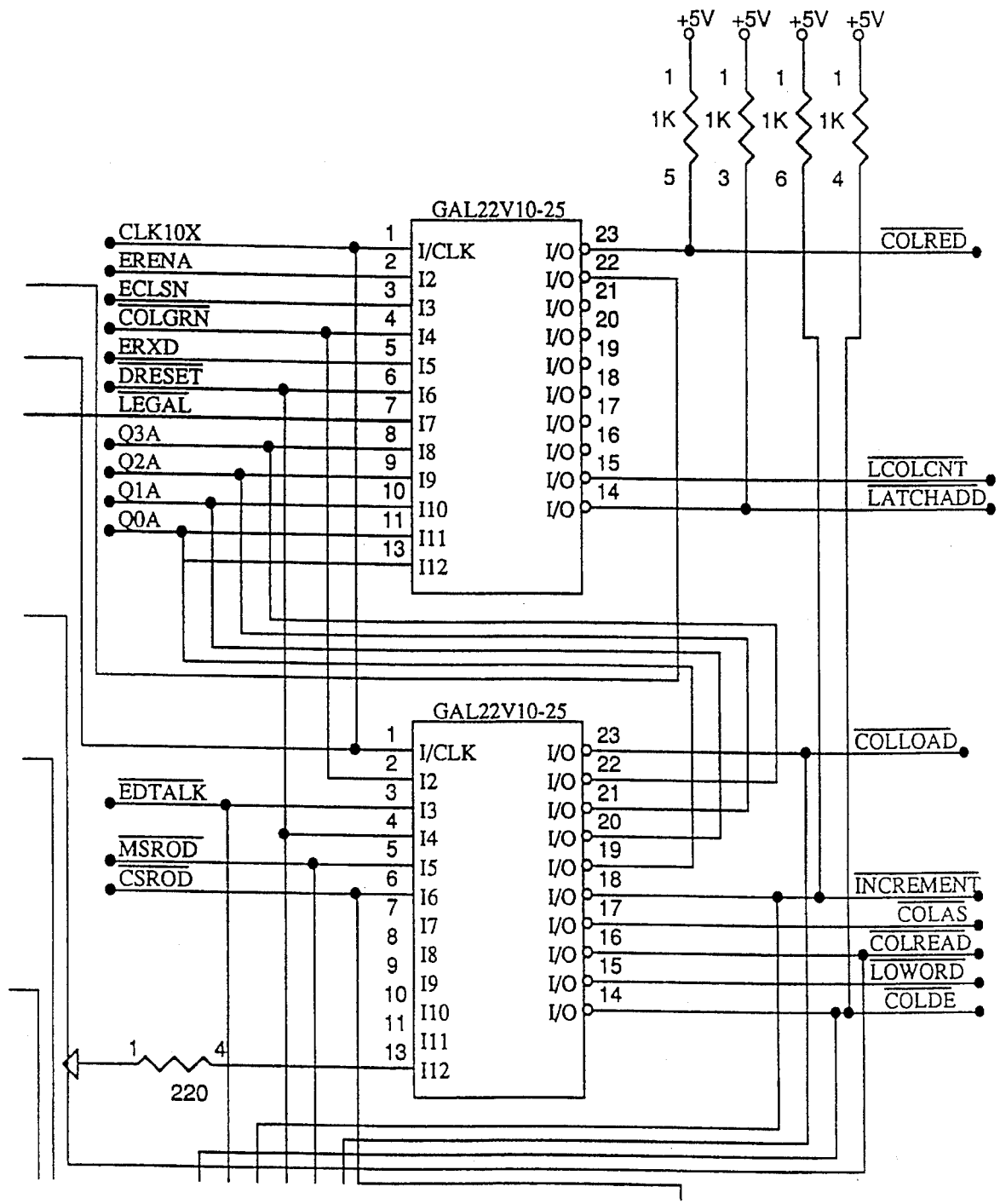
Figure 10C:
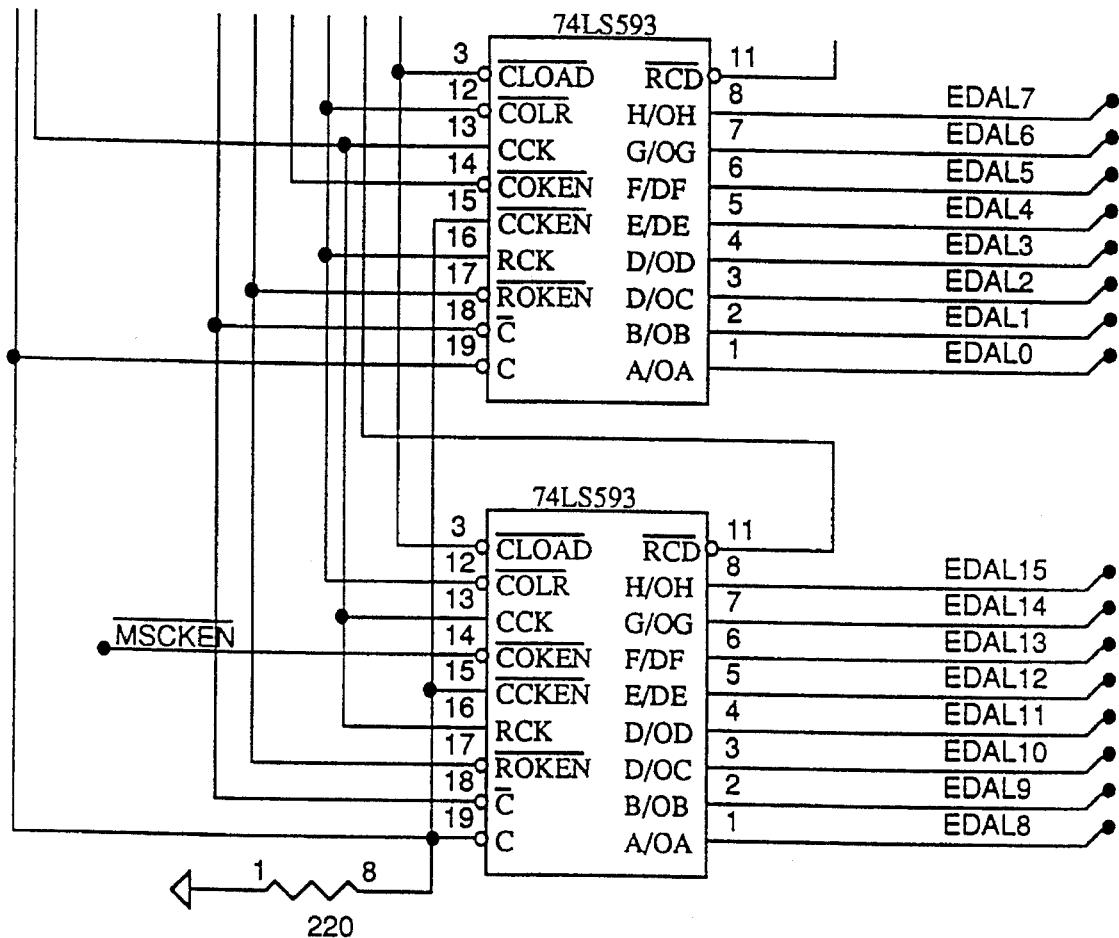

The input signal LCOLCNT enables the data latches in U33 and U57 to trap the MONADD<8:0> to be used later by the collision counting circuit, described in FIG. 10. The output signals EADDR<18:1> along with signals ER, EUDS, and ELDS represent signals that interface the monitor address to the address bus of the Ethernet Controller IC, U24, in FIG. 16.

FIG. 9 is still another collision counting logic schematic which describes how serial bit streams of Ethernet™ are counted, and how collision is qualified.

Figure 13:
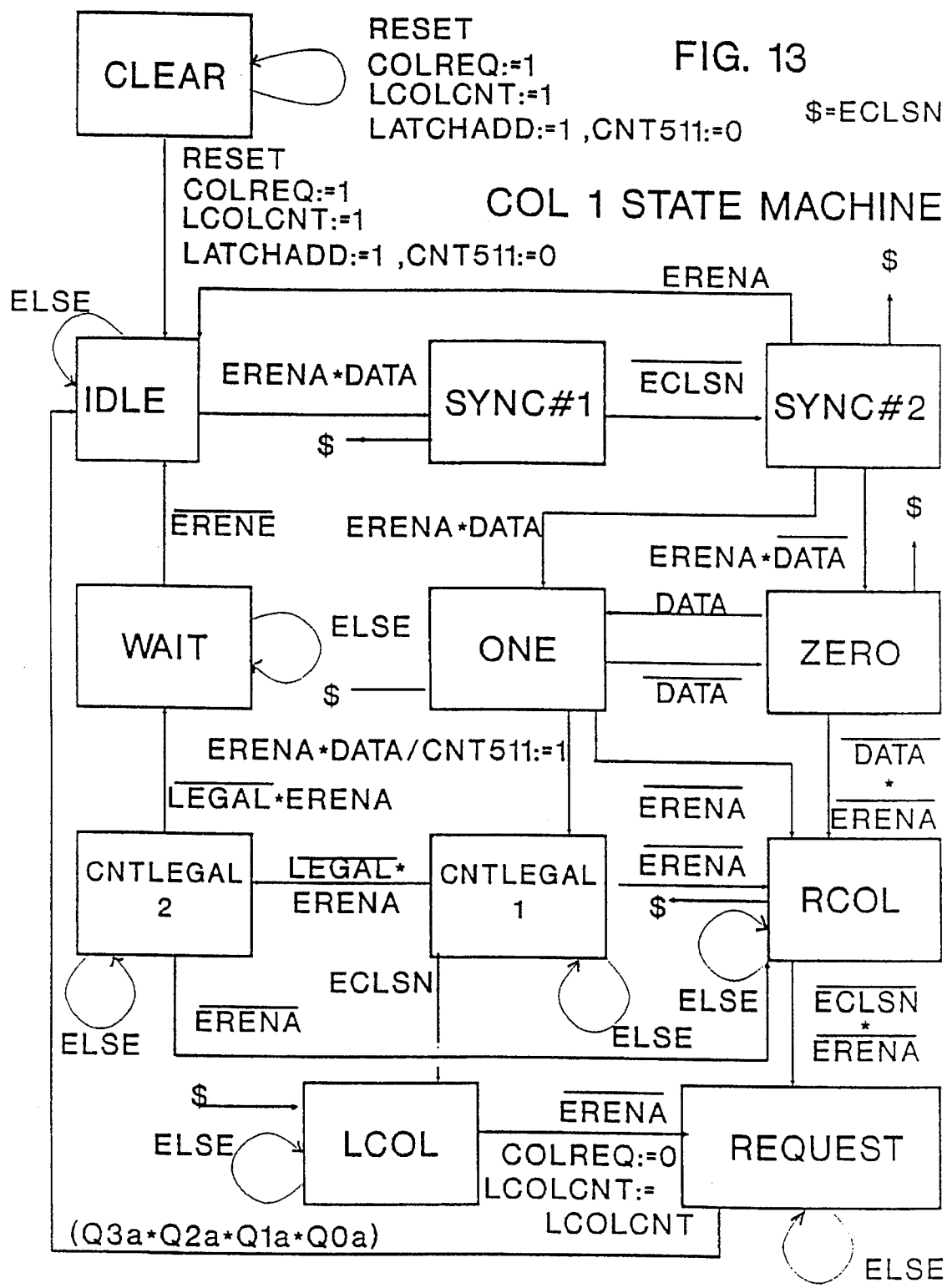
FIG. 13 is a flow chart of the collision detection logic of the state machine shown in FIG. 2.2d.
Figure 14:
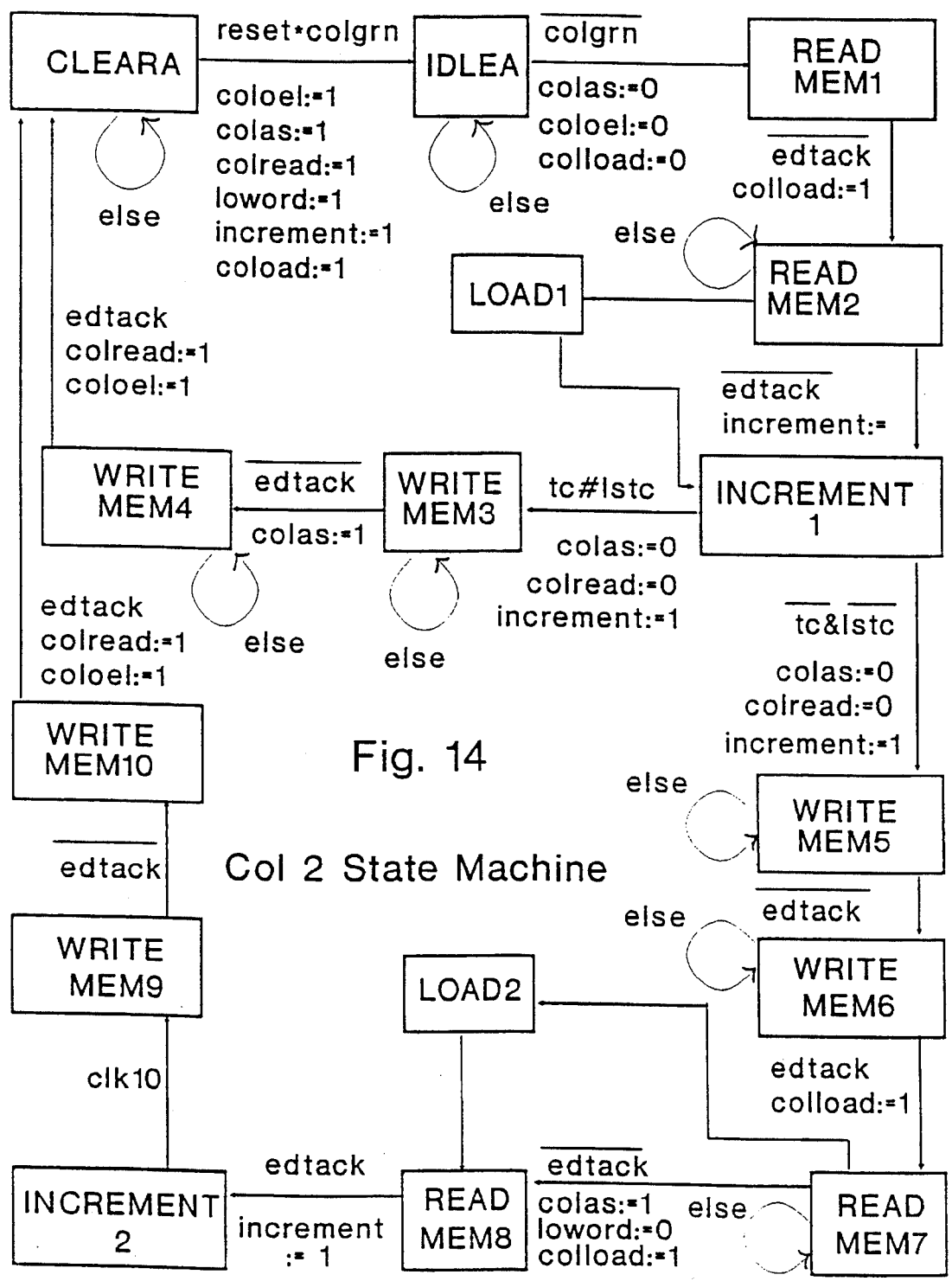
FIG. 14 is a flow chart showing the collision detection logic machine and how a long word counter is maintained using 16 bit counters.

The devices U75 and U81 represent the Programmable Logic Devices (PLD) described in FIG. 13 and 14 respectively as finite state machines. Outputs from U75 control U80, an 8 bit counter, to count a specific number of bits being received for the state machines to determine a correct cut-off point for remote collision counting per port. The signals EDAL<15:0> represent a data bus connection made to U71 and U63, both of which are loadable 8 bit counters. The counters are under the state machine control and their function is to read the contents of the data bus, increment by one, and write the result onto the data bus. This circuit is used to count remote collision per port and the local collision.

FIGS. 13 and 14 describe the functions of programmable logic devices U75 and U81.

In Precise Collision Counting per-Port, on every activity detected, the length of the network activity is counted. The counting starts when SFD is detected or when a double zero is detected. Any activity that is less than or equal to 51.1 micro Seconds (equivalent to 511 bits) is considered as a collision, and its source module Slot-ID and port ID is recorded. If local collision has been detected through the collision enforcement signal, as described above, the recorded IDs are discarded, and the local collision statistics are updated. If local collision has not been detected during the entire transmission, and the transmission length was less than or equal to 51.1 μSec, the collision statistics of that particular module and port is updated using the Slot-ID and Port-ID.

The initial implementation of this aspect of the invention is in dedicated digital hardware. A block of RAM is assigned for recording the collision statistics of each port of each of the modules, and one location of RAM is assigned for local collision statistics.

Figure 11A:
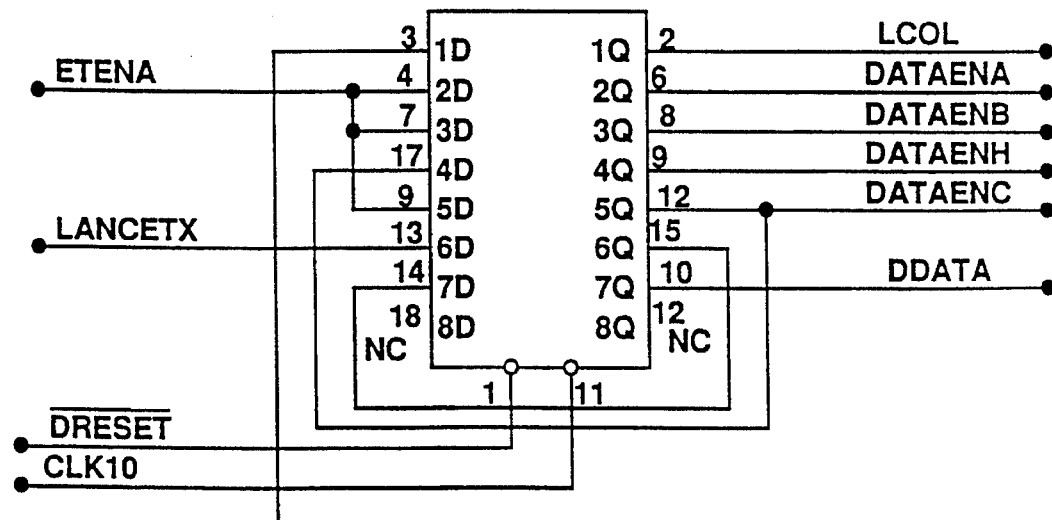
FIGS. 11A and 11B are a schematic representation of the collision counting logic showing how collision is detected.
Figure 11A:
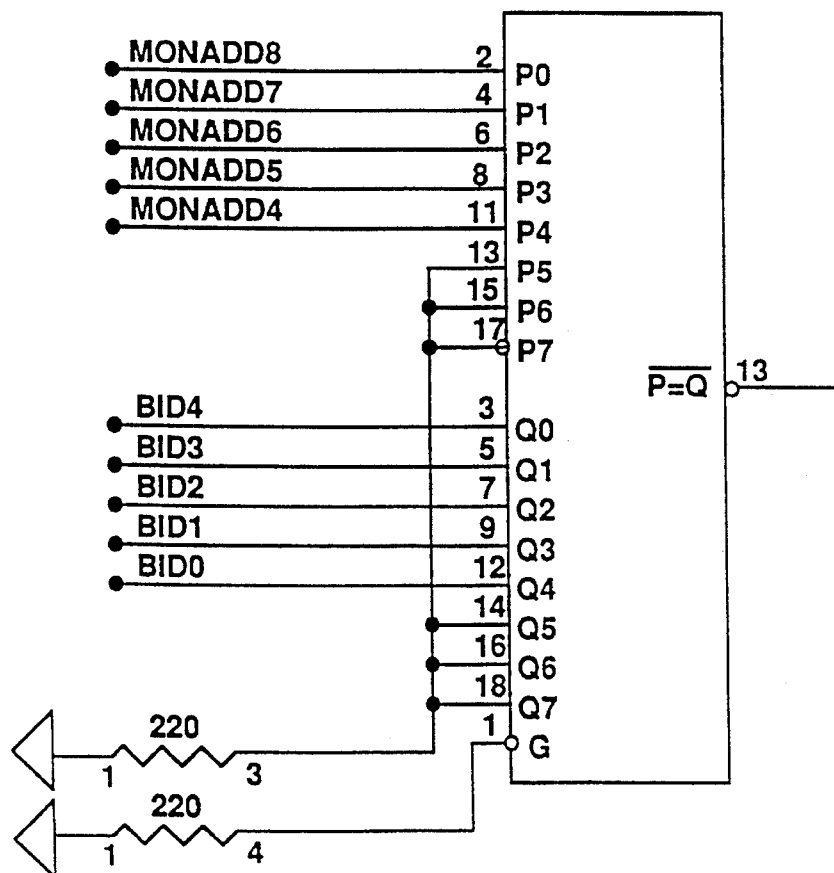
Figure 11B:
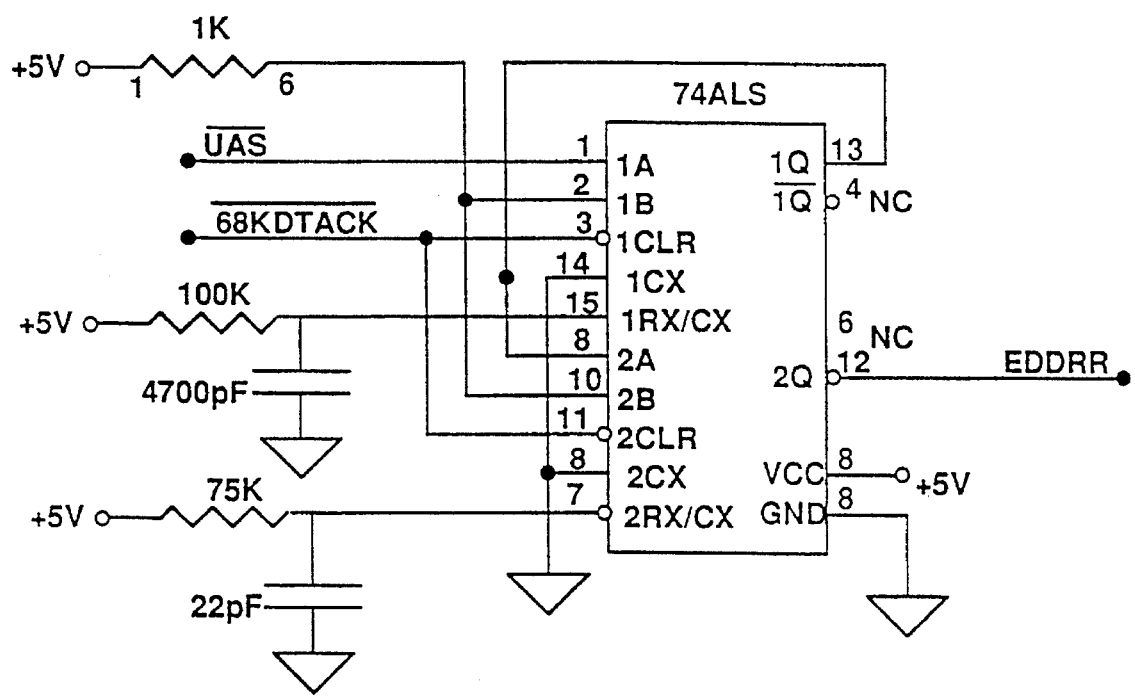

FIG. 11 is a further collision counting logic schematic which describes how collision is detected, when the local Ethernet™ controller is transmitting.

FIG. 11 represents the Ethernet Interface logic that has identical function as FIG. 5, but is implemented for a single port device as in the Management module where one Ethernet Controller IC resides. The signal ETENA is analogous to STBOUTnn in FIG. 5 and represents data enable, and LANCETX is analogous LDOUT in FIG. 5 and represents data.

Figure 12A:
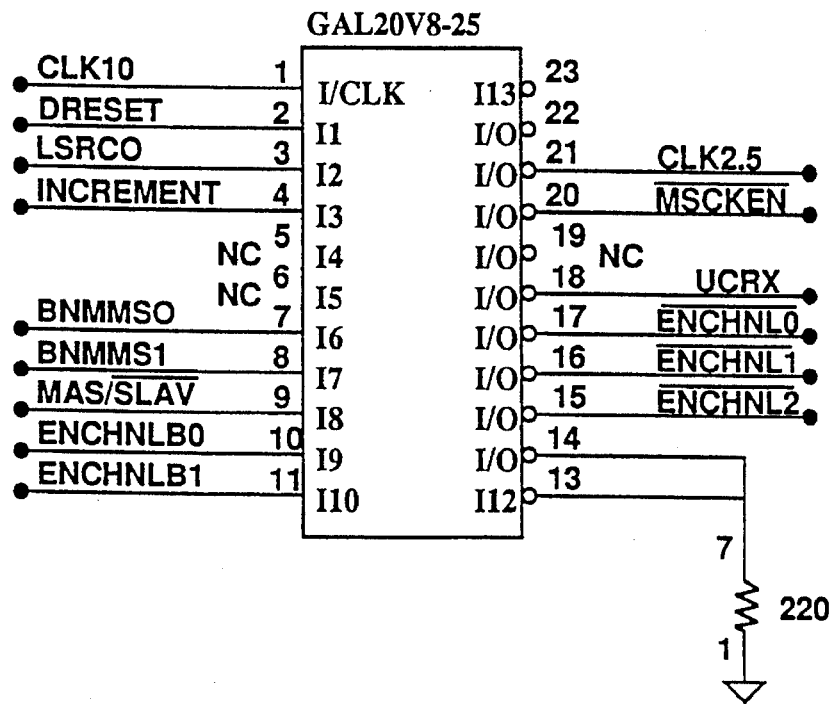
FIGS. 12A, 12B and 12C are a schematic representation of the collision counting logic showing a programmable logic device of a state machine.
Figure 12B:
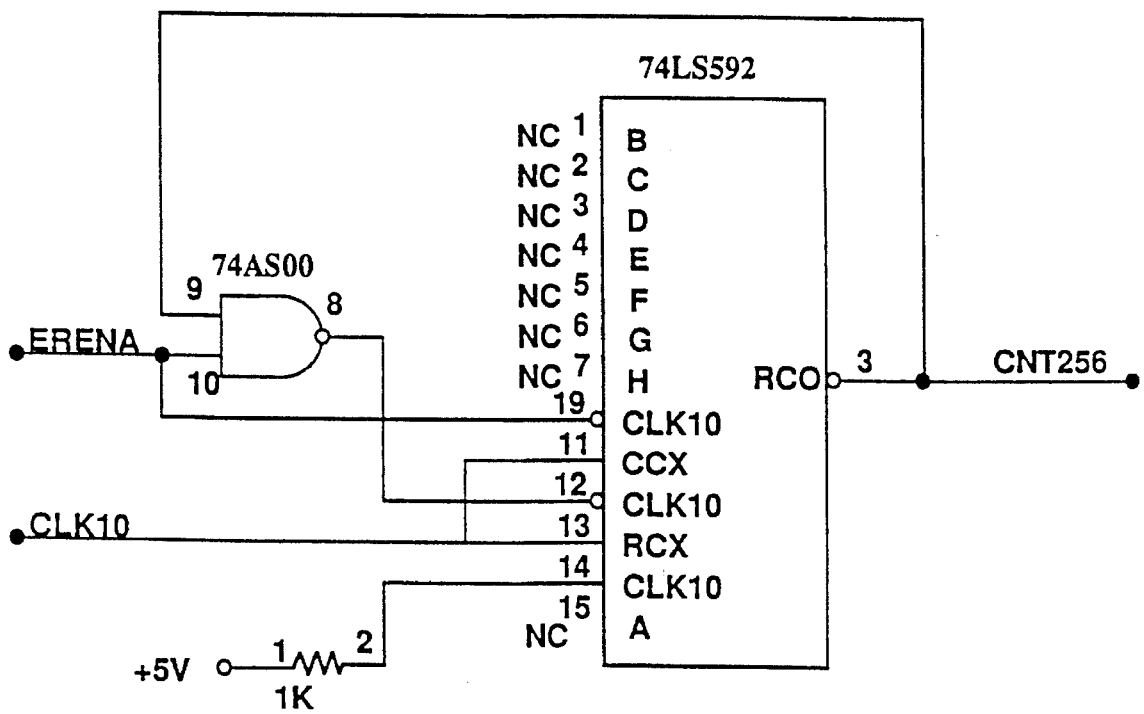
Figure 12C:
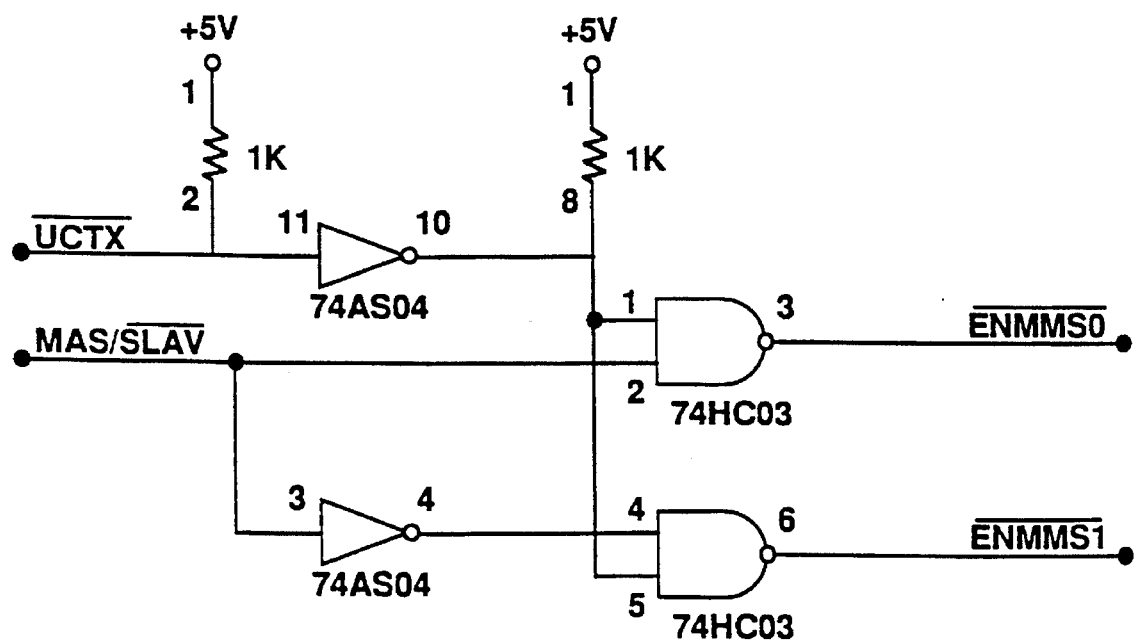

FIG. 12 is a still further collision counting logic schematic which contains the PLD U11 that implements a part of the state machine described in FIGS. 13 and 14. The programmable logic device U11, among other independent functions, provides the decoder function to translate ENCHNLB<1:0> to ENCHNL<2:0>. For the single port implementation, such as shown here for a Management module, the circuits needed to support the Isolated mode need not be present to implement the Isolate function. The signal ERENA represents the receive data enable and is used in this circuit with U5, an 8 bit counter, to provide a measurement of the receive duration to be used by the finite state machine in FIG. 14.

FIG. 13 shows a collision detection logic state machine. This finite state machine, FSM, describes how packet length counting is started and how the collision fragment is qualified with the resulting length.

When remote collision is detected, the Slot-ID and port-ID are used as a vector into the block of RAM assigned for recording collision statistics, for fetching a count to be updated. A dedicated counter and a set of finite state machine increments the contents and then writes it back to the same location fetched. When a local collision is detected, a pre-determined location containing the local collision count is updated by the same circuit.

FIG. 14 shows another collision detection logic state machine which describes how a long word (32 bit) counter is maintained using 16 bit counters per Port-ID and Slot-ID signals.

Figure 15A:
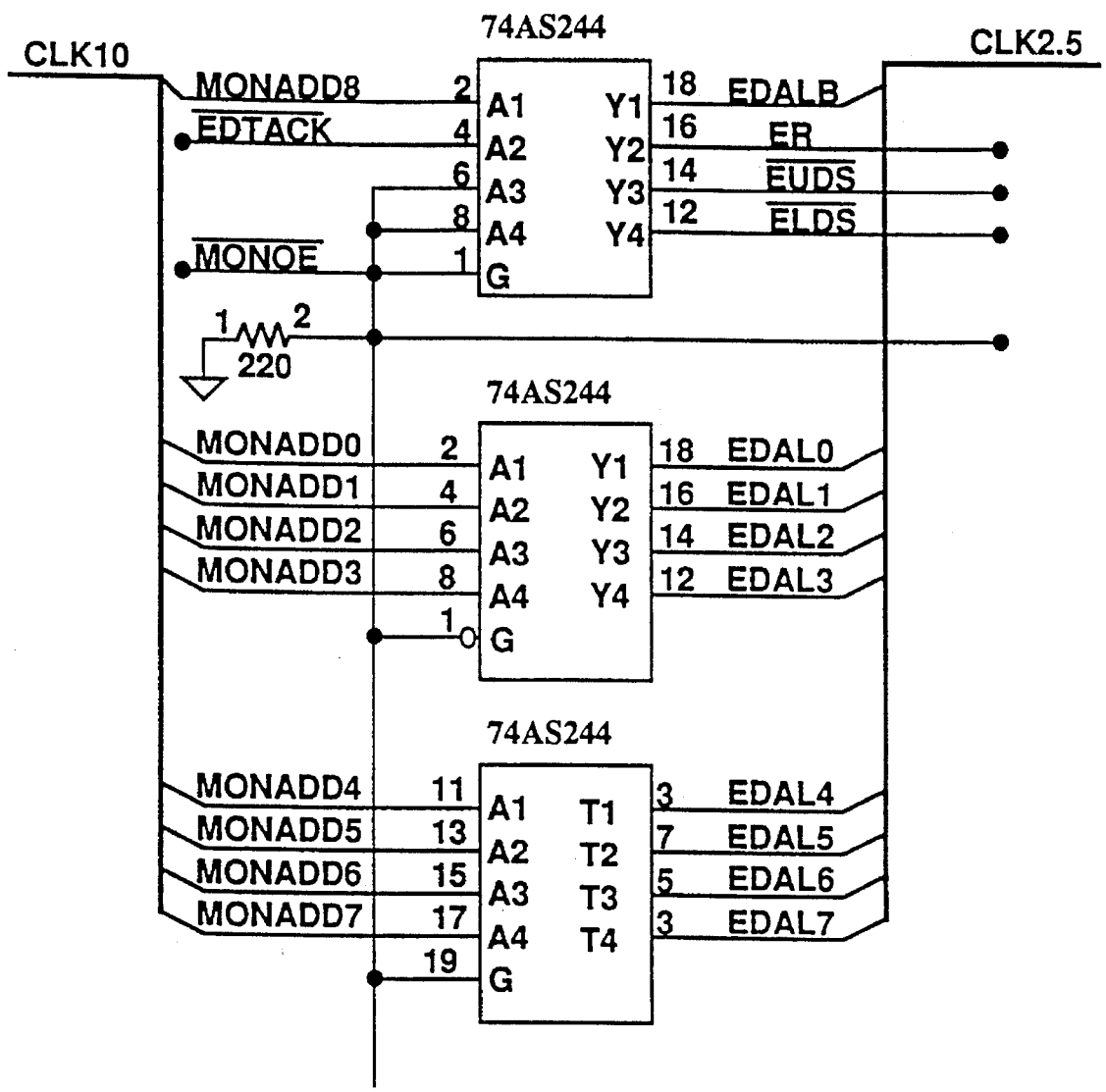
FIGS. 15A and 15B are a schematic of an Ethernet™ type statistics counting logic according to the invention.
Figure 15B:
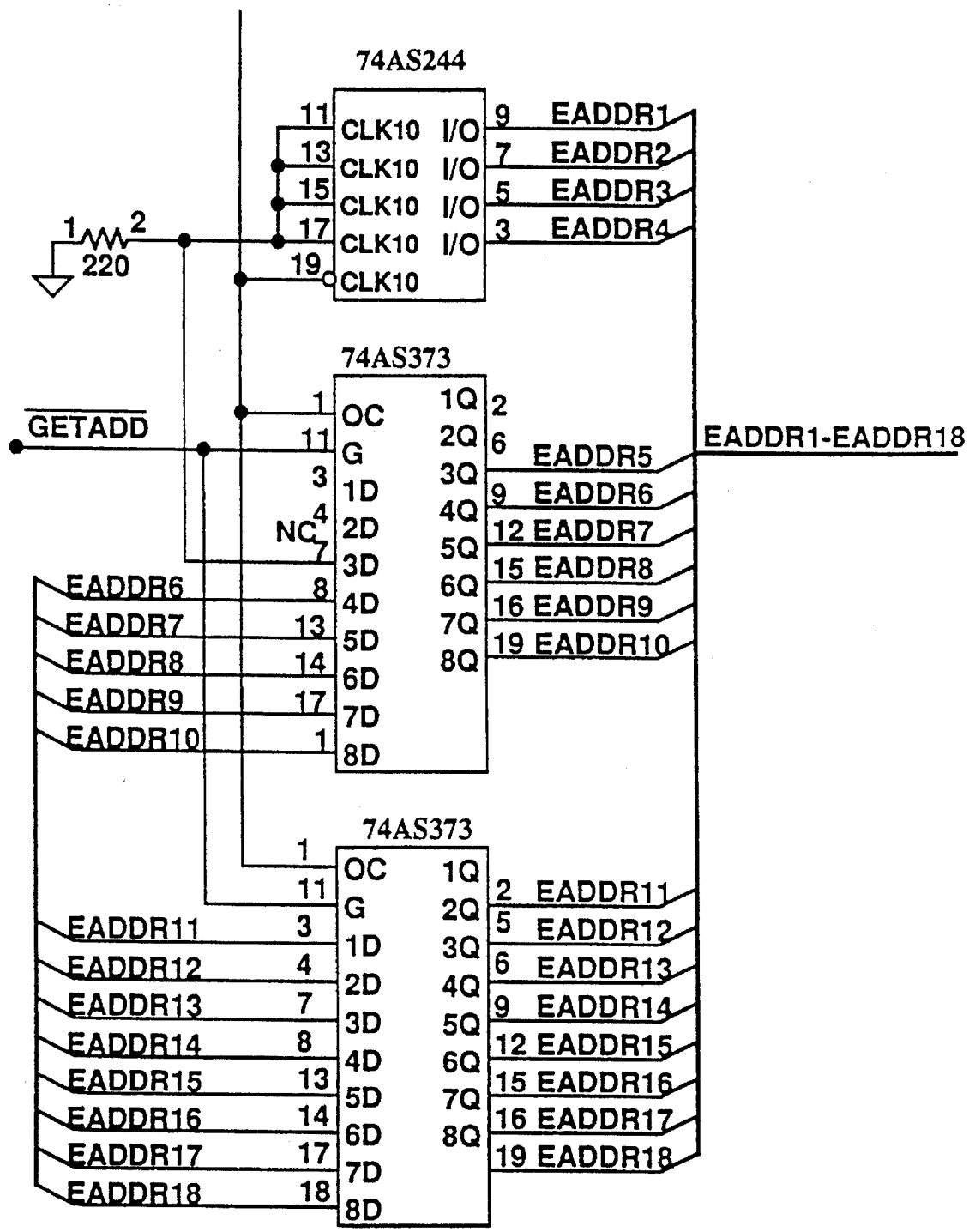

FIG. 15 shows Ethernet™ statistics counting logic and how the Ethernet™ controller receives buffer memory addresses latched at a proper qualified moment, and how MONADD <8:0> is latched for eventual writing to the memory location.

The input signal, GETADD enables the data latches in U72 and U64 to trap the MONADD<8:0> signals to be used later to "stamp" each received data packet with the value of the MONADD, which represents the Port and Slot-ID. The contents of the MONAFF<8:0> are used as data. The outputs from these latches are connected to the data bus, EDAL<8:0>, for this purpose. The control of this operation is described in the state diagram in FIG. 17. The signals EADDR<18:6> represent the address bus of the Ethernet Controller interface. The latches U45 and U36 store the particular address of the packet buffer to be used later as an address for the stamping of the data packet. The control of this operation is also described in the state diagram in FIG. 17.

The precision collision counting per-port aspect of the invention provides:

1. Detection and distinction of Local and Remote Collisions through the use of the collision enforcement signal.

2. Detection of collisions through counting number of bits to 511 bits or 51.1 microSec. after an SFD or preamble phase violation (double zeros).

3. Collision statistics records per port and per module through the use of Slot and Port ID.

4. Maintenance of the collision statistics via the use of the digital hardware (as opposed to Ethernet™ controller's IC and Software based).

In counting the Ethernet™ receive statistics per port, for every reception of greater than 51.2 μSec, equivalent to 512 bits which is a minimum sized Ethernet™ packet, a dedicated digital circuit monitors the bus activity of Ethernet™ controller IC. During the monitoring, the receive buffer memory location that an Ethernet™ controller uses, is recorded. Once the count has expired, slot and port IDs are written into the reserved location of the particular received buffer in use.

Figure 16A:
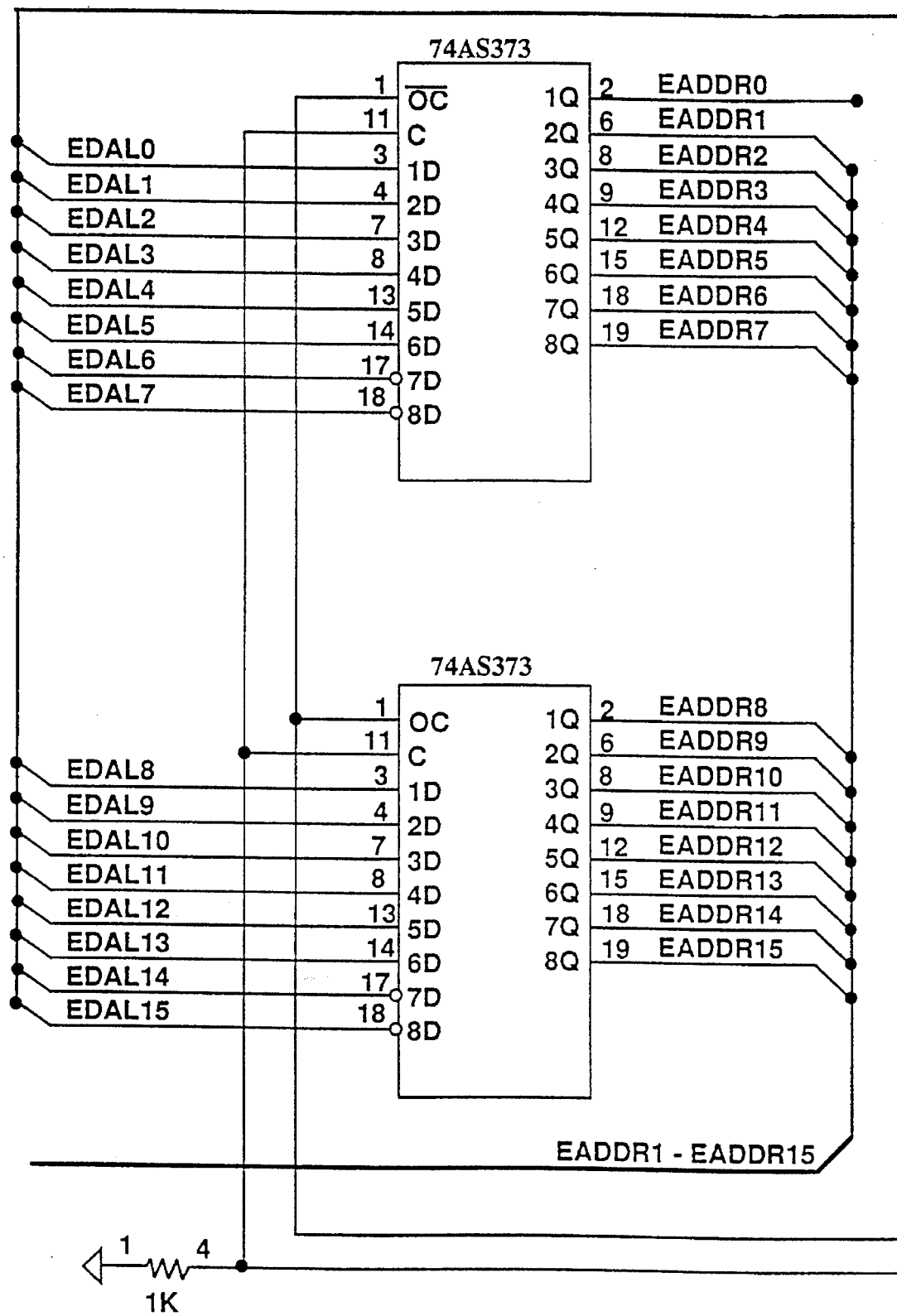
FIGS. 16A, 16B and 16C are a schematic of an Ethernet TM type statistics counting logic showing the Ethernet™ type controller interface according to the invention.
Figure 16B:
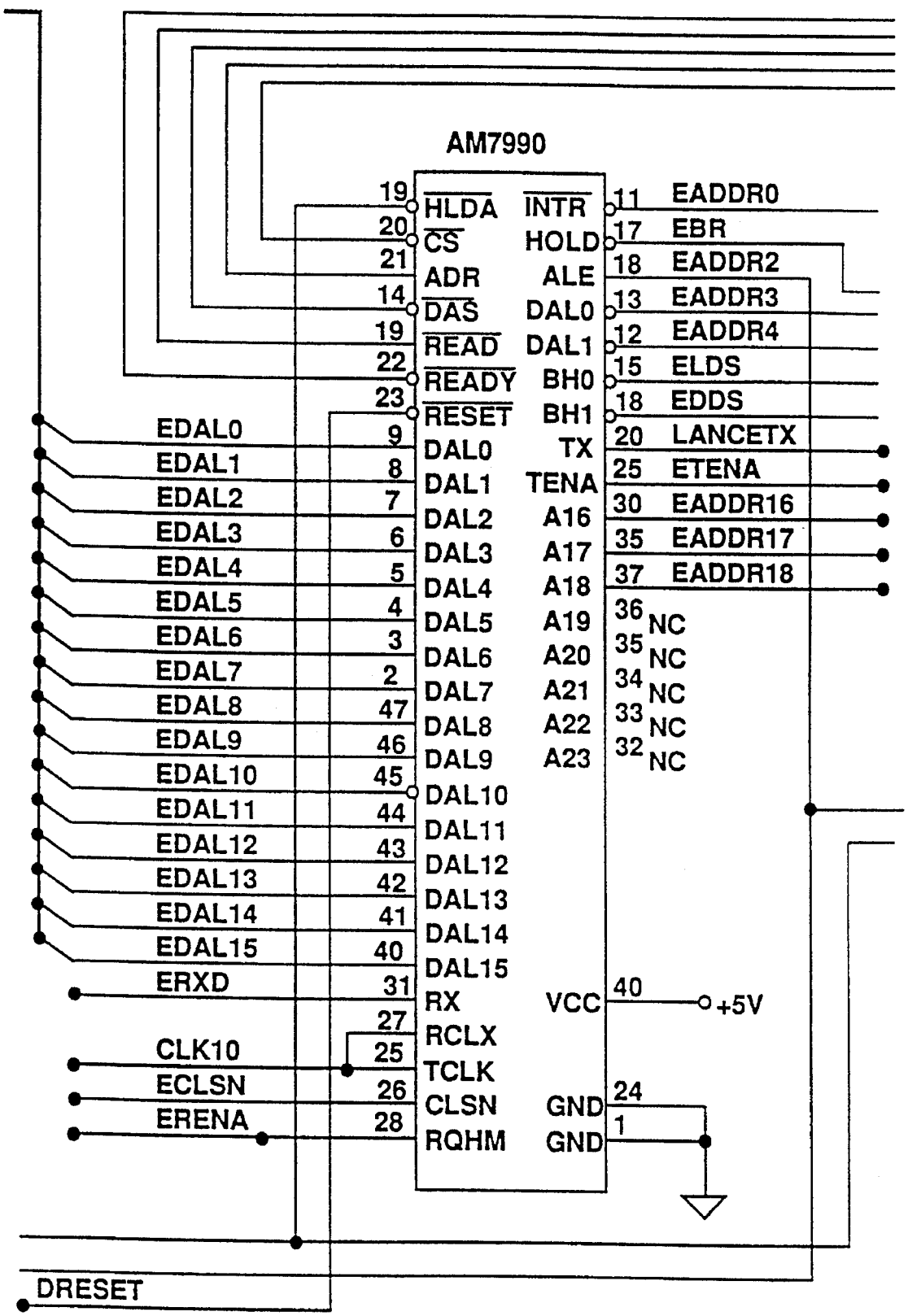
Figure 16C:
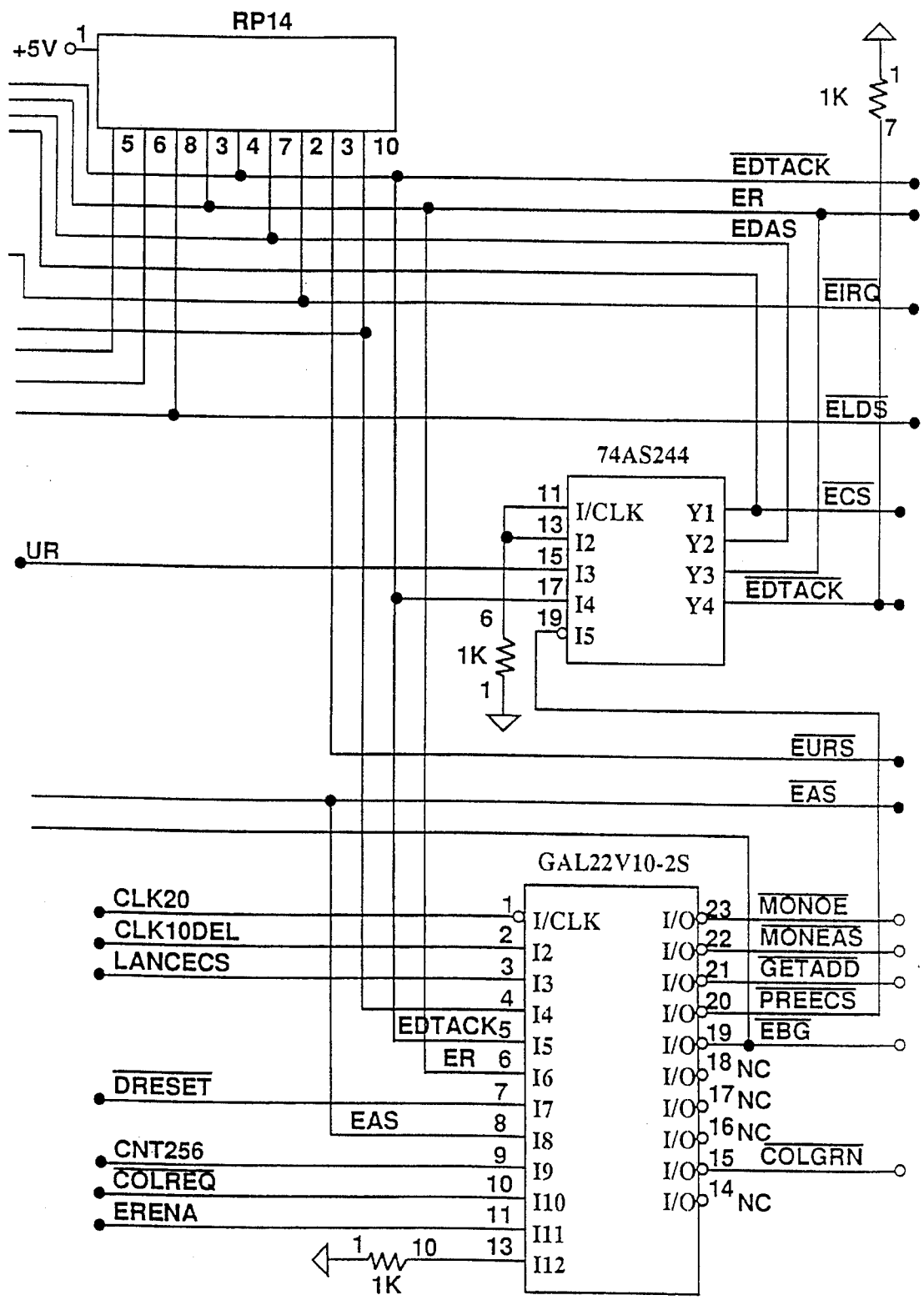
Figure 17:
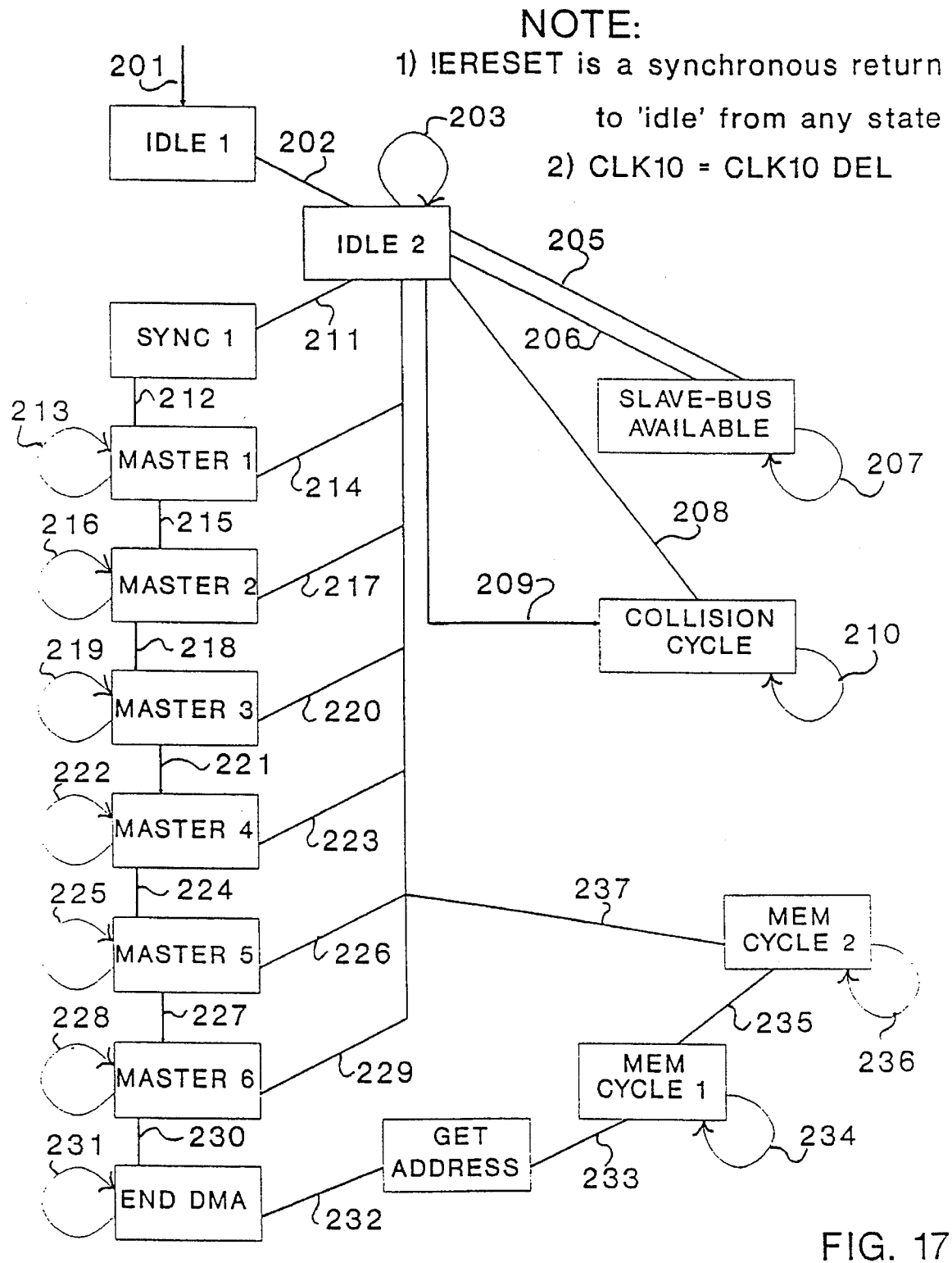
FIG. 17 is a flow chart showing the Ethernet™ statistics counting logic state machine which performs master and slave bus arbitration.

FIG. 16 shows the Ethernet™ statistics counting logic schematic, the Ethernet™ controller interface and the programmable device that implements the FSM shown in FIG. 17. The Ethernet controller, U24, address demultiplexors, U52 and U56, control bus interface buffers, U76, and PLD U39, implement the state diagram in FIG. 17. The representation of the Ethernet Controller interface in this figure is quite standard and is included to provide clarity. The device U39 and its input makes the FIG. 17 state diagram description easier.

For reference:

EDAL<15:0> represents multiplexed address and data;

EADRR<18:0> represents an address bus;

UADDR1 represents a single address signal from the host for slave random access to the Ethernet Controller;

EDTACK represents an input for the data ready signal;

ER represents an input/output for read or write;

EDAS represents an input/output for data strobe;

EAS represents an output for address strobe to access memory mapped devices;

EIRQ represents an output for interrupt request to the host;

ECS represents an input for slave access from the host;

EUDTACK represents an output for slave access from the host;

ERXD represents received data;

ECLSN represents local collision;

ERENA represents receive enable;

CNT256 represents the lenght of ERENA longer than 256 bit times (where bit time is 100 nano-seconds) and then 512 bit times, or every 256 bit times thereafter, and is generated in FIG. 12.

For the actual implementation, the Ethernet™ controller from Advanced Micro Devices (AMD) is used. Each receive buffer has a 16 bit word location reserved for the slot and port ID, and each receive buffer starts on a 32-byte boundary to allow an all zero vector to point to the reserved location to write the slot and port ID. If activity is detected, and if the Ethernet™ controller does not provide a direct memory access (DMA) of the received packet to the receive buffer, the dedicated logic does not write the port or slot IDs.

A dedicated logic monitors and counts received network activity. If it exceeds 256 bits beyond the preamble, it knows that the memory transfer the Ethernet™ controller makes is to the current buffer, because the AMD controller uses a 32 byte (256 bit) FIFO (First In First Out) scheme to buffer incoming packets. The AMD controller must empty the contents of the FIFO before it overflows. The monitoring logic uses this indication to latch the memory address and writes the port and slot ID's to associate the origin of a particular received packet with the packet itself.

The monitoring logic allows:

1. Tight integration of the additional digital logic circuits and the Ethernet™ controller that monitors the Ethernet™ controller's memory bus and network interface to guarantee consistency and accuracy of per-port and slot ID statistics.

2. The use of slot and port IDs to associate each packet received by Ethernet™ controller ICs to its origin.

SYNCHRONOUS ETHERNET WITH HALF REPEATER LIMITATIONS

An Ethernet™, or CSMA/CD channel is made possible by synchronizing bit streams of Ethernet™ packets to a central clock, common to all modules connected to the same channel. This is accomplished by a First In First Out (FIFO) system that receives data at one frequency, and transmits at the frequency common to all modules.

The FIFO system needed to implement this invention is well understood and widely available in the industry.

The synchronous channel allows:

1. The device of the invention to provide a system with no bit losses once an Ethernet™ packet enters into a synchronous Ethernet™ channel.

2. A constant delay to be provided from input to output from the synchronous Ethernet™ channel. In addition, this allows consistent variability, measured as delay of one packet to the next, of equal to or less than one bit times (100 Nano-Second) resulting from a FIFO input to output delay uncertainty.

FIG. 17 shows the Ethernet™ statistics counting logic finite state machine (FSM). The FSM performs master and slave bus arbitration, slave access from a host, and qualification of a receive buffer memory address latch pulse through counting of packet length. For this particular implementation, integration of the above functions makes the logic simpler. The input/output conditions for transferring from one state to another is descried Table 6 shown below:

TABLE 6

| | |
|---|---|
| 201 | GET ADDL 1 |
| 202 | CLK 20 |
| 203 | EBRL*(CLK10#LANCECSL) |
| | PREECSL = 1    GET ADDL = |
| | GET ADDL#!ERENAH |
| | EBGL = 1    MONEASL = 1 |
| | S2,S1,S0 = 1    MONONL = 1 |
| 205 | !LANCES*!CLK10 |
| 206 | !CLK10*LANCECS/ PREECSL=1 |
| 207 | CLK10#!LANCECS/ PREECSL=0 |
| 208 | COLREQ*!CLK10 |
| 209 | !COLREQ*!CLK10 |
| 210 | !COLREQ/COLGRN=0 |
| 211 | !EBRL*(LANCECS#CLK10)/EBGL=1 |
| 212 | CLK20/EBGL=0 |
| 213 | EBRL#!EASL#!CLK/EBGL=0 |
| 214 | EBRL*!CLK10/EBGL=1 |
| 215 | !EAS*!EBRL*CLK10/EBGL=0 |
| 216 | EBRL#!EASL#!CLK10/EBGL=0 |
| 217 | EBRL*!CLK10/EBGL=1 |
| 218 | EAS!*!EBH*CLK10/EBGL=0 |
| 219 | EBRL#!EASL#!CLK10/EBGL=0 |
| 220 | ERL*!CLK10/EBGL=1 |
| 221 | !EASL*!EBRL*CLK10/EBGL=0 |
| 222 | EBRL#!EASL#!CLK10/EBGL=0 |
| 223 | EBRL*!CLK10/EBG=1 |
| 224 | EASL*!EBRL*CLK10/EBGL=0 |
| 225 | EBRL#!EASL#!CLK10/EBGL=0 |
| 226 | EBRL*!CLK10/EBGL=1 |
| 227 | !EASL*!EBRL*CLK10/EBGL=0, GETADD = GATADDL & !erh |
| 228 | EBRL#!EASL#!CLK10/EBGL=0 |
| 229 | EBRL*!CLK10/EBGL=1, GETADD = GETADDL |
| 230 | !EBRL*EASL*!CNT256L*CLK10*GETADDL /EBGL=0, GETADDL = GETADDL COLONEKE |
| 231 | EBRL#!CLK10/EBGL=0, GETADDL=0, MONEASL=1 |
| 232 | EBRL*!CLK10/EBGL=1, GETADDL=0, MONOEL=1, MONEASL=1 |
| 233 | CLK20/EBGL=1, GETADDL=0, MONOEL=0, MONEASL=0 |
| 234 | EDTACK/EBGL=1, GETADDL=0, MONOEL=0, MONEASL=0 |
| 235 | ?EDTACK/EBGL=1, GETADDL=0, MONOEL=0, MONEASL=1 |
| 236 | !EDTACK/EBGL=1, GETRADDL=0, MONOEL=0, MONEASL=1 |
| 237 | EDTACK/EBGL=1, GETRADDL=1, MONOEL=0, MONEASL=1 |

TABLE 6-continued

/ = OUTPUT, ! = NOT, & = AND, # = OR

Figure 18A:
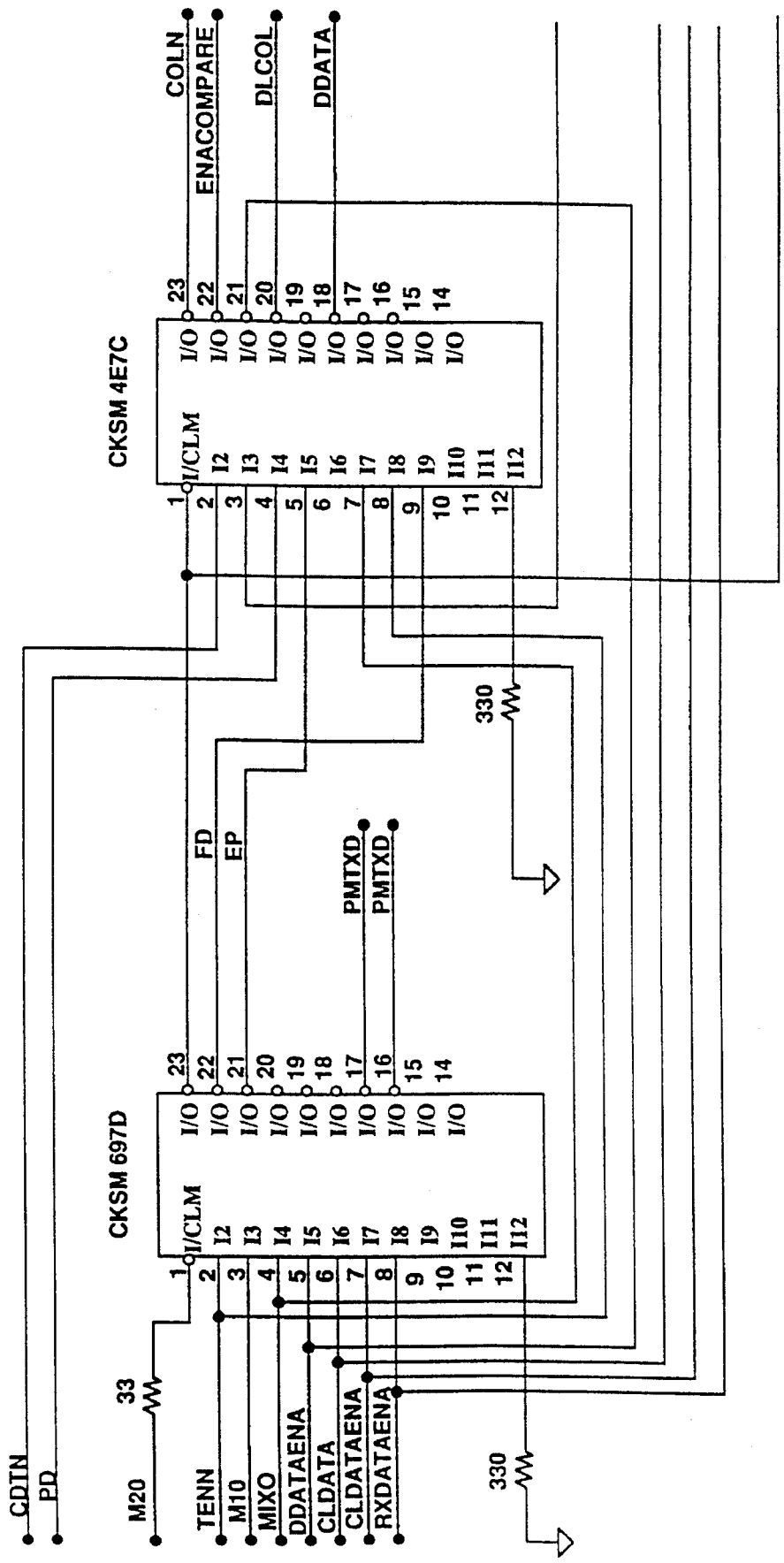
FIGS. 18A and 18B are a schematic of the implementation logic state machine according to Table 6.
Figure 18B:
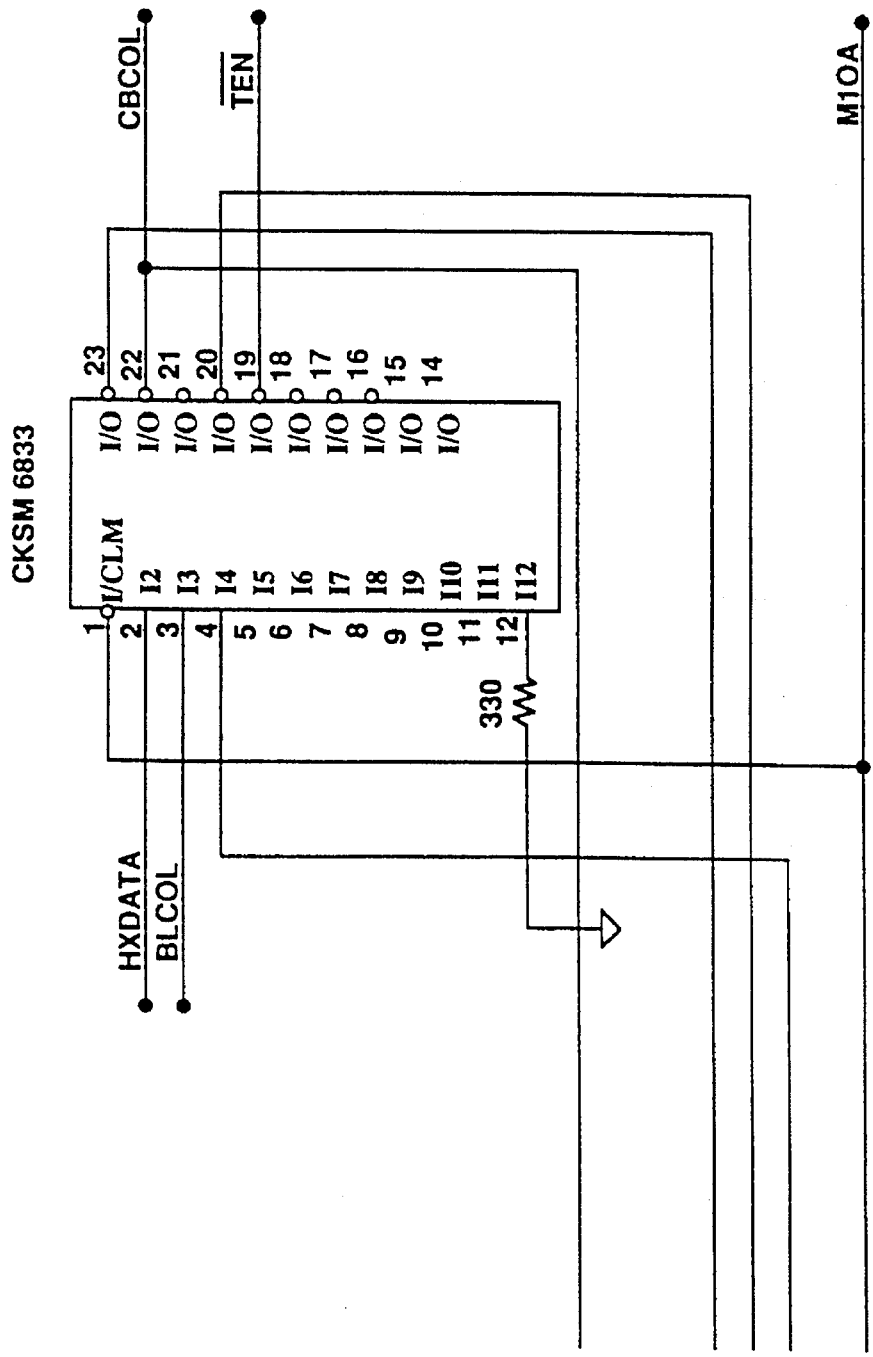

FIG. 18 is a half-repeater logic showing programmable logic devices that implement the logic shown in Table 7 FSM.

The programmable logic devices represented in FIG. 18 implements the finite state machines described in Table 7. The references to U10, U5 and U16 in Table 7 correspond to the devices in this figure.

Figure 19A:
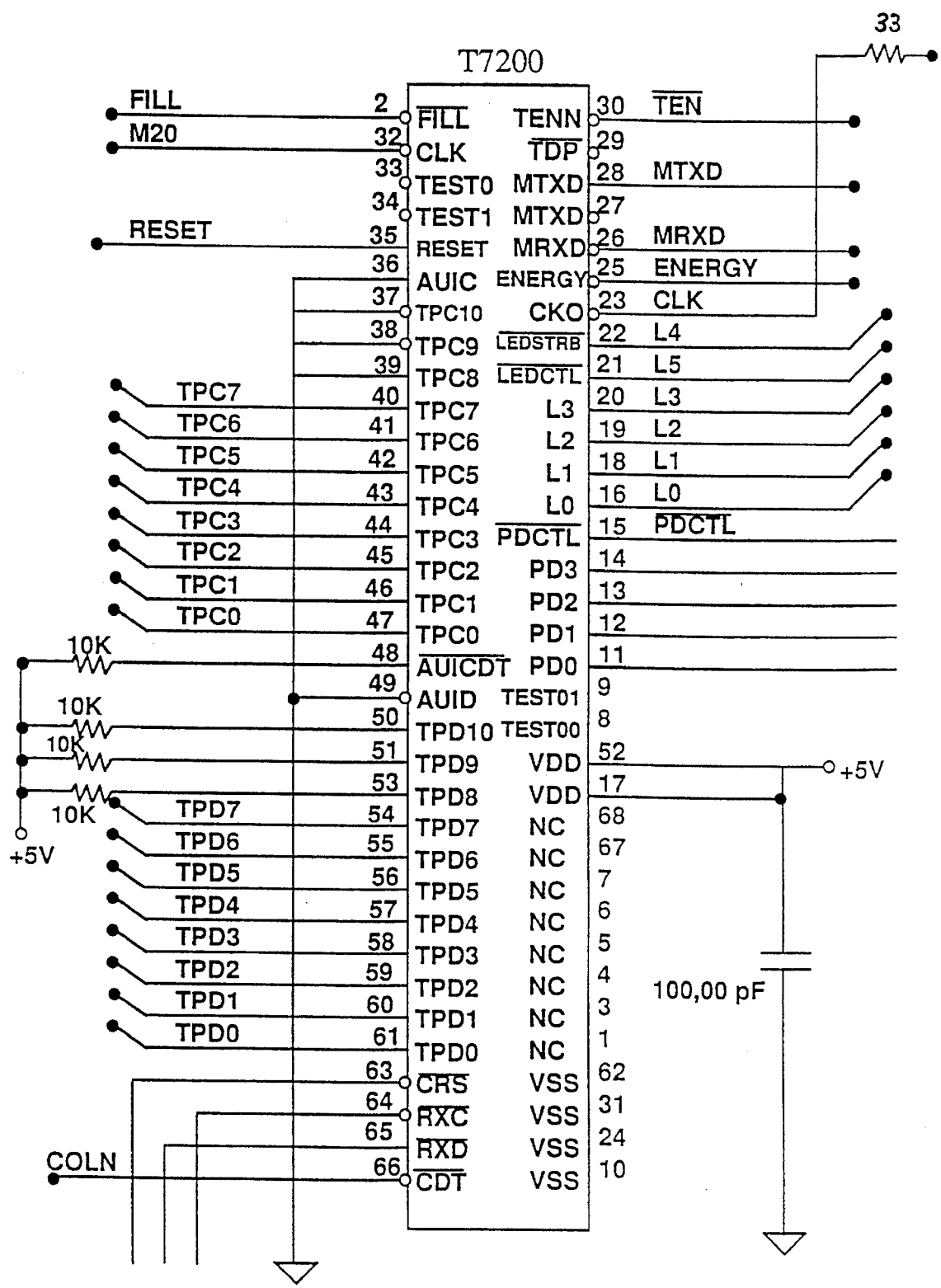
FIGS. 19A, 19B and 19C are a half-repeater logic schematic showing a standard compatible implementation and its interface to half-repeater logic according to the invention.
Figure 19B:
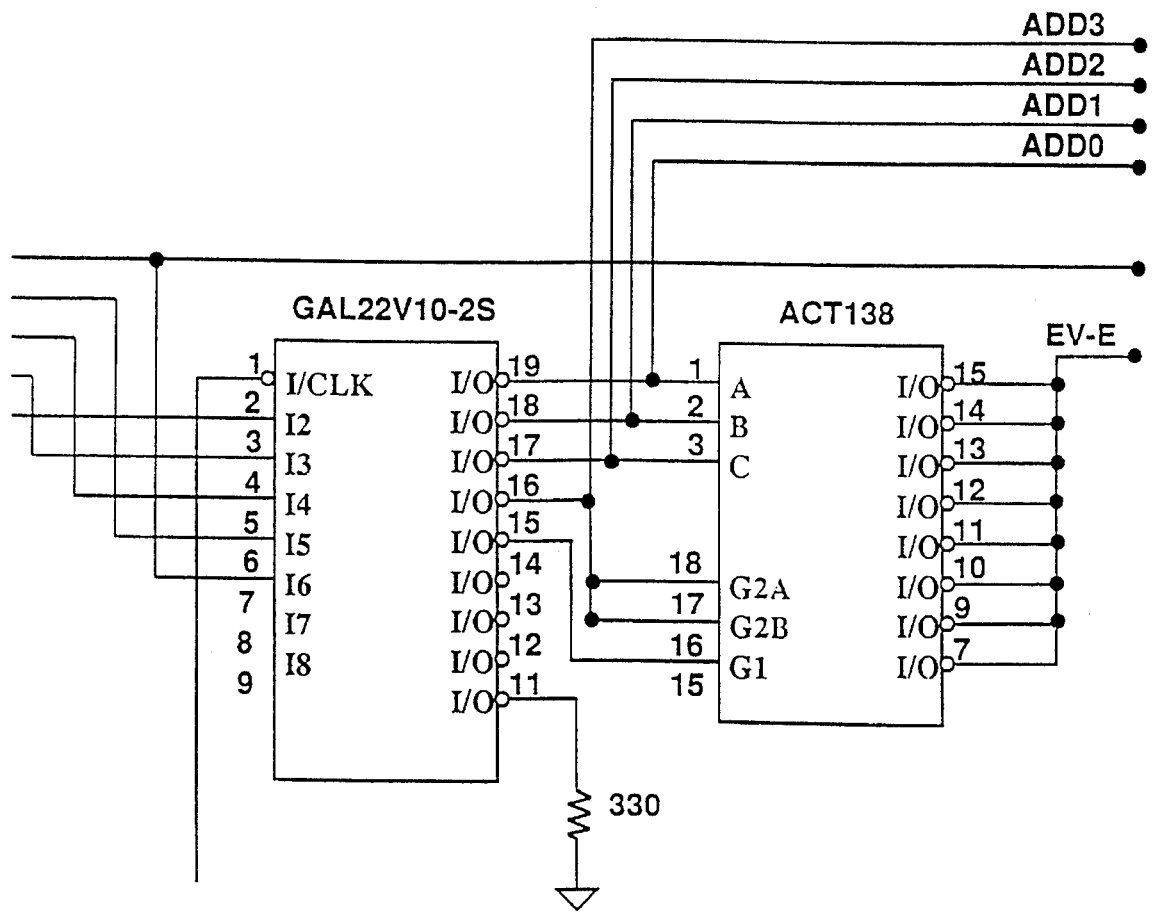
Figure 19C:
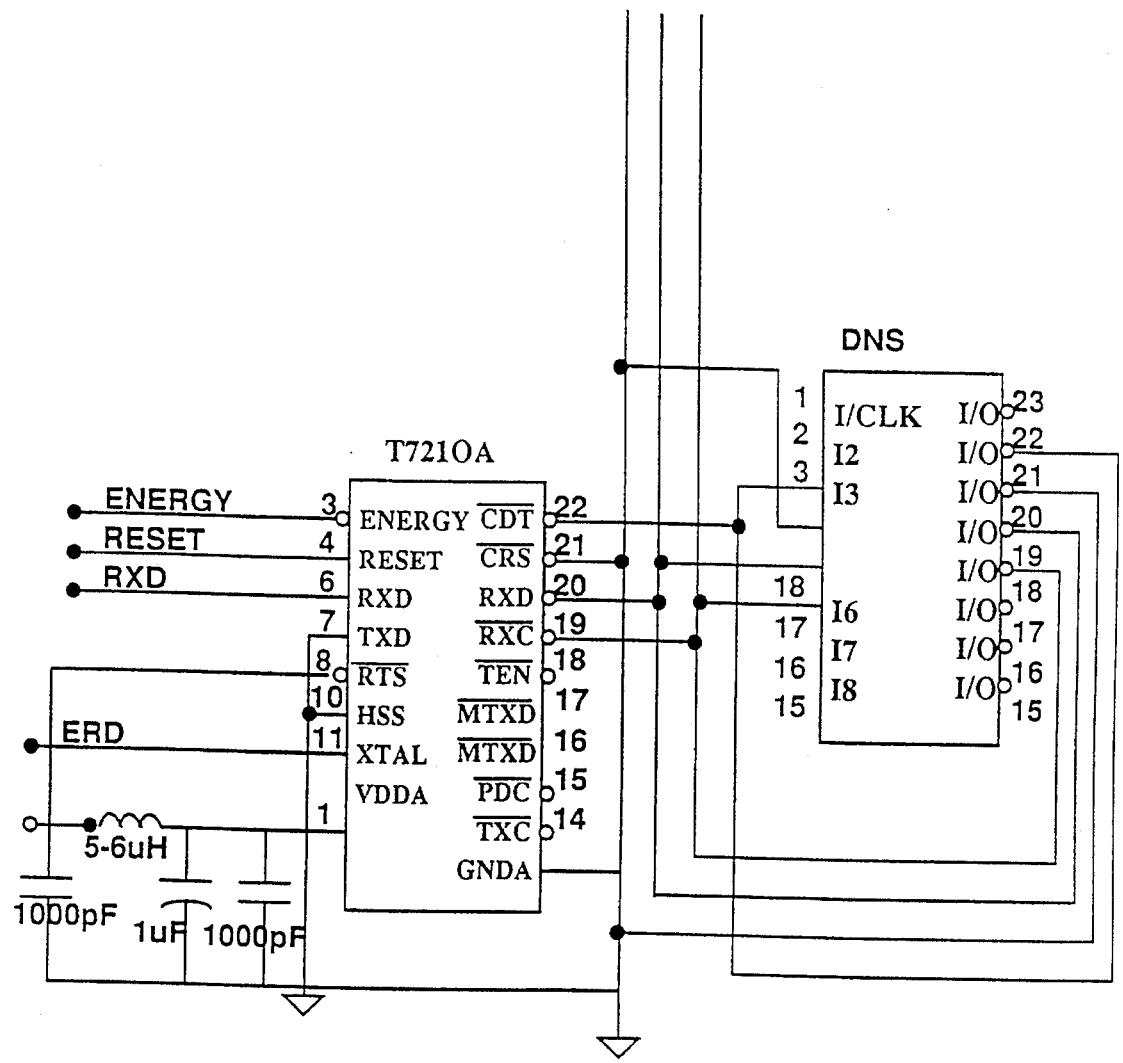

All three devices U10, U5 and U16 function in synchrony to perform the function of properly formatting the data packet originating from the Ethernet Repeater IC, U39 in FIG. 19, and transmitting to the backplane through the circuits described in FIG. 4 or FIG. 7, depending on module or per-port switching option. In addition, the devices also detect data from the backplane when it is not transmitting to the backplane and transmit data from the backplane to each of the ports on the module without loss of any preamble bits and without any variation in delay from the backplane to the port.

The signal TENN represents data enable from the Ethernet Repeater IC. The signal MTXD represents data associated with TENN from the same IC. The signals CLDATA and CLDATAEN represent, clocked data coded using Manchester Coding, and associated data enables to be transmitted to the ports. The signal RXDATAENA represents the data enable received from the backplane.

Table 7 below shows the internal logic definition of U5, U10, U16, all programmable logic devices. The syntax used is of ABEL™, a logic compiler from the Data I/O Corporation.

TABLE 7

```
module mprpall flag '-t4', '-r3', '-q2', '-f0'
title'mprpall interface 7200 to the backplane, part1.Rev.1.0
A. Herman, Dec - 13, 1989
"The PAL must have clock to output max period of ←
"15nanoseconds.
"19-00073A Chipom number
        U10 device 'P22V10';
"inputs:
    clk        pin    1;
    tenN       pin    2;
    M10        pin    3;
    mtxd       pin    4;
    ddataena   pin    5;
    CLDATA     pin    6;
    CLDATAENA  pin    7;
    RxDATAENA  PIN    8;
    OE         PIN   13;
"outputs:
    M10A       pin   23;
    FD         pin   22;
    EP         pin   21;
    REF        pin   20;
    pep        pin   19;
    PMTXD      pin   18;
    PMTXDn     pin   17;
    x=.X.;
equations
    M10A.oe    =!OE ;
    FD.oe      =!OE ;
    EP.oe      =!OE ;
    REF.oe     =!OE ;
    pep.oe     =!OE ;
    PMTXD.oe   =!OE ;
    PMTXDn.oe  =!OE ;
    M10A ;= M10:
    REF := !REF & !tenN;
    FD := !(tenN # (REF & M10A));
    pep := (!tenN & REF & mtxd & ddataena):
    !EP := (!tenN & (pep # !EP) & mtxd);
    PMTXD := !CLDATAENA # (CLDATA $ M10A);
    PMTXDn := CLDATAENA & (CLDATA $ !M10A);
"test vectors([tenN, pd3, pdctlN, M10, mxtxd] →
[EP, pep, M10A REF FD])
"    [1, 1, 1, 0, 1] →[x, x, x, x, x];
"    [1, 1, 1, 0, 1] →[x, x, x, x, x];
"    [1, 1, 1, 1, 1] →[x, x, x, x, x];
"    [1, 1, 1, 1, 1] →[x, x, x, x, x];
"    [1, 0, 0, 0, 1] →[x, x, x, x, x];
"    [0, 0, 0, 0, 1] →[x, x, x, x, x];
"    [0, 0, 0, 1, 1] →[x, x, x, x, x];
"    [0, 0, 0, 1, 1] →[x, x, x, x, x];
"    [0, 0, 0, 0, 0] →[x, x, x, x, x];
"    [0, 0, 0, 0, 0] →[x, x, x, x, x];
"    [0, 0, 0, 1, 1] →[x, x, x, x, x];
"    [0, 0, 0, 1, 1] →[x, x, x, x, x];
"    [0, 0, 0, 0, 0] →[x, x, x, x, x];
"    [0, 0, 0, 0, 0] →[x, x, x, x, x];
"    [0, 0, 0, 1, 1] →[x, x, x, x, x];
"    [0, 0, 0, 1, 1] →[x, x, x, x, x];
"    [0, 0, 0, 0, 0] →[x, x, x, x, x];
"    [0, 0, 0, 0, 0] →[x, x, x, x, x];
"    [0, 0, 0, 1, 1] →[x, x, x, x, x];
"    [0, 0, 0, 1, 1] →[x, x, x, x, x];
"    [0, 0, 0, 0, 0] →[x, x, x, x, x];
"    [0, 0, 0, 0, 0] →[x, x, x, x, x];
"    [0, 0, 0, 1, 1] →[x, x, x, x, x];
"    [1, 1, 1, 1, 1] →[x, x, x, x, x];
"    [0, 0, 0, 0, 0] →[x, x, x, x, x];
"    [0, 0, 0, 0, 0] →[x, x, x, x, x];
"    [0, 0, 0, 1, 1] →[x, x, x, x, x];
"    [0, 0, 0, 1, 1] →[x, x, x, x, x];
"    [0, 0, 0, 0, 0] →[x, x, x, x, x];
"    [0, 0, 0, 0, 0] →[x, x, x, x, x];
"    [0, 0, 0, 1, 1] →[x, x, x, x, x];
"    [0, 0, 0, 1, 1] →[x, x, x, x, x];
"    [0, 0, 0, 0, 0] →[x, x, x, x, x];
"    [0, 0, 0, 0, 0] →[x, x, x, x, x];
"    [0, 0, 0, 1, 1] →[x, x, x, x, x];
"    [0, 0, 0, 1, 1] →[x, x, x, x, x];
end mpprpall
module mprpal2 flag '-t4', '-r3', '-q2', '-f0'
title 'MPRPAL2 interface 7200 to the backplane, part2.Rev.1,
"19-00074A Chipom number
"4E7C checksum
    U5         device   'P22V10';
"inputs:
    clk        pin    1;
    cdtN       pin    2;
    CBCOL      pin    3;
    pqN        pin    4;
    EP         pin    5;
    mtxd       pin    7;
    tenN       pin    8;
    FD         pin    9;
    OE         pin   13;
    AR         node  25;
"outputs:
    coIN       pin   23;
    dataena    pin   22;
    ddataena   pin   21;
    dlcol      pin   20;
    data       pin   19;
    ddata      pin   18;
    dataena istype 'neg';
    ddataena istype 'pos';
    x = .X.;
    c = .C.;
equations
    coIN.OE = !OE;
    dataena.OE = !OE;
    dataena.OE = !OE;
```

TABLE 7-continued

```
    DIcol.OE = !OE;
    data.OE = !OE;
    ddata.OE = !Oe;
colN = cdtN & !CBCOL:
dlcol := (!cdtN & dataena) # (pqN & !dataena);
!dataena := !tenN;
ddataena := EP & !dataena;
data := (mtxd $ FD);
ddata :=data;
AR = tenN;
test vectors (    [clk, tenN, EP] → [dataena, ddataena])
                  [c,1,1] → [1,0];
                  [c,0,1] → [0,0];
                  [c,0,1] → [0,1];
                  [c,1,1] → [1,0];
                  [c,1,1] → [1,0];
                  [c,0,1] → [1,0];
                  [c,1,1] → [1,0];
test vectors (    [clk, tenN] → [data, ddata])
                  [c,1] → [0, 0];
end mprpal2
module mrprpal3 flag '-t4', '-r3', '-q2', '-f0'
tital 'MPRPAL3 interface to the backplane, part3. Rev.1,
"19-00075A Chipom number
"6B33 checksum
    U16               device   'P22V10';
    clk          pin  1;
    RxDATA       pin  2;
    BLCOL        pin  3;
    RxDATAENA    pin  4;
    OE           pin  13;
"outputs:
    CLDATA       pin  23;
    CBCOL        pin  22;
    JAM          pin  21;
    CLDATAENA    pin  20;
    TEN          pin  19;
    DENA         pin  18;
    DDENA        pin  17;
    DDDENA       pin  16;
    x = .X.
    c = .C.;
equations
    CLDATA.OE = (!OE);
    CBCOL.OE '2 (!OE);
    JAM.OE= (!OE);
    CLDATAENA.OE = (!OE);
    TEN.OE = (!OE);
    DENA.OE = (!OE);
    DDENA.OE = (!OE);
    DDDENA.OE '2 (!OE);
    CLDATA := (RxDATA & !CBOL) # JAM;
    CBCOL := BLCOL & RxDATAENA;
    JAM := CBCOL & !JAM;
    CLDATAENA := RxDATAENA;
    !TEN = CLDATAENA # DDDENA;
    DENA := CLDATAENA;
    DDENA := DENA # CLDATAENA;
    DDDENA := DDENA # CLDATAENA;
end mprpal3
```

The FSMs implement data transfer functions as described to and from the backplane, and work in conjunction with a standard IEEE 802.3 repeater, and their particular actions are as specified in the standard.

Half-repeater implementations of Ethernet™ Modules according to the invention allow more 802.3 repeaters in cascade in conjunction with the Ethernet$^{TM}$ network channel. When an Ethernet™ media port is connected to a repeater that is connected to a Ethernet™ network channel, any activity arriving at the input of the media port has a preamble loss. The repeater regenerates the lost preambles and sends the data out to the backplane. The Ethernet™ channel then carries the data without any preamble loss and without delay variability, because the Ethernet™ channel requires all signals to be synchronous to the master clock of a hub. Delay of data from the first bit to the last is fixed.

Once an Ethernet™ activity has passed through a repeater to a Ethernet™ channel via a synchronous interface, it has suffered one repeater input's worth of variability that contributes to the IPS. After data is transferred from one module to another, the data is sent out by another module. All modules containing a repeater function transmit data without any bit loss. Thus the transmission out of the Ethernet™ channels to another module does not suffer any variability that contributes to the IPGS (Inter packet Gap Shrinkage). Thus multiple repeaters connected to an Ethernet™ channel act as one repeater.

The advantages of half repeater implementations are:

1. Through the use of the synchronous Ethernet™ channel, multiple repeaters use only one repeater penalty.

2. The use of a repeater to provide approximately half the dynamic packet gap variation due to preamble losses and by network device delay variations.

3. Multiple repeaters may be used to act as a single repeater, and offers approximately one half the IEEE 802.3 repeater limitations.

FIG. 19 describes one implementation of this half-repeater logic invention using 10BaseT, Ethernet on twisted pair media, repeater IC, U39. This drawing does not describe unique aspects of the half-repeater invention but is included to add clarity and provide the interconnection between an Ethernet Repeater IC and the stae diagrams in Table 7 and FIG. 18.

TOKEN RING IMPLEMENTATIONS AND CONCEPTS

The token ring improvement of the invention includes means for establishing a logical ring by the use of a Slot-ID scheme. The requirements are that each slot be coded with a unique Slot-ID, and the number of slots be equal to or less than the number of available lines assigned to the token ring.

Each token ring module in a hub recognizes the Slot-ID, and transmits a repeated token ring signal onto the line corresponding to its Slot-ID, and listens to all other lines. To establish a logical ring, each module will pick a unique and active module from which to receive. Although many algorithms based on a unique Slot-ID scheme that meets such a requirement may be employed ,one algorithm is preferred.

According to the preferred algorithm, each module picks the closest active neighbor with the largest Slot-ID less than its own from which to receive. If no such neighbor exists, it picks the active neighbor with the largest Slot-ID greater than or equal to its own.

The 17 squelch outputs and the 17 transmit select lines drive the backplane ring control element, which uses these lines to determine which of the 17 backplane lines to receive its data from. As with the transmit decoder, this function can be overridden by network management. The operation of this element is basically as follows:

Let "TYSEL(i)"=Line selected for transmission (0 to 17)

Let "RXON(i)"=RX activity sense for each of backplane lines (1 to 18; active high)

Let "RXSEL(i)"=Line selection for reception (0 to 17)

The algorithm according to the invention uses the following steps:

1. One TSEL line must be uniquely active. Assign this the value N.

2. If any of RXON(1) to RXON(N-1) is active, set RXSEL to the "highest" line which has RXON(i) active (ie., N-1, N-2, etc. in order of preference).

3. If none of RXON(1) to RXON(N-1) is active, set RXSEL to the highest line of RSEL which is active.

This algorithm should run continuously to build and maintain the ring, even if cards are removed from or added to the hub. The implementation can use a static array of logic to generate the RXSEL(i) with the following equations:

$$\begin{aligned}
RXSEL(i) = \ & RXON(i) \ \& \\
& (TXSEL(i+1) + \\
& (TXSEL(i+2) \ \& \ !RXON(i+1)) + \\
& (TXSEL(i+3) \ \& \ !RXON(i+2) \ \& \\
& !RXON(i+1)) + \ldots \\
& + = \text{logical OR} \\
& \& = \text{logical AND} \\
& ! = \text{logical NOT}
\end{aligned}$$

where the equation wraps line 17 to line 0 when TXON(17) is reached, and ends with a term which contains TXSEL(i) and all RXON signals except RXON (i) are inactive.

A means of establishing two logical rings by the use of Slot-ID and data rate detection is also incorporated. The requirements are the same as the above described Ring Establishment using Slot-ID Each token ring module in a hub recognizes the Slot-ID, and transmits a repeated token ring signal to the line corresponding to its Slot-ID, and listens to all other lines. To establish two separate logical rings containing different modules, each module will pick a unique and active module with the same data rates from which to receive. Thus each module detects activity, and data rate at both 4 Mega Bits/Sec and 16 Mega Bits/Sec. Allowing for jitter build-up, and implementational margins, 4 Mega Bits/Sec token ring cannot present a data edge any faster than 125 nSec nor slower than 1000 nSec. 16 Mega Bits/Sec token ring cannot present a data edge any faster than 31.25 nSec nor slower than 250 nSec. Through the use of a frequency discriminator between 31.25 to 125 nSec, or 250 nSec to 1000 nSec, with proper allowances for jitter and engineering tolerances, the data rate can be positively detected.

The ring is established in exactly the same manner as the above described Ring Establishment using Slot-ID, with the exception that the data rate is compared each time the presence of token ring activity is tested. If the data rate is different, the activity, if detected, is ignored.

In principle, there is no limitation on the number of Rings formed by this method. If a future token ring standard merits an 8 or 32 mega bits per second (BPS) or any other data rate, this feature of the invention allows the same multiple ring establishment, each ring consist of compatible data rates, using Slot-ID.

A single data rate detector is employed to indicate 4 megaBPS versus 16 megaBPS. The data rate is detected by a edge-triggered retriggerable mono-stable multi-vibrator (one-shot), connected to a token ring data line on the backplane. The pulse width, or the time constant, is set to be nominally 50 Nano-Seconds +/-10%. A second circuit, a digital sampling circuit with a sampling period of 50 nSec, counts the duration of the output from the one-shot. During a Timer, No-Token period, as defined in IEEE 802.5-1989 standard, any contiguous output of 800 nSec (allowing for margins, where the minimum sized frame is an abort sequence of two octets or 1000 ns) or more is detected, data rate for that token ring line is deemed to be 16 Mega Bits Per Second, otherwise, 4 Mega Bits Per Second.

A means of establishing multiple logical rings on a backplane by the use of configuration management is another feature of the invention. The requirements are that each slot be coded with a unique Slot-ID, such that configuration management entities may individually address each module.

By the use of the configuration management function, provided by a communication line, or by hardware switches, each module can be configured to receive from a particular line. Although not a requirement, each module always transmits to a line corresponding to its own slot-ID, because additional freedom of assigning transmit lines to any arbitrary backplane line complicates logic implementations without added benefit. Each module reports its own data rate to the management function. The management then controls interconnection of each module to another. Via this configuration control, any number of rings can be established, only limited by the number of modules and the backplane communication line. This allows multiple logical Token Rings on a backplane through the configuration management.

According to the invention, Software or Hardware Control of the configuration is provided for the purpose of creating the Multiple Ring establishment. This allows multiple logical rings of compatible speeds of 4 MegaBPS and 16 MegaBPS on a backplane through the configuration management.

FDD IMPLEMENTATIONS AND CONCEPTS

Ring Establishments using Slot-ID for FDDI Concentrator Implementations and Concepts is also provided according to the invention. FDDI, of 125 megabaud, or 100 megaBPS is signaled on a set of five data lines in parallel. Before any data transmission is allowed, each FDDI module establishes the ring by contending for an inactive set of data lines. The sets of data lines are predetermined, and its logical order is established.

If a module monitors activity on all sets of data lines, it does not contend for any set of data lines. If a module detects an inactive set of data lines while seeking from the lowest order to the highest order of sets, it enables its own Slot-ID onto the set of data lines. For an arbitrarily long duration denoted as TC, the set of data lines are monitored and compared with its own Slot-ID. If there is no discrepancy during this time, the module transmits to the set of data lines which it now owns. If there is a discrepancy, the module waits for the duration equalling the Slot-ID times TC. Then it reverts back to listening to a set of data lines for activity.

Once a module owns a set of data lines, it immediately starts sending IDLE, and starts the Ring Establishment process. Ring is established in the same way as the above in Token Ring establishment. To establish a logical ring, each module will pick a unique and active module from which to receive.

Each module picks the closest active neighbor with the highest order less than its own from which to receive. If no such neighbor exists, it picks the active neighbor with the highest Slot-ID greater than or equal to its own.

The following are important details of the FDDI implementation ring establishments according to the invention:

1. A set of data lines are provided to signal a 125 megabaud signal.

2. The preferred implementation provides five data lines per set, and three sets per channel.

3. Slot-ID is used to detect contention of data lines and Slot-ID is used to provide a unique non-overlapping waiting period.

This invention allows an FDDI (Fiber Data Distribution Interface protocol) ring to be established by using a unique Slot-ID scheme to resolve multiple FDDI modules contending for the same set of data lines.

Multiple logical rings on a backplane are provided by the use of configuration management. The requirements are that each slot be coded with a unique Slot-ID, such that configuration management entities may individually address each module to configured modules.

TOKEN BUS IMPLEMENTATIONS AND CONCEPTS

To implement the Token Bus protocol, a Token Bus channel must provide a means of detecting data corruption and a means for broadcasting data transmissions to all the other end-nodes. Both of these are common with the Ethernet™ network protocol. If a bigger FIFO scheme is provided to service frequency mismatch of the increased packet size of 32 Kbytes of Token Bus, compared to the 1.5 Kbytes of Ethernet™, and an additional data line is provided to carry non-data symbols, the same Ethernet™ module backplane interface with these modifications, can carry the Token Bus protocol.

The collision, or in this case data corruption, is detected and enforced by detecting two or more simultaneous transmissions. Collision is detected in the same way as the above-described Collision Detection using Slot-ID. In addition, all data transmissions from any port are broadcast to all other ports, except during a collision. During a collision, all data transmissions from any port are broadcast to all the ports.

The implementation of the Token Bus needs one additional data line to provide non-data symbols in addition to the binary zero and binary one. The FIFO depth is increased from 4 bits to 52 bits to accommodate the frequency mismatch of packet length of up to 32 kilobytes, as allowed in the IEEE 802.4 Token Bus standard.

While a specific embodiment of the invention has been shown and described in detail to illustrate the application of the principles of the invention, it will be understood that the invention may be embodied otherwise without departing from such principles.

What is claimed is:

1. A communication system concentrator, comprising:

a plurality of media modules each having one or more ports, each of said plurality of media modules being provided for one or more physical local area network media type such as fiber optic medium, coaxial cable or twisted pair cable and each of said ports being provided for a specific network access method including one of Carrier Sense Multiple Access with Collision Detection (CSMA/CD) and TokenRing;

a generic passive backplane element with multiple physical circuits which are assigned as physical paths for data exchange between said plurality of media modules said ports of said media modules for connection to said generic passive backplane element, said generic passive backplane element providing multiple, simultaneous data transfer on different physical paths of said generic passive backplane element;

switching means connected to each of said media modules for connecting or disconnecting one or more of said ports of each of said media modules with said generic passive backplane element; and management means connected to said plurality of media modules for managing said switching means for switching one or more of said ports to connect said ports to said multiple physical circuits for configuring and reconfiguring said physical paths to provide a physical communication path between said ports of a like network access method, whereby said generic passive backplane element is configurable to serve different network acccess methods simultaneously.

2. A communication system concentrator according to claim 1, wherein:

each of said plurality of media modules includes switching means for isolating said ports from said multiple physical circuits of said generic passive backplane element for simultaneous and separate communication.

3. A communication system concentrator according to claim 1, wherein:

each of said plurality of media modules includes module switching means for connecting or disconnecting said media module with said generic backplane, said module switching means including hardware switches controlled by software for creating a logical network topology by selectively connecting and disconnecting said media modules from said generic passive backplane.

4. A communication system concentrator according to claim 1, wherein:

each of said media modules includes port switching means for connecting and disconnecting individual ports to one of said physical circuits of said generic passive backplane element and connecting and disconnecting individual ports to other individual ports and for isolating connected individual ports from said physical circuits of said generic passive backplane element for communication only between connected individual ports, said port switching means including hardware switches controlled by software for creating a logical network topology by selectively connecting and disconnecting ports from said physical paths of said generic passive backplane element.

5. A communication system concentrator according to claim 1, further comprising:

local area network management modules for monitoring and controlling communication on said physical paths of said generic passive backplane element, one of said local area network management modules acting as a hub master for controlling and monitoring physical aspects of communication;

said local area network management modules providing management election means for electing one local area network management module to serve as said hub master;

said hub master continuously exercising said controlling and monitoring of physical aspects of communication, and said election means causing a new election of a hub master upon a break in said continuous exercising of controlling and monitoring physical aspects of communication.

6. A communication system concentrator according to claim 5, wherein:

each of said plurality of media modules includes SLOT-ID transmit means for enabling a unique SLOT-ID of an associated media module onto one of said physical paths of said generic passive backplane element when one of said modules transmits on one of said physical paths of said generic passive backplane element; and SLOT-ID receive means associated with each of said plurality media modules for comparing a SLOT-ID read from said generic passive backplane with said unique SLOT-ID of said media module to determine contention.

7. A communication system concentrator according to claim 6, wherein:

said SLOT-ID receive means issues a collision enforcement signal if said SLOT-ID read from said generic passive backplane does not match with said unique SLOT-ID, said management module using said collision enforcement signal to distinguish between local and remote collisions and said management module recording collision statistics.

8. A communication system concentrator, comprising:

a plurality of media modules each having ports and each said port being provided for a bus network access method or for a ring network access method; a backplane, said plurality of media modules being connected to said backplane, said backplane providing multiple physical circuits which are assigned as physical paths for data exchange between said ports of said plurality of media modules, said ports of said plurality of said media modules for connection to said backplane, said backplane being generic and non configured for data exchange between media modules to provide multiple, simultaneous data transfer on different physical paths of said backplane;

switching means connected to each of said media modules for connecting or disconnecting one or more of said ports of each of said media modules with said backplane; and configuring and reconfiguring means connected to said plurality of media modules for connecting said ports to said multiple physical circuits for configuring and reconfiguring said backplane as physical paths of said bus network access method and/or configuring and backplane as physical paths of said ring network access method for data exchange among media modules, wherein said physical paths of said backplane are configured for direct, transparent, simultaneous independent communication and real time data exchange among media modules allowing different access methods, simultaneously to be served.

9. A concentrator for a local-area-networks, comprising:

a plurality of media modules having one or more ports, each of said plurality of media modules being provided for one or more physical local area network media type such as fiber optic medium, coaxial cable or twisted pair cable and ports of each media module being provided for either a bus network access method or a ring network access method;

a generic passive backplane element with multiple physical circuits which are assigned as physical paths for data exchange between said plurality of media modules, said plurality of media modules being connected to said generic passive backplane providing multiple, simultaneous data transfer on different physical paths of said generic passive backplane element;

switching means connected to each of said media modules for connecting or disconnecting one or more of said ports of each of said media modules with said generic passive backplane element;

management means connected to said plurality of media modules for managing said switching means for switching one or more of said ports to connect said multiple physical circuits for configuring and reconfiguring said physical paths to provide a plurality set of physical communication paths between said ports of a like network access method whereby said generic passive backplane element is configurable to serve different network access methods simultaneously; and ID means for identifying a source of a transmission from one of said plurality of media modules.

10. A concentrator for a local-area-networks according to claim 9, wherein:

said ID means includes slot-ID transmit means associated with each of said plurality of modules for enabling a unique slot-ID onto one set of said plurality of communication paths when each of said plurality of media modules transmits on one of said physical communication paths;

slot-ID receive means associated with each module for reading said one of said physical communication paths when each of said plurality of media modules is transmitting, said slot-ID receiving means comparing a received slot-ID read from said physical communication path with said unique slot-ID to determine contention.

11. A concentrator in accordance with claim 10, wherein:

said slot-ID receive means issues a collision enforcement signal if said received slot-ID does not compare to said unique slot-ID of a corresponding one of said plurality of media modules, and said management means uses said collision enforcement signal to distinguish between local and remote collisions.

12. A concentrator in accordance with claim 11, further comprising management means recording collision statistics for said ports and said plurality of media modules based on said port ID.

13. A concentrator in accordance with claim 12, further comprising:

Ethernet™ controller means for controlling and monitoring communication, and recording communication statistics, said Ethernet™ controller means associating all received data packets with a corresponding slot-ID and port-ID for consistency and accuracy of in said recording of said communication statistics.

14. A concentrator in accordance with claim 13, wherein:

said slot-ID and port-ID are used by said Ethernet™ controller means to associate each of said received data packet with an origin.

15. A concentrator in accordance with claim 13, wherein:

said management means controls and monitors said Token Ring protocal on said plurality of communication paths, said management means establishes a logical ring based on said unique slot-ID.

16. A concentrator in accordance with claim 15, wherein:

said logical ring is established by each of said plurality of modules choosing a closest module having a largest slot-ID less than said choosing module, if there is not such module then such choosing module chooses a module with a slot-ID greater than or equal to said slot-ID of said choosing module.

17. A concentrator in accordance with claim 16, further comprising:

rate detection means for detecting a rate of communication on said physical communication path, said logical ring is established by using slot-ID's and selecting said ones of said plurality of media modules having similar communication rates.

18. A concentrator in accordance with claim 16, further comprising:

module switches connecting said modules to said generic passive backplane element; and said management means also establishing said logical ring by controlling said module switches.

* * * * *